US012639536B2

(12) United States Patent
Steel et al.

(10) Patent No.:  US 12,639,536 B2
(45) Date of Patent:   *May 26, 2026

(54) METHOD AND SYSTEM FOR DETERMINING WHETHER A DONGLE IS IN SPATIAL PROXIMITY TO A VEHICLE DIAGNOSTIC TOOL

(71) Applicant: Snap-on Incorporated, Kenosha, WI (US)

(72) Inventors: Derrick R. Steel, Gurnee, IL (US); Joseph R. Grammatico, El Dorado, CA (US); Roy S. Brozovich, Campbell, CA (US); Joshua C. Covington, San Juan Bautista, CA (US); Kahlil H. Cacabelos, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/925,212

(22) Filed: Oct. 24, 2024

(65) Prior Publication Data

US 2025/0045543 A1     Feb. 6, 2025

Related U.S. Application Data

(63) Continuation of application No. 17/465,843, filed on Sep. 3, 2021, now Pat. No. 12,147,866.

(51) Int. Cl.
| | |
|---|---|
| *G06K 7/10* | (2006.01) |
| *G07C 5/00* | (2006.01) |
| *G07C 5/08* | (2006.01) |

(52) U.S. Cl.
CPC ..... G06K 7/10366 (2013.01); G06K 7/10128 (2013.01); G07C 5/008 (2013.01); G07C 5/0825 (2013.01)

(58) Field of Classification Search
CPC .................................................. G06K 7/10366
See application file for complete search history.

(56) References Cited

U.S. PATENT DOCUMENTS

| | | |
|---|---|---|
| 6,314,183 B1 | 11/2001 | Pehrsson et al. |
| 8,497,657 B2 | 7/2013 | Franks et al. |
| | (Continued) | |

FOREIGN PATENT DOCUMENTS

| | | |
|---|---|---|
| WO | 2013/151296 A1 | 10/2013 |
| WO | 2018053309 A1 | 3/2018 |

OTHER PUBLICATIONS

Nair, Vijith Vijayakumaran, and Choi, Jun Rim; An Efficiency Enhancement Technique for a Wireless Power Transmission System Based on Multiple Coil Switching Technique, Energies 2016, 9, 156; doi: 10.3390/en9030156; Mar. 3, 2016*.

(Continued)

*Primary Examiner* — Davetta W Goins
*Assistant Examiner* — Pameshanand Mahase
(74) *Attorney, Agent, or Firm* — McDonnell Boehnen Hulbert & Berghoff LLP

(57)     ABSTRACT

A system comprises a dongle and a diagnostic tool. The dongle includes a vehicle communication transceiver (VCT), a first wireless transceiver, and a vehicle connector. The diagnostic tool includes a processor, a proximity sensing component, an output device, and a second wireless transceiver. The proximity sensing component outputs an output signal. The processor receives the output signal and make a determination that indicates whether the output signal indicates an object is in spatial proximity to the proximity sensing component. The processor outputs using the output device a notification based on the determination. The VCT performs a vehicle communication directly with a vehicle while the vehicle connector is connected to an on-board diagnostic connector (OBDC) of the vehicle. The (Continued)

VEHICLE COMMUNICATION TRANSCEIVER 23

COMMUNICATION TRANSCEIVER 24
WIRED XCVR 34
WIRELESS XCVR 33

PROXIMITY SENSING COMPONENT 25

~29

30

VEHICLE CONNECTOR 22

PROCESSOR 20

CRP 35
PAIRING INFO 36
STATUS INFO 37
VDM 38
VEHICLE ID 39

POWER SUPPLY 26

BATTERY CHARGER 28

MEMORY 21

LIGHT 27

SOUND COMPONENT 19

HOUSING 31

DONGLE 3 first and second wireless transceivers communicates with each other to trigger a vehicle communication from the dongle to the vehicle while the vehicle connector is connected to the OBDC.

25 Claims, 25 Drawing Sheets

(56) References Cited

U.S. PATENT DOCUMENTS

| | | | |
|---|---|---|---|
| 9,053,250 B2 | 6/2015 | Halim et al. | |
| 9,116,663 B2 | 8/2015 | Prociw et al. | |
| 9,135,478 B2 | 9/2015 | Burns | |
| 9,329,633 B2 | 5/2016 | Selkirk et al. | |
| 9,553,637 B2 | 1/2017 | Yang et al. | |
| 9,602,163 B2 | 3/2017 | Schultz et al. | |
| 9,628,597 B1 | 4/2017 | Andersen et al. | |
| 9,640,054 B2 | 5/2017 | Heine et al. | |
| 9,716,972 B2 | 7/2017 | Logan et al. | |
| 9,927,838 B2 | 3/2018 | Vroom et al. | |
| 10,291,762 B2 | 5/2019 | Andersen et al. | |
| 10,313,340 B2 | 6/2019 | Wolski et al. | |
| 10,650,921 B2 | 5/2020 | Chudy et al. | |
| 10,928,934 B1 | 2/2021 | Justin | |
| 12,147,866 B2 * | 11/2024 | Steel | G07C 5/008 |
| 2005/0173142 A1 | 8/2005 | Cutler et al. | |
| 2006/0026326 A1 | 2/2006 | Hunt et al. | |
| 2007/0073459 A1 * | 3/2007 | Webster | G07C 5/0816 |
| | | | 701/31.4 |
| 2009/0300548 A1 | 12/2009 | Sullivan et al. | |
| 2011/0153821 A1 | 6/2011 | McCoy | |
| 2011/0169654 A1 | 7/2011 | Ketari | |
| 2014/0062700 A1 | 3/2014 | Heine et al. | |
| 2014/0104771 A1 | 4/2014 | Colan | |
| 2014/0195102 A1 * | 7/2014 | Nathanson | H04W 4/48 |
| | | | 701/31.4 |
| 2014/0206480 A1 | 7/2014 | Davis | |
| 2015/0073647 A1 | 3/2015 | Ubik et al. | |
| 2015/0269788 A1 * | 9/2015 | Elliott | G06Q 20/18 |
| | | | 701/31.4 |
| 2016/0013598 A1 * | 1/2016 | Kirkpatrick | H01R 24/68 |
| | | | 439/652 |
| 2016/0282907 A1 | 9/2016 | Barnett et al. | |
| 2016/0374002 A1 * | 12/2016 | Tuluca | G07C 5/0841 |
| 2017/0076515 A1 | 3/2017 | Nyalamadugu | |
| 2018/0219860 A1 | 8/2018 | Wolski et al. | |
| 2018/0220993 A1 | 8/2018 | Poland | |
| 2018/0225891 A1 | 8/2018 | Lambourne | |
| 2018/0284842 A1 | 10/2018 | Han et al. | |
| 2019/0304213 A1 | 10/2019 | Chen et al. | |
| 2021/0174953 A1 * | 6/2021 | Mckeown | G16H 40/63 |
| 2021/0182771 A1 | 6/2021 | Nukala et al. | |
| 2023/0072266 A1 | 3/2023 | Steel | |

OTHER PUBLICATIONS

Matco Tools; Diagnostics Sales Guide; Jun. 14, 2018*.
Matco Tools; Datasheet—Maximus 2.0A and MDMAX2A; Sep. 21, 2017*.
AMS AG; Datasheet—TMD2672 Digital Proximity Detector; Mar. 23, 2015.*
Mehrl, David J and Glover, Kerry; Proximity Detection IR LED and Optical Crosstalk; Intelligent Opto Sensor Designer's Notebook, No. 34; Texas Advanced Optoelectronics Solutions (TAOS); Aug. 2011*.
Snap-On Incorporated; Zeus User Manual, ZEEMS342A Rev. F; Mar. 24, 2020*.
Radio Frequency Identification (RFID); downloaded from https://www.fda.gov/radiation-emitting-products/electromagnetic-compatibility-emc/radio-frequency-identification-rfid on Sep. 3, 2021*.
Roland Minihold; Near Field Communication (NFC) Technology and Measurements, White Paper, Rohde & Schwarz; Jun. 2011, 1MA185_5e*.
International Searching Authority at European Patent Office; Notification of transmittal of the International search report and the written opinion of the International Searching Authority or the Declaration; International Search Report, and written opinion of the International Searching Authority for international application No. PCT/US2022/038708; mailing dated Nov. 2, 2022*.
IP Australia; Examination Report No. 1 for standard patent application; issued for Australian application No. 2025200765; Feb. 13, 2026; 4 pages.

* cited by examiner

VEHICLE ─2

DONGLE ─3

─11

6

SERVER

5

VEHICLE DIAGNOSTIC TOOL 7

3─ DONGLE

VEHICLE DIAGNOSTIC TOOL ─7

PROXIMITY SENSING COMPONET

BASE STATION

─9

─8

1

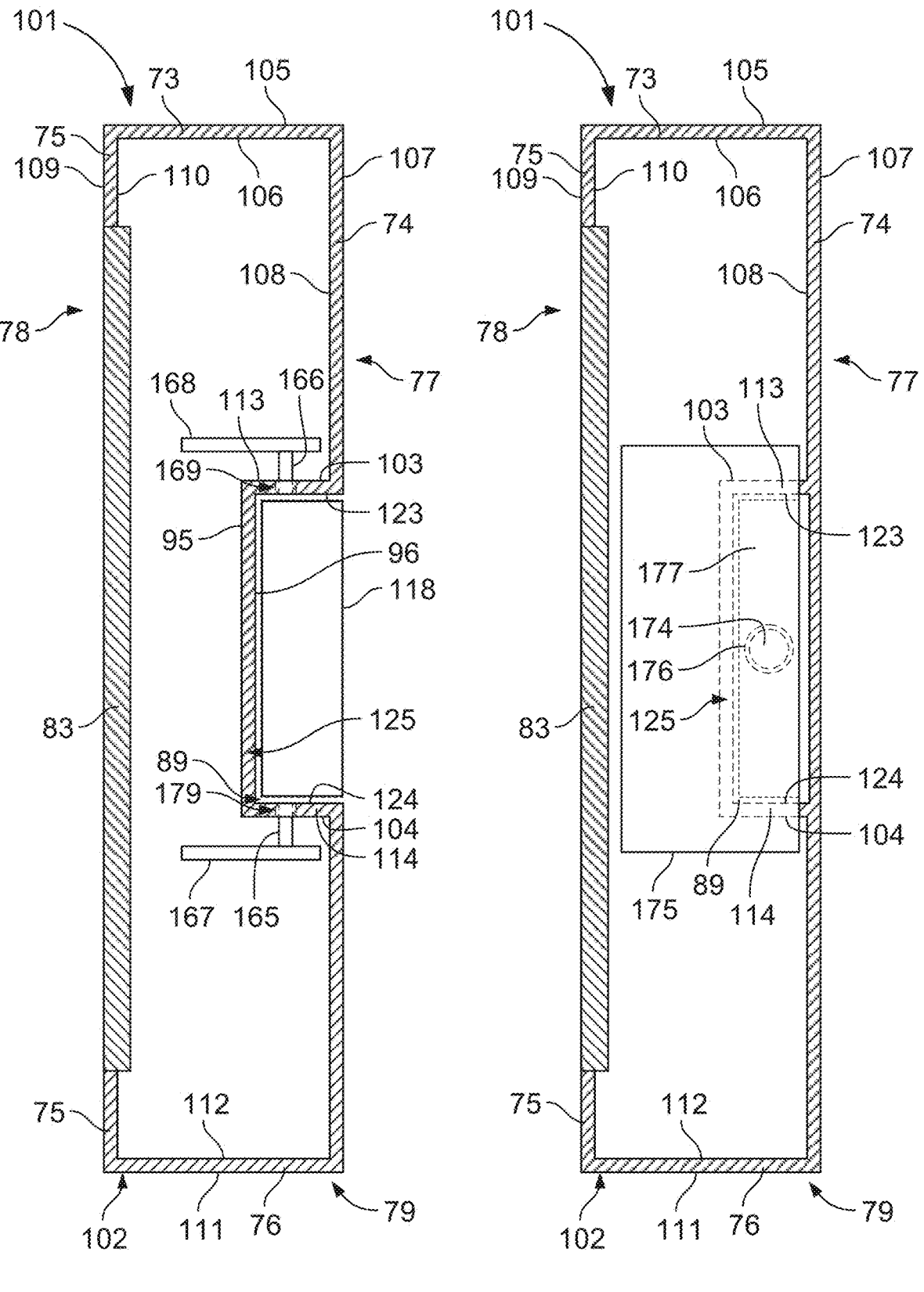
FIG. 9C                    FIG. 9D

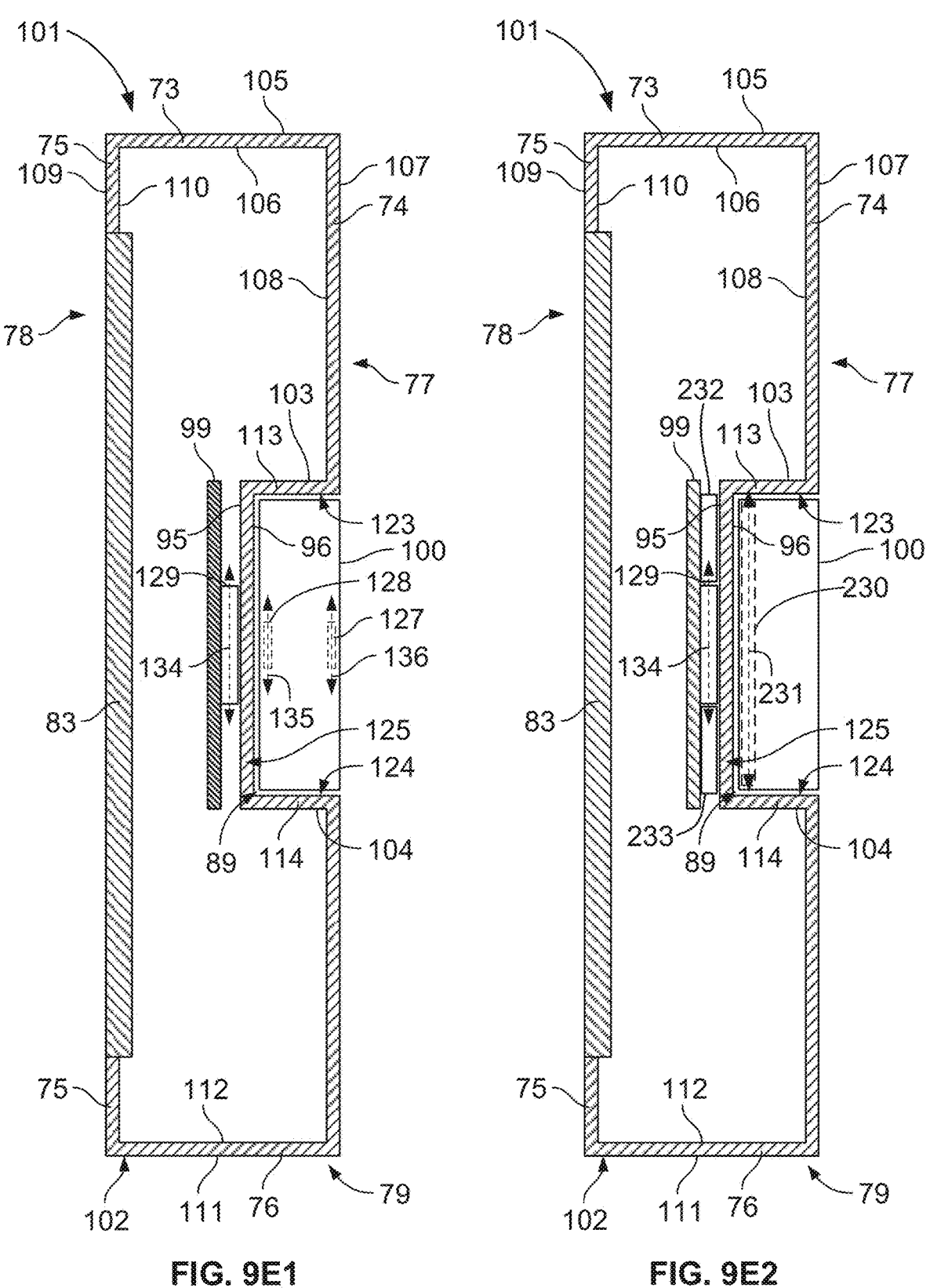
FIG. 9E1                FIG. 9E2

Figure 14:
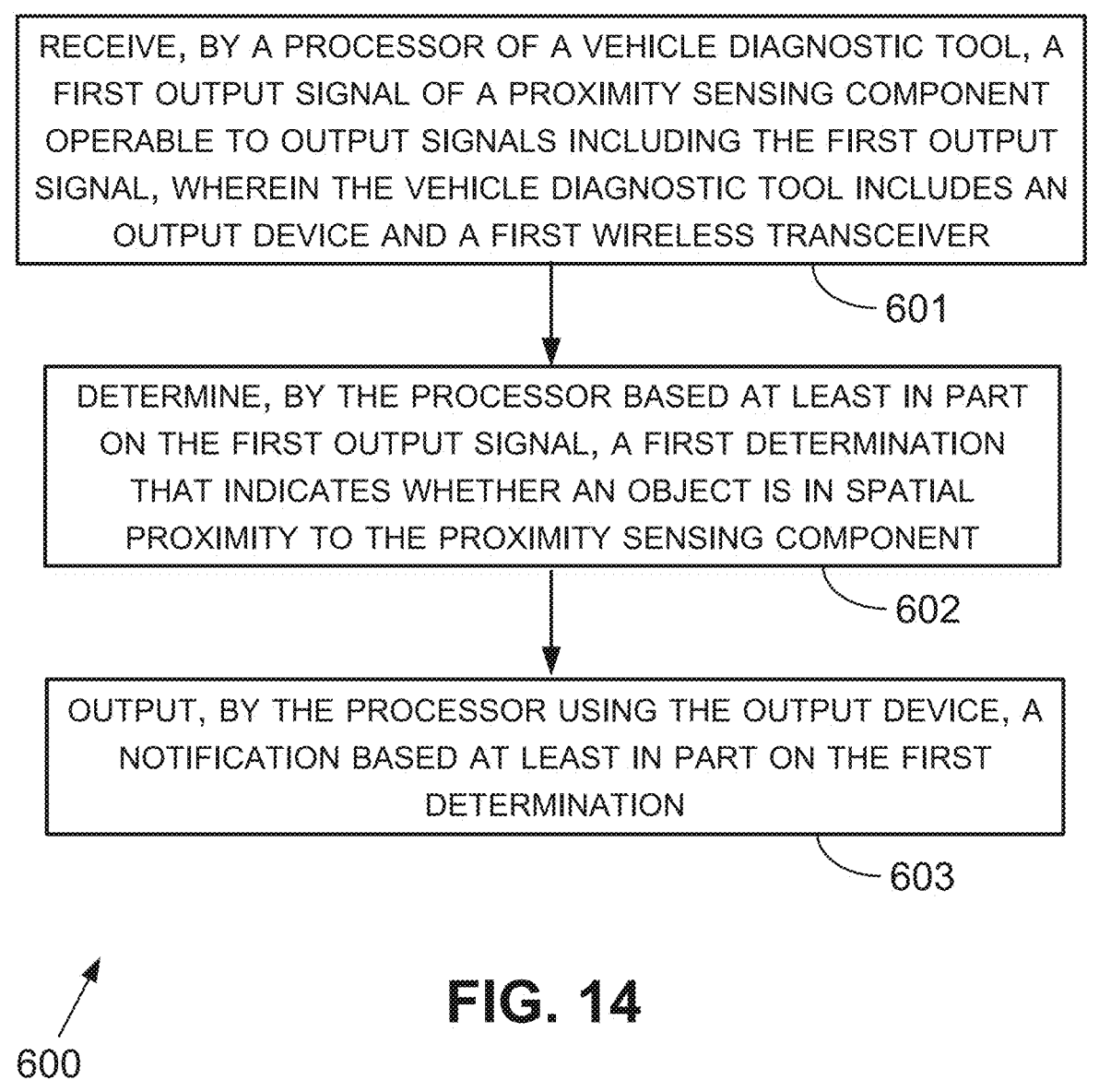

RECEIVE, BY A PROCESSOR OF A VEHICLE DIAGNOSTIC TOOL, A FIRST OUTPUT SIGNAL OF A PROXIMITY SENSING COMPONENT OPERABLE TO OUTPUT SIGNALS INCLUDING THE FIRST OUTPUT SIGNAL, WHEREIN THE VEHICLE DIAGNOSTIC TOOL INCLUDES AN OUTPUT DEVICE AND A FIRST WIRELESS TRANSCEIVER

601

DETERMINE, BY THE PROCESSOR BASED AT LEAST IN PART ON THE FIRST OUTPUT SIGNAL, A FIRST DETERMINATION THAT INDICATES WHETHER AN OBJECT IS IN SPATIAL PROXIMITY TO THE PROXIMITY SENSING COMPONENT

602

OUTPUT, BY THE PROCESSOR USING THE OUTPUT DEVICE, A NOTIFICATION BASED AT LEAST IN PART ON THE FIRST DETERMINATION

Figure 15:
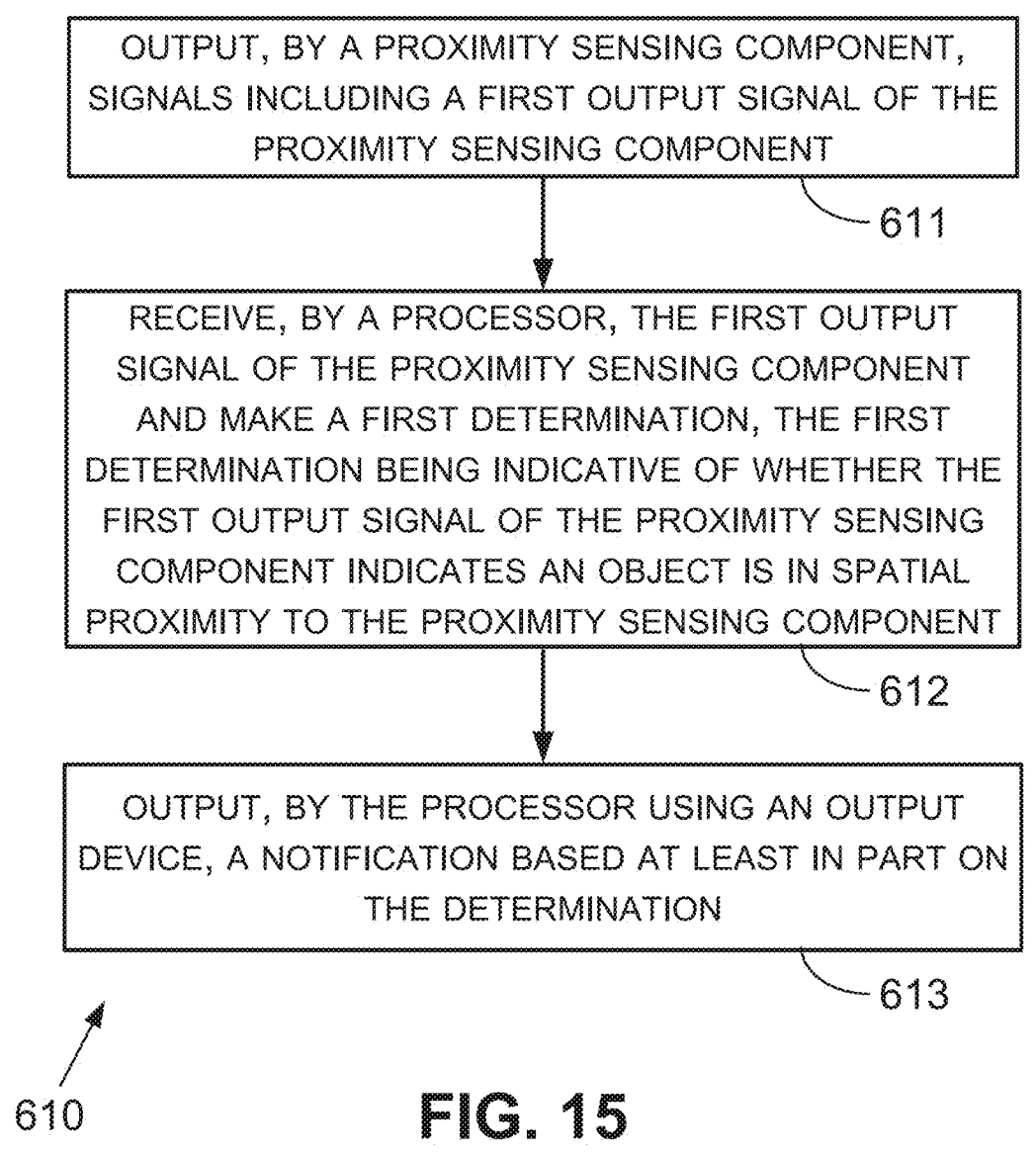

OUTPUT, BY A PROXIMITY SENSING COMPONENT, SIGNALS INCLUDING A FIRST OUTPUT SIGNAL OF THE PROXIMITY SENSING COMPONENT

~611

RECEIVE, BY A PROCESSOR, THE FIRST OUTPUT SIGNAL OF THE PROXIMITY SENSING COMPONENT AND MAKE A FIRST DETERMINATION, THE FIRST DETERMINATION BEING INDICATIVE OF WHETHER THE FIRST OUTPUT SIGNAL OF THE PROXIMITY SENSING COMPONENT INDICATES AN OBJECT IS IN SPATIAL PROXIMITY TO THE PROXIMITY SENSING COMPONENT

~612

OUTPUT, BY THE PROCESSOR USING AN OUTPUT DEVICE, A NOTIFICATION BASED AT LEAST IN PART ON THE DETERMINATION

OUTPUT, BY ONE OR MORE OF A DONGLE OR A BASE STATION, AN OUTPUT SIGNAL

621

RECEIVE, BY A PROCESSOR, THE OUTPUT SIGNAL

622

MAKE, BY THE PROCESSOR, A FIRST DETERMINATION BASED AT LEAST IN PART ON THE OUTPUT SIGNAL, THE FIRST DETERMINATION BEING INDICATIVE OF WHETHER THE DONGLE IS IN SPATIAL PROXIMITY OF THE BASE STATION

623

620

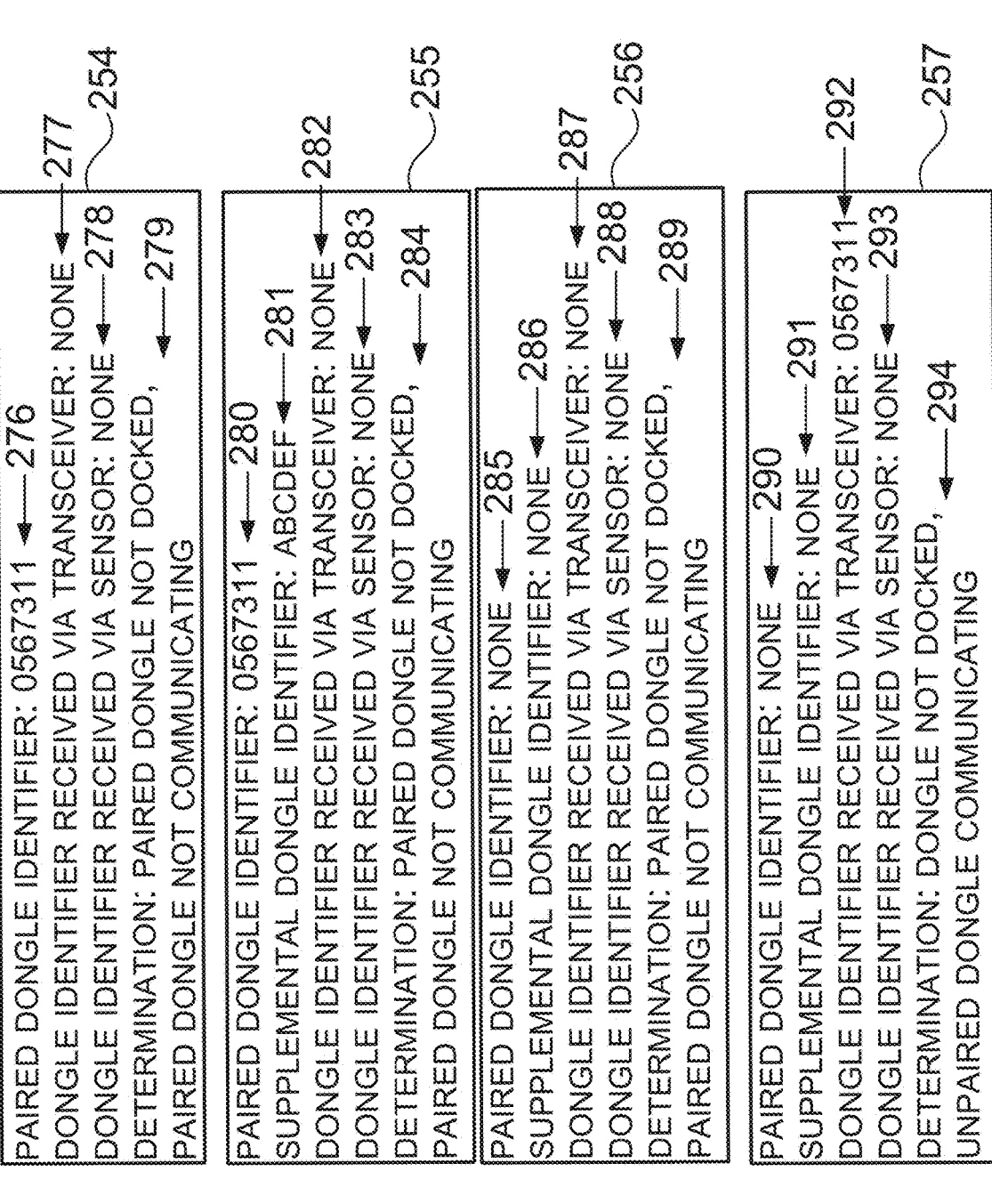

PAIRED DONGLE IDENTIFIER: 0567311 —276
DONGLE IDENTIFIER RECEIVED VIA TRANSCEIVER: NONE —277
DONGLE IDENTIFIER RECEIVED VIA SENSOR: NONE —278
DETERMINATION: PAIRED DONGLE NOT DOCKED,
PAIRED DONGLE NOT COMMUNICATING —279
—254

PAIRED DONGLE IDENTIFIER: 0567311 —280
SUPPLEMENTAL DONGLE IDENTIFIER: ABCDEF —281
DONGLE IDENTIFIER RECEIVED VIA TRANSCEIVER: NONE —282
DONGLE IDENTIFIER RECEIVED VIA SENSOR: NONE —283
DETERMINATION: PAIRED DONGLE NOT DOCKED,
PAIRED DONGLE NOT COMMUNICATING —284
—255

PAIRED DONGLE IDENTIFIER: NONE —285
SUPPLEMENTAL DONGLE IDENTIFIER: NONE —286
DONGLE IDENTIFIER RECEIVED VIA TRANSCEIVER: NONE —287
DONGLE IDENTIFIER RECEIVED VIA SENSOR: NONE —288
DETERMINATION: PAIRED DONGLE NOT DOCKED,
PAIRED DONGLE NOT COMMUNICATING —289
—256

PAIRED DONGLE IDENTIFIER: NONE —290
SUPPLEMENTAL DONGLE IDENTIFIER: NONE —291
DONGLE IDENTIFIER RECEIVED VIA TRANSCEIVER: 0567311 —292
DONGLE IDENTIFIER RECEIVED VIA SENSOR: NONE —293
DETERMINATION: DONGLE NOT DOCKED,
UNPAIRED DONGLE COMMUNICATING —294
—257

FIG. 18

316 ⌐ DISPLAY SCREEN(S)

COMPUTING SYSTEM 300

BASIC CONFIGURATION 301

SYS. MEM. 304

ROM/RAM

APPLICATIONS 305

ALGORITHM 306

PROGRAM DATA 307

SYSTEM DATA 308

PROCESSOR 302

MEMORY CONTROLLER 303

MEMORY BUS

309

GRAPHICS PROCESSING UNIT 314

A/V PORT(S) 315

OUTPUT INTERFACES 313

COM. INTERFACES 317

NETWORK CONT. 318

COMM. PORT(S) 319

STORAGE DEVICES 310

REM. STORAGE 311

NON-REM. STORAGE 312

320 ⌐ OTHER COMP. SYSTEM(S)

COMPUTER PROGRAM PRODUCT 330

SIGNAL BEARING MEDIUM 331

PROGRAM INSTRUCTIONS 332

COMPUTER READABLE MEMORY 333

COMPUTER RECORDABLE MEDIUM 334

COMMUNICATIONS MEDIUM 335

METHOD AND SYSTEM FOR DETERMINING WHETHER A DONGLE IS IN SPATIAL PROXIMITY TO A VEHICLE DIAGNOSTIC TOOL

REFERENCE TO RELATED APPLICATION

This application is a continuation application of U.S. patent application Ser. No. 17/465,843, filed on Sep. 3, 2021, entitled "Method and system for determining whether a dongle is in spatial proximity to a vehicle diagnostic tool," and published as United States Patent Application Publication No. 2023/0072266 A1 on Mar. 9, 2023. U.S. patent application Ser. No. 17/465,843 and United States Patent Application Publication No. 2023/0072266 A1 are incorporated herein by reference.

BACKGROUND

Some modern vehicles include computer-controlled components. In many instances, these components are controlled by an electronic control units (ECU). The electronic control units (ECUs) within a vehicle can communicate with one another as well as with an off-board diagnostic computing system. The off-board diagnostic computing system can be used while servicing a vehicle. Early on, off-board diagnostic computing systems including a display device connected to a vehicle using a wiring harness.

More recently, however, some off-board diagnostic computing systems have been implemented with a scan module that connects to and physically contacts an on-board diagnostic connector (OBDC) and with a display device that connects to the scan module wirelessly. In many off-board diagnostic computing systems, the scan module is relatively small as compared to the display device. As an example, the ZEUS® Diagnostic and Information System sold by Snap-on Incorporated of Kenosha, Wisconsin has a height of 20.9 centimeters (cm), a width of 31.6 cm, a depth of 5.1 cm (from a perspective looking at the system's screen in a landscape mode), and a volume of 3,368.2 cm². In contrast, a compact scan module configured to communicate with the ZEUS® Diagnostic and Information System has a height of 2.3 centimeters (cm), a width of 4.7 cm, a depth of 10.2 cm (from a perspective looking at an end of the module opposite the end including the vehicle connector), and a volume of 110.3 cm².

Due at least in part to the relatively small size of a scan module as compared to the size of a compatible display device, many technicians have lost a scan module, because the scan module was connected to a vehicle when the vehicle's owner drove away from the technician's repair shop only to never return to the repair shop. It would be beneficial to have a computing system, such as an off-board diagnostic computing system, that outputs notices regarding a companion device, such as scan module, being in proximity to the computing system.

OVERVIEW

In a first implementation, a system is provided. The system includes a dongle including a vehicle communication transceiver, a first wireless transceiver, and a vehicle connector. The system also includes a vehicle diagnostic tool including a first processor, a proximity sensing component, an output device, and a second wireless transceiver. The proximity sensing component is operable to output signals including a first output signal of the proximity sensing component. The first processor is operable to receive the first output signal of the proximity sensing component and make a first determination. The first determination is indicative of whether the first output signal of the proximity sensing component indicates an object is in spatial proximity to the proximity sensing component. The first processor is operable to output using the output device a notification based at least in part on the first determination. The vehicle communication transceiver is operable to perform a vehicle communication directly with a vehicle while the vehicle connector is connected to an on-board diagnostic connector of the vehicle. The second wireless transceiver is operable to communicate wirelessly with the first wireless transceiver to trigger a vehicle communication from the dongle to the vehicle while the vehicle connector is connected to the on-board diagnostic connector of the vehicle.

In a second implementation, a method performed by a dongle and a vehicle diagnostic tool is provided. The dongle includes a vehicle communication transceiver, a first wireless transceiver, and a vehicle connector. The vehicle diagnostic tool includes a first processor, a proximity sensing component, an output device, and a second wireless transceiver. The method includes outputting, by the proximity sensing component, signals including a first output signal of the proximity sensing component. The method also includes receiving, by the first processor, the first output signal of the proximity sensing component and making a first determination, the first determination being indicative of whether the first output signal of the proximity sensing component indicates an object is in spatial proximity to the proximity sensing component. Additionally, the method includes outputting, by the first processor using the output device, a notification based at least in part on the first determination. Furthermore, the method includes performing, by the vehicle communication transceiver, a vehicle communication directly with a vehicle while the vehicle connector is connected to an on-board diagnostic connector of the vehicle. Furthermore still, the method includes communicating, by the second wireless transceiver, wirelessly with the first wireless transceiver to trigger a vehicle communication from the dongle to the vehicle while the vehicle connector is connected to the on-board diagnostic connector of the vehicle.

In a third implementation, a method is provided. The method includes receiving, by a processor of a vehicle diagnostic tool, a first output signal of a proximity sensing component operable to output signals including the first output signal. The vehicle diagnostic tool includes an output device and a first wireless transceiver. The method also includes determining, by the processor based at least in part on the first output signal, a first determination that indicates whether an object is in spatial proximity to the proximity sensing component. The method further includes outputting, by the processor using the output device, a notification based at least in part on the first determination. The first wireless transceiver is operable to communicate wirelessly with a second wireless transceiver to trigger a vehicle communication from a dongle to a vehicle. The dongle includes the second wireless transceiver, a vehicle connector, and a vehicle communication transceiver. The vehicle communication transceiver is operable to perform a vehicle communication directly with the vehicle while the vehicle connector is connected to the on-board diagnostic connector of the vehicle.

In a fourth implementation, a vehicle diagnostic tool is provided. The vehicle diagnostic tool includes a processor, an output device, a first wireless transceiver, and non-transitory computer-readable data storage storing executable instructions. Execution of the executable instructions by the processor causes the vehicle diagnostic tool to receive, by the processor, a first output signal of a proximity sensing component, the proximity sensing component being operable to output signals including the first output signal. Execution of the executable instructions by the processor causes the vehicle diagnostic tool to determine, by the processor based at least in part on the first output signal, a first determination, the first determination indicating whether an object is in spatial proximity to the proximity sensing component. A vehicle diagnostic tool includes the processor, an output device, and a first wireless transceiver. Execution of the executable instructions by the processor causes the vehicle diagnostic tool to output, by the processor using the output device, a notification based at least in part on the first determination. The first wireless transceiver is operable to communicate wirelessly with a second wireless transceiver to trigger a vehicle communication from a dongle to a vehicle. The dongle includes the second wireless transceiver, a vehicle connector, and a vehicle communication transceiver. The vehicle communication transceiver is operable to perform a vehicle communication directly with the vehicle while the vehicle connector is connected to an on-board diagnostic connector of the vehicle.

In a fifth implementation, a non-transitory computer-readable data storage medium having stored thereon instructions executable by a processor to cause a vehicle diagnostic tool to perform functions is provided. The functions comprise receiving, by the processor, a first output signal of a proximity sensing component, the proximity sensing component being operable to output signals including the first output signal. The functions also comprise determining, by the processor based at least in part on the first output signal, a first determination, the first determination indicating whether an object is in spatial proximity to the proximity sensing component. The function further comprise outputting, by the processor using the output device, a notification based at least in part on the first determination. The first wireless transceiver is operable to communicate wirelessly with a second wireless transceiver to trigger a vehicle communication from a dongle to a vehicle. The dongle includes the second wireless transceiver, a vehicle connector, and a vehicle communication transceiver. The vehicle communication transceiver is operable to perform a vehicle communication directly with the vehicle while the vehicle connector is connected to an on-board diagnostic connector of the vehicle In a sixth implementation, a system is provided. The system includes a dongle. The dongle including a vehicle communication transceiver, a first wireless transceiver and a vehicle connector, the vehicle connector being removably connectable to an on-board diagnostic connector in a vehicle. The system also includes a vehicle diagnostic tool. The vehicle diagnostic tool including a processor and a second wireless transceiver. The system also includes a base station. The vehicle diagnostic tool and the dongle are dockable at and/or to the base station. The vehicle communication transceiver is operable to perform a vehicle communication directly with a vehicle while the vehicle connector is connected to the on-board diagnostic connector of the vehicle. The second wireless transceiver is operable to communicate wirelessly with the first wireless transceiver to trigger a vehicle communication from the dongle to the vehicle while the vehicle connector is connected to the on-board diagnostic connector of the vehicle. One of the dongle or the base station is operable to output an output signal. The processor is operable to receive the output signal. The processor is operable to make a first determination based at least in part on the output signal, the first determination being indicative of whether the dongle is in spatial proximity of the base station.

In a seventh implementation, a method is provided. The method is performed by a vehicle diagnostic tool and one or more of a dongle or a base station. The dongle includes a vehicle communication transceiver, a first wireless transceiver and a vehicle connector, the vehicle connector being removably connectable to an on-board diagnostic connector in a vehicle. The vehicle diagnostic tool includes a processor and a second wireless transceiver. The method includes outputting, by the one or more of the dongle or the base station, an output signal. The method also includes receiving, by the processor, the output signal. The method further includes making, by the processor, a first determination based at least in part on the output signal. The first determination being indicative of whether the dongle is in spatial proximity of the base station. The vehicle diagnostic tool and the dongle are dockable at and/or to the base station. The vehicle communication transceiver is operable to perform a vehicle communication directly with a vehicle while the vehicle connector is connected to the on-board diagnostic connector of the vehicle. The second wireless transceiver is operable to communicate wirelessly with the first wireless transceiver to trigger a vehicle communication from the dongle to the vehicle while the vehicle connector is connected to the on-board diagnostic connector of the vehicle.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 9A, FIG. 9B, FIG. 9C, FIG. 9D, FIG. 9E1, FIG. 9E2, and FIG. 9F show a section view corresponding to section lines shown in FIG. 8A, FIG. 8B, FIG. 8C, FIG. 8D, FIG. 8E, FIG. 8E, and FIG. 8F, respectively, in accordance with the example implementations.

FIG. 14, FIG. 15, and FIG. 16 each show a flowchart depicting a set of functions of a method in accordance with the example implementations.

FIG. 17 and FIG. 18 show data sets in accordance with the example implementations.

Figure 1:
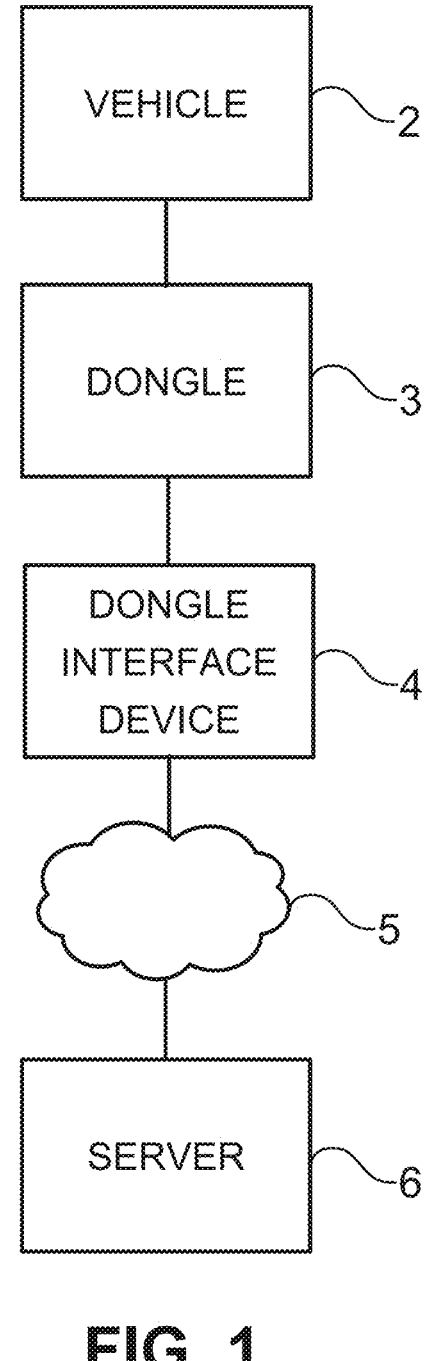
FIG. 1, FIG. 2, and FIG. 3 show example systems in accordance with the example implementations.

All the figures are schematic and not necessarily to scale.

DETAILED DESCRIPTION

I. Introduction

This description describes several example implementations, at least some of which pertain to improved vehicle diagnostic systems, improved components of a vehicle diagnostic system, or methods performed by a vehicle diagnostic system and/or by a component of vehicle diagnostic system. In at least some implementations, the vehicle diagnostic system includes one or more from among a vehicle diagnostic tool, a dongle, or a base station, and one or more of the vehicle diagnostic tool, the dongle, or the base station includes a proximity sensing component. In at least some implementations, the proximity sensing component includes a proximity sensor. In those or in other implementations, two or more distributed proximity sensing components can function as a proximity sensor.

A processor, such as a processor at the vehicle diagnostic tool or the base station can determine whether or not the dongle is in proximity to the vehicle diagnostic tool or the base station. The determination (i.e., a proximity determination) can be based at least in part on a signal output by a proximity sensing component. The vehicle diagnostic tool can notify the base station of the proximity determination, and vice versa. In response to making a proximity determination, the processor at the vehicle diagnostic tool or the processor at the base station can cause the vehicle diagnostic tool or the base station, respectively to perform a function.

In one respect, performing the function can include launching an application that the processor is not executing at the time of making the proximity determination. The application can, for example, include an application that is executable to transmit a vehicle data message and/or receive a vehicle data message. The processor can be configured to launch that application in response to determining the dongle is no longer in proximity to the vehicle diagnostic tool or the base station and based on the likelihood that the dongle will soon be connected to a vehicle connector to communicate a vehicle data message. As another example, the application can include an application that is executable by the processor to check the availability of a computer-readable data update for the dongle. The processor can be configured to launch this application in response to determining that the dongle is now in proximity to the vehicle diagnostic tool or the base station such that the dongle can be updated with the computer-readable data update.

Furthermore, since the dongle provides the vehicle diagnostic tool with an ability to communicate with a vehicle, determining that the dongle is no longer in proximity to the vehicle diagnostic tool or the base station can indicate to the processor that a user has removed the dongle from the vehicle diagnostic tool or the base station and is preparing to connect the dongle to a vehicle. Accordingly, in response to determining that the dongle is no longer in proximity to the vehicle diagnostic tool or the base station, the vehicle diagnostic tool can begin monitoring for communications from the dongle. Such communications can indicate that the dongle has powered on as a result of being connected to a vehicle. Additionally, the vehicle diagnostic tool can responsively launch an application configured to send vehicle data messages to the vehicle via the dongle.

In another respect, performing the function in response to making the proximity determination can include stopping execution of an application that the processor is executing at the time of making the determination. For example, if the proximity determination indicates that the dongle is within proximity to the vehicle diagnostic tool or the base station, the processor can be configured to determine that the dongle is no longer connected to the vehicle. In at least some implementations, since the dongle is no longer connected to the vehicle, an application for communicating with the vehicle using vehicle data messages does not need to be executed. Accordingly, the processor can stop execution of the vehicle communication application.

In yet another respect, performing the function in response to making the proximity determination can include executing a function of an application being executed at the time of making the determination. For example, if a vehicle session application that stores vehicle data with respect to a particular vehicle is being executed at the time of making the proximity determination, the processor can continue executing the vehicle session application. If the proximity determination indicates that the dongle is in proximity to the vehicle diagnostic tool or the base station, continuing to execute the vehicle session application can include automatically ending a vehicle session for a particular vehicle, clearing an identified vehicle such that the vehicle diagnostic tool is ready to identify a different vehicle, outputting a notification prompting a user to indicate whether ending the vehicle session is desired, or outputting a notification prompting a user to indicate whether clearing a vehicle is desired.

In still yet another respect, performing the function in response to making the proximity determination can include outputting a notification based on a proximity determination that indicates the dongle is not in proximity to the vehicle diagnostic tool or the base station and is no longer communicating with the vehicle diagnostic tool. The notification can prompt a technician to retrieve a dongle connected to a vehicle before that vehicle leaves a repair shop where the technician is located.

Furthermore still, in at least some implementations, the vehicle diagnostic tool includes a recess in which the dongle can be disposed while the dongle is not in use. A proximity sensing component, such as a proximity sensor, can output a signal that indicates whether an object, such as the dongle, is disposed within the recess. The processor of the diagnostic tool can determine whether the object is in the recess based on the output signal of the proximity sensing component. In those or in other implementations, the base station can be used to store the dongle while the dongle is not in use. The base station can include a proximity sensing component to determine whether the dongle is in proximity of the base station.

II. Example Systems and System Components

A. Systems

FIG. 1 shows a system 1 in accordance with the example implementations. The system 1 includes a vehicle 2, a dongle 3, a dongle interface device 4, a communication network 5, and a server 6.

The vehicle 2, for example, can include an automobile. Other examples and details regarding the vehicle 2 are described in Section VI of this description. Moreover, an example vehicle is shown in and described with respect to FIG. 20.

The dongle 3 is a computing device that is removably, directly connectable to an onboard diagnostic connector within the vehicle 2, and that is configured to wirelessly transmit vehicle data received from the vehicle 2. The dongle 3 is configured to communicate directly with the vehicle 2. The communication between the dongle 3 and the vehicle 2 can be in the form of a vehicle data message described in Section VI of this description. Further details regarding the dongle 3 are shown in and described with respect to FIG. 4.

Figure 2:
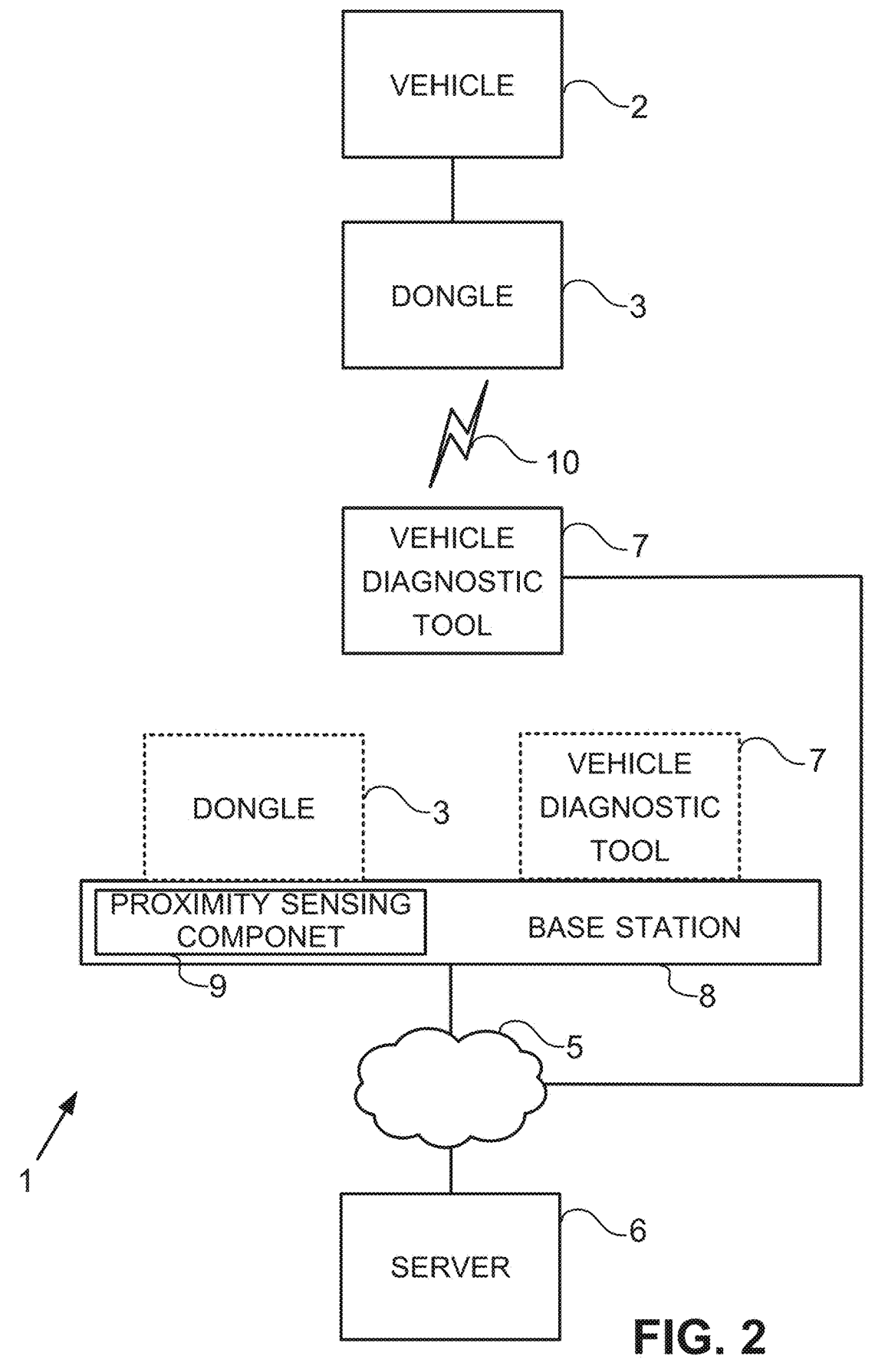

The dongle interface device 4 is a device configured to communicate directly with the dongle 3 and indirectly with the vehicle 2 via the dongle 3. An example implementation of the dongle interface device is shown in FIG. 2. In at least some implementations, the dongle interface device 4 is configured to communicate via the communication network 5.

The communication network 5 is a network configured to carry communications between multiple components. The communication network 5 can include a wired network and/or a wireless network. The communication network 5 can include a local area network and/or a wide area network, such as the internet.

The server 6 is a computing system configured to perform a service for another component of the system 1. As an example, the server 6 can perform a service for the dongle interface device 4 based on a communication the dongle interface device 4 receives from the vehicle 2 via the dongle 3. In at least some implementations, the service performed by the server 6 includes transmitting computer-readable data to the dongle interface device 4. The computer-readable data transmitted to the dongle interface device 4 can include firmware and/or software to update the dongle 3. In those or in other implementations, the service performed by the server 6 includes transmitting computer-readable data to the vehicle diagnostic tool 7, such as diagnostic information to be displayed on a display while the vehicle diagnostic tool 7 is being used to diagnose the vehicle 2. As an example, the diagnostic information can include service procedure information, diagnostic flowcharts, component specifications and capacities, diagnostic trouble code descriptions, parameter identifier descriptions, among other information.

Next, FIG. 2 shows additional details of the system 1, in accordance with at least some of the example implementations. As shown in FIG. 2, the system 1 includes the vehicle 2, the dongle 3, the communication network 5, the server 6, a vehicle diagnostic tool 7, a base station 8, and a proximity sensing component 9. The dongle interface device 4 shown in FIG. 1 can include the vehicle diagnostic tool 7 and/or the base station 8. In at least some implementations, the base station 8 includes a proximity sensing component 9.

Figure 5:
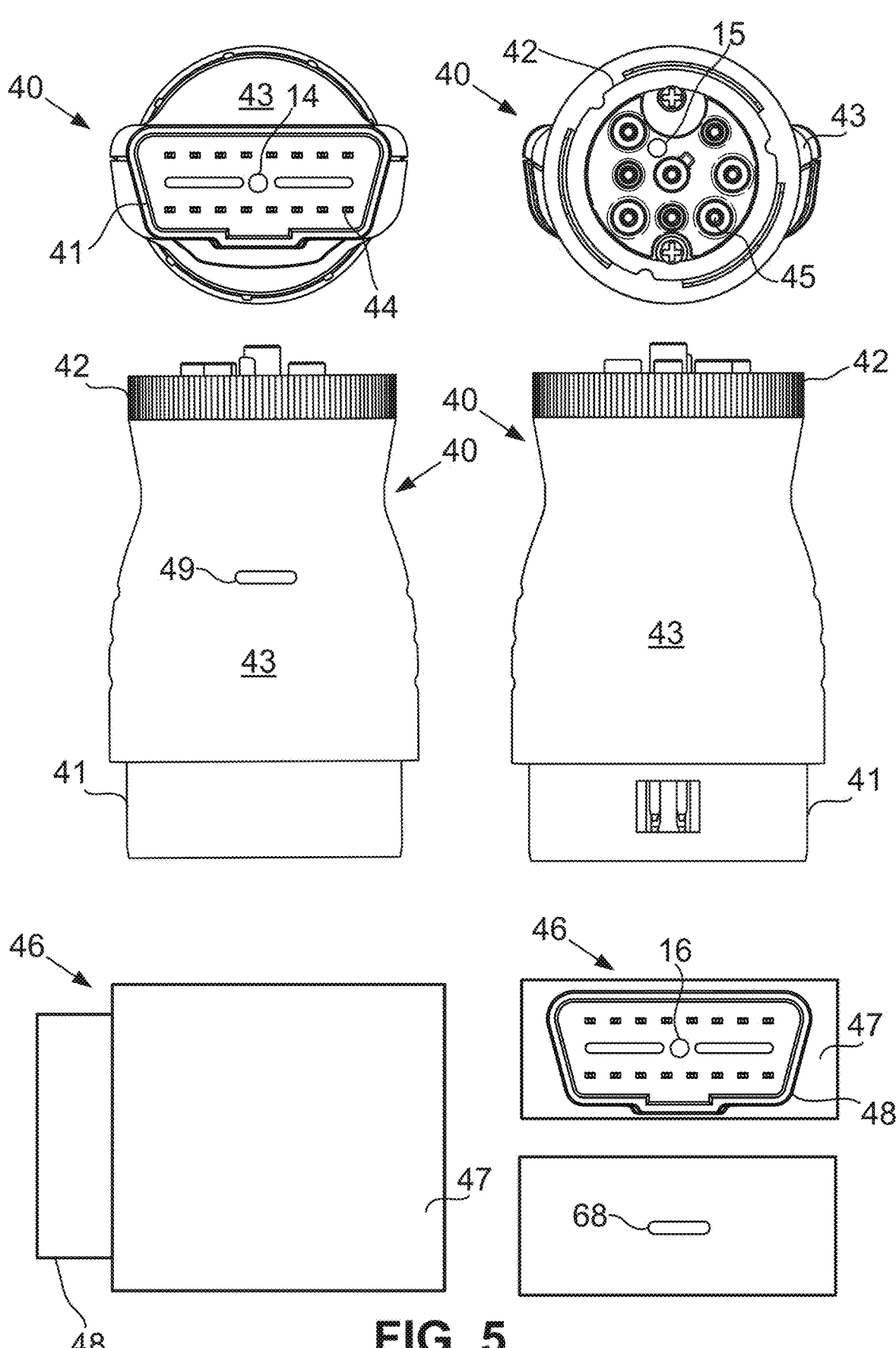
FIG. 5 shows various views of a dongle in accordance with the example implementations.

The vehicle diagnostic tool 7 includes and/or is a computing system configured to communicate directly or indirectly with the vehicle 2. The direct communication occurs via a wired connection, such as a harness connecting the vehicle diagnostic tool 7 and the vehicle 2. The indirect communication occurs via the dongle 3. Direct communications between the vehicle 2 and the vehicle diagnostic tool 7 include vehicle data messages. Indirect communications between the vehicle 2 and the vehicle diagnostic tool 7 by way of the dongle 3 can include vehicle data messages and/or data contained within a vehicle data message. A vehicle data message can include a diagnostic vehicle data message transmitted by the vehicle 2 in response to a vehicle data message transmitted by the vehicle diagnostic tool 7. The vehicle diagnostic tool 7 can include a user interface. The user interface can display a vehicle data message transmitted by the vehicle 2 and/or data contained within a vehicle data message. The user interface can include a user-selectable control selectable to cause the vehicle diagnostic tool 7 to transmit a vehicle data message. Additional details regarding the vehicle diagnostic tool 7 are shown in FIG. 5.

In accordance with the implementations shown in FIG. 2, the dongle 3 and the vehicle diagnostic tool 7 include respective wireless communication transceivers so that the dongle 3 and the vehicle diagnostic tool 7 can communicate with each other over a radio network 10.

The vehicle diagnostic tool 7 can be used to perform diagnostics with respect to the vehicle 2 (i.e., to diagnose the vehicle 2). In at least some implementations, the vehicle diagnostic tool 7 can be used for activities with respect to the vehicle 2 besides diagnosing the vehicle 2. For example, the vehicle diagnostic tool 7 can be used to service and/or repair the vehicle 2. Servicing and/or repairing the vehicle 2 can, for example, include one or more of: programming a component in the vehicle 2 (i.e., a vehicle component), reprogramming a vehicle component, resetting a vehicle component, or performing maintenance to a vehicle component.

The base station 8 is a device at which the dongle 3 and the vehicle diagnostic tool 7 can be docked. Docking the dongle 3 and/or the vehicle diagnostic tool 7 to the base station 8 can occur in various ways. For example, docking the dongle 3 to the base station 8 can occur by connecting a connector of the dongle 3 to a connector (e.g., a first connector) at the base station 8. Similarly, docking the vehicle diagnostic tool 7 to the base station 8 can occur by connecting a connector of the vehicle diagnostic tool 7 to a connector (e.g., a second connector) at the base station 8. The connector(s) of the base station 8 (e.g., the first and second connectors) can be fixed within the base station 8. Alternatively, a connector of the base station 8 can be positioned at an end of a harness connected to the base station 8. As another example, docking the dongle 3 and/or the vehicle diagnostic tool 7 to the base station 8 can occur by placing the dongle 3 or the vehicle diagnostic tool 7 upon the base station 8.

In at least some implementations, the base station 8 includes a battery charger configured to charge the dongle 3 (e.g., charge a power supply 26 shown in FIG. 4) when the dongle 3 is docked at the base station 8 and/or to charge the vehicle diagnostic tool 7 (e.g., charge a power supply 56 shown in FIG. 6) when the vehicle diagnostic tool 7 is docked at the base station 8.

In at least some implementations, the base station 8 is connected to the communication network 5. In those implementations, the base station 8 can receive computer-readable data (e.g., software or firmware) for updating the dongle 3 and/or the vehicle diagnostic tool 7 when docked at the base station 8. The base station 8 can operatively couple to the communication network 5 wirelessly or via a wired communication link.

The proximity sensing component 9 is configured to output a signal indicative of whether an object, such as the dongle 3 and/or the vehicle diagnostic tool 7 is in proximity to the proximity sensing component 9, as well as in proximity to the base station 8. The object being in proximity to the proximity sensing component 9 and/or the base station 8 can include the object being in physical contact with the proximity sensing component 9 and/or the base station 8. In at least some implementations, that physical contact can occur via a wired harness, such as a USB harness arranged according to a USB specification. Alternatively, the object being in proximity to the proximity sensing component 9 and/or the base station 8 can include at least a portion of the object being within a particular range between the object and the proximity sensing component 9 and/or the base station 8. As an example, the proximity sensing component 9 outputting the signal can include the proximity sensing component 9 outputting the signal to a processor in the base station 8 (e.g., a processor 200 shown in FIG. 12) or to the vehicle diagnostic tool 7.

As an example, the range between the object and/or the proximity sensing component 9 and/or the base station 8 can be less than or equal to a depth "D" (e.g., the depth 185 shown in FIG. 10) of the recess 89. As another example, the range between the object and/or the proximity sensing component 9 and/or the base station 8 can be defined in millimeters (mm), such 0 to 10 mm, 0 to 20 mm, 0 to 30 mm, or 0 to 40 mm. Due to capabilities or settings of some proximity sensing components (e.g., a normal or wide angle setting for an optical proximity sensing component), the proximity sensing component many not be able to sense an object in contact with the proximity sensing component. Accordingly, the aforementioned ranges can alternatively be described as less than (<) the greatest number in the range, such as <10 mm, <20 mm, <30 mm, or <40 mm, respectively.

Figure 3:

Next, FIG. 3 shows details of the system 1, in accordance with at least some of the example implementations. As shown in FIG. 3 (similar to FIG. 2), the system 1 includes the vehicle 2, the dongle 3, the communication network 5, the server 6, a vehicle diagnostic tool 7, a base station 8, and a proximity sensing component 9.

In the arrangement shown in FIG. 3, the dongle 3, the server 6, the vehicle diagnostic tool 7 and the base station 8 are operatively coupled to the communication network 5. The dongle 3 can couple to the communication network 5 wirelessly over a radio network 11. As an example, the radio network 11 can carry communications using a Wi-Fi communication protocol or a cellular communication network. The server 6, the vehicle diagnostic tool 7, and the base station 8 can couple to the communication network 5 wirelessly and/or over a wired network link. The dongle 3, when docked to the base station 8, can couple to the communication network 5 over a wired network link.

In accordance with at least some of the implementations shown in FIG. 3, the vehicle diagnostic tool 7 can transmit a request to the server 6. The request can include a request for the dongle 3 to transmit a vehicle data message to the vehicle 2. The server 6 can transmit to the dongle the request for the dongle 3 to transmit the vehicle data message to the vehicle 2. The dongle 3 can transmit the vehicle data message to the vehicle 2. Those requests can be transmitted in the listed order. Moreover, the vehicle 2 can transmit a vehicle data message to the dongle 3, the dongle 3 can transmit the vehicle data message or data representing data in the vehicle data message to the server 6, and the server 6 can transmit the vehicle data message or data contained the vehicle data message to the vehicle diagnostic tool 7. Those transmissions can be transmitted in the listed order.

In at least some of these implementations, the dongle 3 and/or the server 6 act as a repeater to transmit the message it receives to in accordance with the transmission sequences listed above. The data contained in a vehicle data message can, for example, include an ECU identifier, a parameter identifier, data values corresponding to a parameter identifier, a diagnostic mode identifier, ECU calibration data, ECU programming data, a functional test request, or a reset request.

In at least some implementations, the dongle 3 can communicate with the server 6 directly via the communication network 5 (i.e., without having to connect to the vehicle diagnostic tool 7. In at least some implementations, the radio network 11 includes a cellular communication network and the dongle 3 includes a communication transceiver configured to communicate over the cellular communication network. In those or in other implementations, the radio network can include a wireless LAN operating under a WI-FI® standard or a BLUETOOTH® standard. In these other standards, the dongle 3 can be configured to pair with or via another computing device, such as a smartphone or tablet device. In this way, the dongle 3 can communicate with the server 6 via a wireless LAN operating at a residence of an owner of the vehicle 2 or via the other computing device.

In some cases, the dongle 3 determines a condition and transmits directly to the server 6 a communication indicative of the condition. As an example, the condition can indicate a condition of the vehicle 2, such as a condition indicating the vehicle 2 is malfunctioning. As another example, the condition can include data indicating an identifier of the vehicle to which the dongle 3 is connected and which ECU the dongle 3 has been communicating with. As yet another example, the condition can indicate a time threshold has been reached and the dongle 3 transmits a status of the vehicle 2 determined by the dongle 3. The time threshold could, for example, be a threshold of one day or one week of the dongle 3 being connected to the vehicle 2. Other examples of the time threshold are also possible. Moreover, the server 6 can be configured to communicate communications received from the dongle 3 to one or more other components, such as the vehicle diagnostic tool 7 or another server, such as an e-mail server or a shop management system server. A server communicating with or for the dongle 3 can perform an authentication to insure an account associated with an owner of the dongle 3 is in good standing, confirm valid credentials exist, confirm an active session exists, confirm a seed and key.

B. Dongles and System Components

Figure 4:
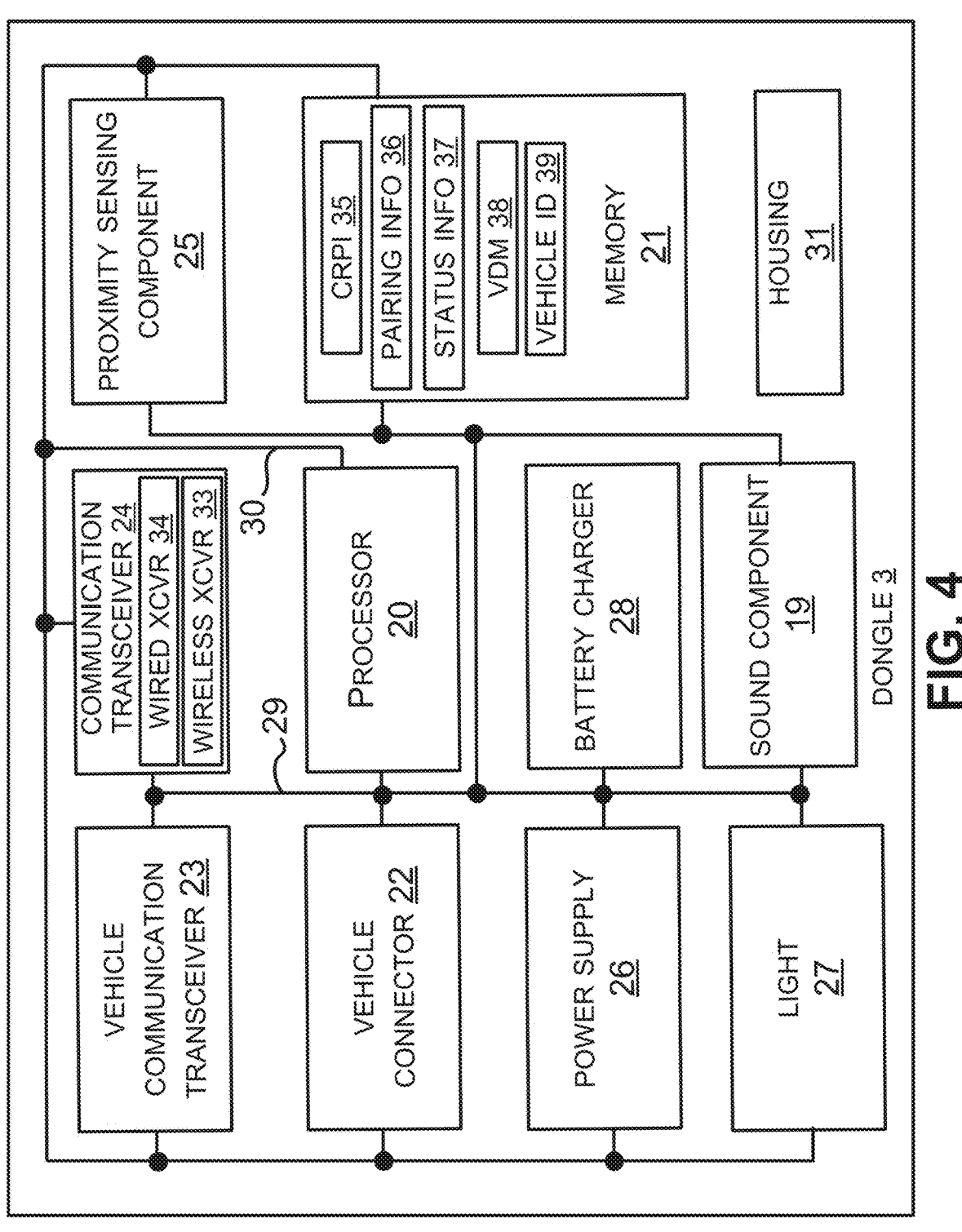
FIG. 4 is a block diagram of a dongle in accordance with the example implementations.

Next, FIG. 4 is a block diagram of the dongle 3 in accordance with at least some of the example implementations. The dongle 3 includes one or more from among: a processor 20, a memory 21, a vehicle connector 22, a vehicle communication transceiver 23, a communication transceiver 24, a proximity sensing component 25, a power supply 26, a light 27, a battery charger 28, a sound component 19, or a housing 31. Two or more of the processor 20, the memory 21, the vehicle connector 22, the vehicle communication transceiver 23, the communication transceiver 24, the proximity sensing component 25, the power supply 26, the light 27, the battery charger 28 or the sound component 19 can be operatively coupled to each other by a circuit 30. The circuit 30 can include one or more circuits, such as one or more electrical or optical circuits. The operative coupling provided by the circuit 30 allows for two or more components of the dongle 3 to communicate with and/or signal each other. As an example, the circuit 30 can include a communication bus, such as a serial or parallel communication bus that carries digital signals. As another example, the circuit 30 can include an electrical circuit that carries an analog signal to an analog input of the processor 20. The dongle 3 can be referred to a compact scan module.

In at least some implementations, the dongle 3 includes, the vehicle connector 22, the vehicle communication transceiver 23, and the communication transceiver 24, but not the processor 20, the memory 21, the proximity sensing component 25, the power supply 26, the light 27, the battery charger 28, the sound component 19, or the housing 31. In those implementations, the dongle 3 can function as a repeater of a VDM received from the vehicle 2 and/or the vehicle diagnostic tool 7. In other words, the dongle 3 can re-transmit a VDM it received.

In at least some other implementations, the dongle 3 includes the processor 20, the memory 21, the vehicle connector 22, the vehicle communication transceiver 23, and the communication transceiver 24, but not the proximity sensing component 25, the power supply 26, the light 27, the battery charger 28, the sound component 19, or the housing 31. In yet at least some other implementations, the dongle 3 includes the processor 20, the memory 21, the vehicle connector 22, the vehicle communication transceiver 23, and the communication transceiver 24, and the component(s) represented by an X in any row in Table A. In yet at least still some other implementations, the dongle 3 includes the vehicle connector 22, the vehicle communication transceiver 23, and the communication transceiver 24, and the component(s) represented by an X in any row in Table A.

TABLE A

| Proximity sensing component 25 | Power supply 26 | Light 27 | Battery charger 28 | Sound component 19 | Housing 31 |
|---|---|---|---|---|---|
| X |  |  |  |  |  |
|  | X |  |  |  |  |
|  |  | X |  |  |  |
|  |  |  | X |  |  |
|  |  |  |  | X |  |
|  |  |  |  |  | X |
| X | X |  |  |  |  |
| X |  | X |  |  |  |
| X |  |  | X |  |  |
| X |  |  |  | X |  |
| X |  |  |  |  | X |
|  | X | X |  |  |  |
|  | X |  | X |  |  |
|  | X |  |  | X |  |
|  | X |  |  |  | X |
|  |  | X | X |  |  |
|  |  | X |  | X |  |
|  |  | X |  |  | X |
|  |  |  | X | X |  |
|  |  |  | X |  | X |
|  |  |  |  | X | X |
| X | X | X |  |  |  |
| X | X |  | X |  |  |
| X | X |  |  | X |  |
| X | X |  |  |  | X |
| X |  | X | X |  |  |
| X |  | X |  | X |  |
| X |  | X |  |  | X |
| X |  |  | X | X |  |
| X |  |  | X |  | X |
| X |  |  |  | X | X |
|  | X | X | X |  |  |
|  | X | X |  | X |  |
|  | X | X |  |  | X |
|  |  | X | X | X |  |
|  |  | X | X |  | X |
|  |  |  | X | X | X |

As shown in Table A, in at least some implementations, the dongle 3 does not include the proximity sensing component 25. Even so, the dongle 3 can include a component that a proximity sensing component in another device, such as the vehicle diagnostic tool 7 or the base station 8, can use to determine the dongle is in proximity to the proximity sensing component (and in turn, the device including the proximity sensing component). As an example that component in the dongle 3 used by the proximity sensing component 25 can include the housing 31 and/or a permanent magnet.

1. Processor

Figure 6:
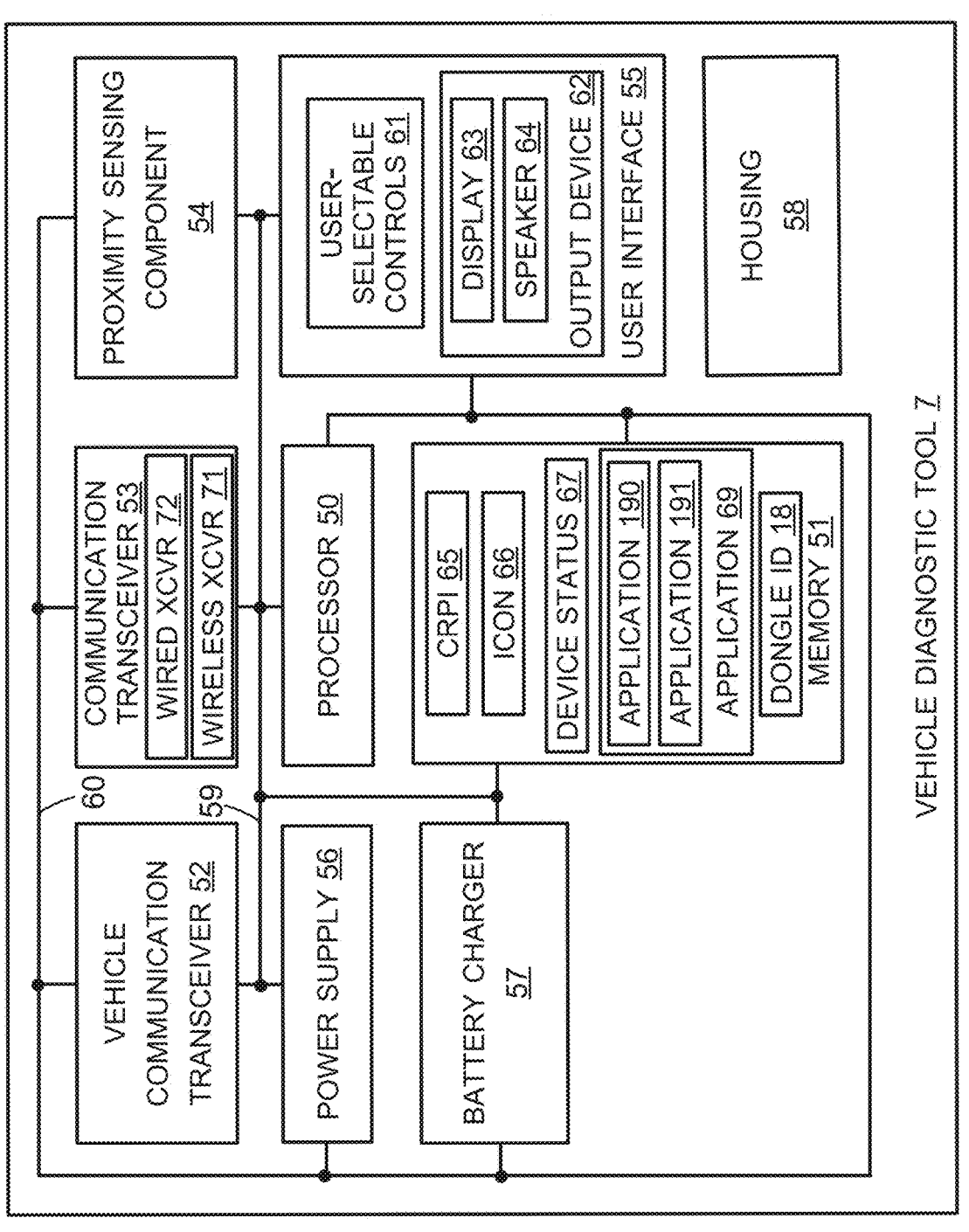
FIG. 6 is a block diagram of a vehicle diagnostic tool in accordance with the example implementations.
Figure 12:
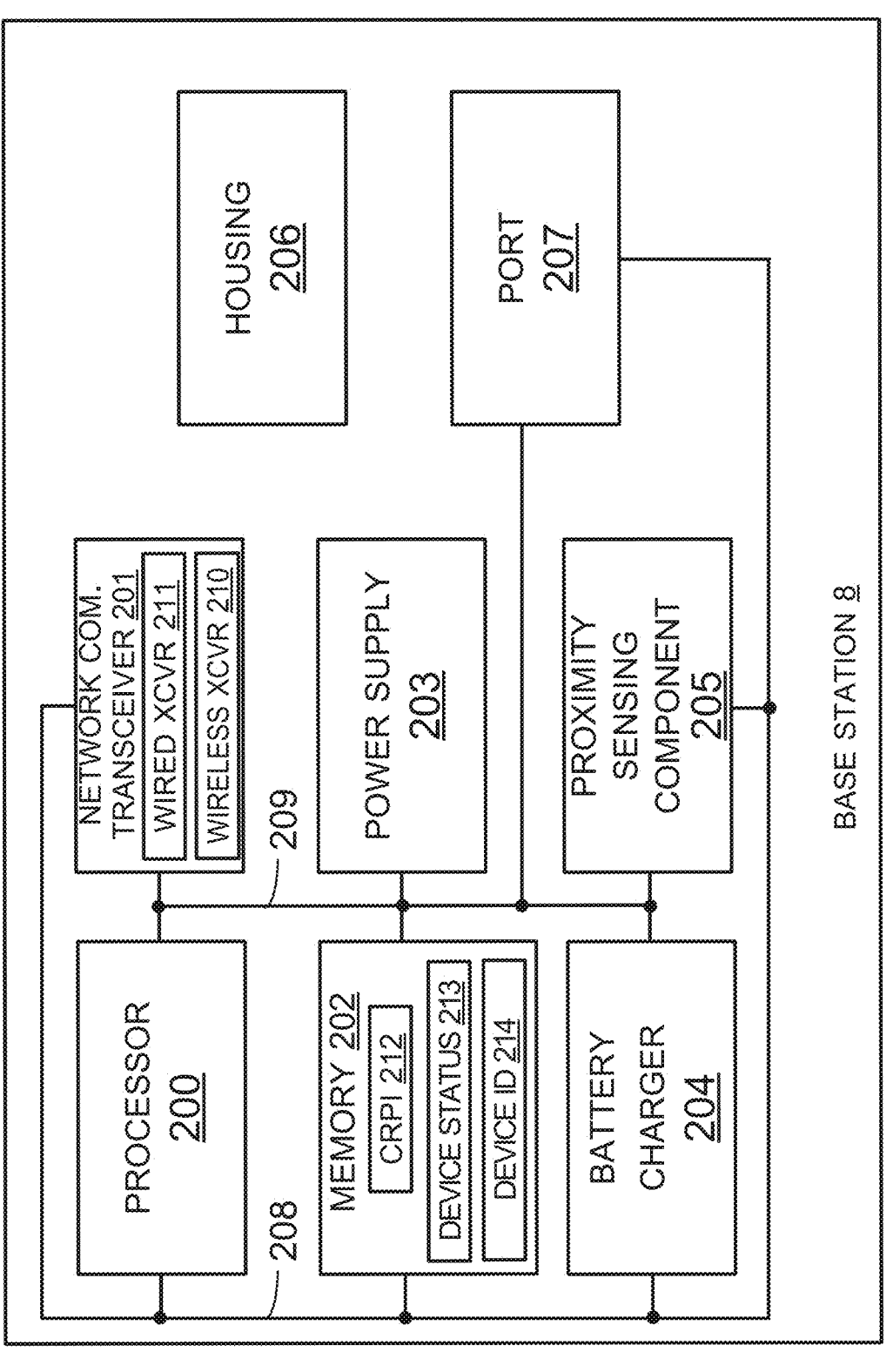
FIG. 12 is a block diagram of a base station in accordance with the example implementations.

A processor, such as the processor 20, the processor 50 shown in FIG. 6, the processor 200 shown in FIG. 12, can include one or more processors. A processor can thus be referred to as "at least one processor" and/or "one or more processors." Furthermore, a processor can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, a processor can include and/or be operatively connected to a memory controller that controls a flow of data going to and from a memory, such as the memory 21, a memory 51 shown in FIG. 6, or a memory 202 shown in FIG. 12.

A processor can be operable to execute computer-readable program instructions (CRPI). The CRPI can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. A processor can be operable to execute hard-coded functionality in addition to or as an alternative to software-coded functionality (e.g., via CRPI). In at least some implementations of the dongle 3, the processor 20 is a specific processor that is programmed to perform any function(s) described in this description as being performed by the dongle 3.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 21, the memory 51, or the memory 202, can include one or more memories. A memory can thus be referred to as "at least one memory" and/or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a tangible, volatile or non-volatile, storage component, such as an optical, magnetic, organic or other memory or disc storage component. Additionally or alternatively, a non-transitory memory can include or be operable as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be operable as a removable storage device, a non-removable storage device, or a combination thereof. A removable storage and/or a non-removable storage device can include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication link, such as the communication network 5, or over a circuit, such as the circuit 30, a circuit 60 shown in FIG. 6, or a circuit 208 shown in FIG. 12.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the vehicle communication transceiver 23, the communication transceiver 24, a vehicle communication transceiver 52 shown in FIG. 6, a communication transceiver 53 shown in FIG. 6, or a network communication transceiver 201 shown in FIG. 12, can include one or more transceivers. For example, the vehicle communication transceiver 23 can include one or more vehicle communication transceivers, each configured to communicate using a respective vehicle data message (VDM) protocol. As another example and as shown in FIG. 4, the communication transceiver 24 includes a wireless transceiver 33 and a wired transceiver 34.

Each transceiver includes one or more transmitters operable to transmit data onto a communication network and/or onto a communication bus within the device or system including the transceiver. Each transceiver includes one or more receivers operable to receive data or a communication carried over a communication network and/or over a communication bus within the device or system including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. In some implementations, a transceiver can include a transmitter and a receiver in a single semiconductor chip. In at least some of those implementations, the semiconductor chip can include a processor.

For purposes of this description, a communication network can be operable as one or more from among a vehicle network, a non-vehicle network, or a multi-purpose network. In at least some implementations, a vehicle network is on-board the vehicle 2 and has an OBDC and one or more electronic controls units interconnected to the OBDC and/or to each other. In at least some implementations, the vehicle connector 22 of the dongle 3 is operatively connectable to the OBDC in the vehicle network. The non-vehicle network is off-board of the vehicle 2 and includes one or more network nodes outside of the vehicle 2. The multi-purpose network is contained at least partly within the vehicle 2 and at least partly off-board the vehicle 2. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an Institute of Electrical and Electronics Engineers (IEEE®) standard, such as (i) an IEEE® 802.11 standard for wireless local area networks (wireless LAN) (which is sometimes referred to as a WI-FI® standard) (e.g., 802.11a, 802.11b, 802.11g, 802.11n, 802.11ax, 802.11ay, 802.11ba, or 802.11be), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 5.1 or 5.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3:2010 standard for Near Field Communication (NFC) (i.e., an NFC standard), (xvi) the Sigfox communication standard, (xvii) the Neul communication standard, (xviii) the LoRaWAN communication standard, or (xix) a 5G new radio (5G NR) communication standard by the $3^{rd}$ Generation Partnership Project (3GPP) standards organization, such as the 5G NR, phase one or 5G NR, phase two communication standard. Other examples of the wireless communication standards or protocols are possible. The example standards can be referred to as protocols. Likewise the example protocols can be referred to as standards.

In at least some of the implementations, a transmitter, such as a transmitter within any transceiver described in this description, can be operable to transmit a signal (e.g., one or more signals or one or more electrical waves) carrying or representing data onto an electrical circuit (e.g., one or more electrical circuits). Similarly, a receiver, such as a receiver within any transceiver described in this description, can be operable to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification (e.g., a USB 2.0, USB 3.x, or USB 4 specification), a vehicle data message (VDM) protocol, or some other wired communication standard or protocol. Examples of a VDM protocol are listed in Section VI of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

The vehicle communication transceiver 23 includes one or more vehicle communication transceivers configured for transmitting and receiving vehicle data messages. In at least some implementations, a vehicle communication transceiver (VCT) meets the physical lay requirements of a VDM protocol. As an example, for a CAN FD VDM protocol discussed in this description, a VCT can include the TCAN1162X-Q1 Automotive CAN FD system basis chip with sleep mode and LDO (low dropout) output VCT available from Texas Instruments of Dallas, Texas. As another example, for an SAER J1850 VDM protocol discussed in this description, a VCT can include the 33390 Class B serial transceiver VCT available from NXP Semiconductors N.V., of Eindhoven, Netherlands. Other examples of a VCT for those two VDM protocols or for a different VDM protocol are also possible.

The data transmitted by the vehicle communication transceiver 23 can include a destination identifier or address of an ECU to which the data is to be transmitted. The data or communication transmitted by the vehicle communication transceiver 23 can include a source identifier or address of the dongle 3. The source identifier or address can be used to send a response to the dongle 3.

The communication transceiver 24 includes the wireless transceiver 33. In at least some implementations, the wireless transceiver 33 is configured to transmit communications to the vehicle diagnostic tool 7 and to receive communications from the vehicle diagnostic tool 7. As an example, those communications may occur using a BLUETOOTH® 5.1 or 5.2 standard or some other wireless communication standard. In at least some implementations, the wireless transceiver 33 is configured to transmit communications to the communication network 5 and to receive communications from the communication network 5. As an example, those communications may occur using a WI-FI® standard or some other wireless communication standard. In at least some implementations, the wireless transceiver 33 is configured to transmit communications to the base station 8 and to receive communications from the base station 8. As an example, those communications may occur using a BLUETOOTH® 5.1 or 5.2 standard or some other wireless communication standard.

In at least some implementations, the communication transceiver 24 includes the wired transceiver 34. As an example, the wired transceiver 34 is configured to transmit communications to the vehicle diagnostic tool 7 and/or the base station 8, and to receive communications from the vehicle diagnostic tool 7 and/or the base station 8. In at least some implementations, the wired transceiver 34 couples to a wired transceiver 72 (shown in FIG. 6) and/or to a wired transceiver 211 (shown in FIG. 12) via a wiring harness (e.g., a USB harness). In at least some implementations, the wired transceiver 34 is configured to transmit communications to the communication network 5 and to receive communications from the communication network 5. As an example, those communications may occur using an IEEE® 802.3 Ethernet communication standard for a LAN or some other wired communication standard.

In at least some implementations, the communication transceiver 24 includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) operable for communicating using an IEEE® 802.11 standard can be configured with a network name, a network security type, and a password. Some devices auto-negotiate this information through a discovery mechanism (e.g., a cellular phone technology).

The communication transceiver 24 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The communication transceiver 24 can be arranged to transmit an SMS message using a short message peer-to-peer protocol or using some other protocol.

4. Proximity Sensing Component

A proximity sensing component, such as the proximity sensing component 25, the proximity sensing component 9 shown in FIG. 2, the proximity sensing component 54 shown in FIG. 6, or the proximity sensing component 205 shown in FIG. 12, can include a single proximity sensing component or multiple proximity sensing components.

In at least some implementations, a first proximity sensing component outputs a signal that can be sensed (e.g., detected) by a second proximity sensing component. For example, the proximity sensing component 25 can output a signal that can be detected by the proximity sensing component 9 and/or the proximity sensing component 205. As another example, the proximity sensing component 54 can output a signal that can be detected by the proximity sensing component 9 and/or the proximity sensing component 205. A proximity sensing component that can detect the presence of another proximity sensing component can be referred to as a proximity sensor. Moreover, the proximity sensing component can output signals (e.g., a first output signal) to a processor. The proximity sensing components can be arranged in a single device or multiple devices so that an output signal of one proximity sensing component can be detected by another proximity sensing component in the single device or the other device. The proximity sensing component(s) can be selected based on a sensing distance specified for the proximity sensing components and the distance range for which two devices will be considered to be in proximity to each other if the devices are within that distance range.

In at least some implementations, a proximity sensing component can include a radio frequency receiver or a radio frequency transmitter, such as a radio frequency receiver or radio frequency transmitter, respectively, of a near-field communication system. The radio frequency receiver can output an electromagnetic field. The radio frequency transmitter can transmit data in the presences of the electromagnetic field. The radio frequency receiver can receive the data transmitted by the radio frequency transmitter and output a signal indicating that the radio frequency receiver is within proximity of the radio frequency transmitter. The first proximity sensing component discussed in the preceding paragraph can include a radio frequency transmitter of an NFC system and the second proximity sensing component discussed in the preceding paragraph can include a radio frequency receiver of an NFC system.

In at least some implementations, a proximity sensing component can detect that it is within proximity to an object and/or output a signal that indicates the proximity sensing component is within proximity to an object. In other words, the proximity sensing component can detect that the proximity sensing component and the object other than another proximity sensing component are within proximity to each other and/or output a signal that indicates the proximity sensing component and the object are within proximity to each other. As an example, the object other than another proximity sensing component can include a housing, such as a housing 31 shown in FIG. 4, a housing 58 shown in FIG. 6 or a housing 206 shown in FIG. 12. Moreover, a proximity sensing component can also detect that it is not within proximity to an object and/or output a signal that indicates the proximity sensing component is not within proximity to an object.

An output signal of a proximity sensing component that indicates the proximity sensing component is within proximity to an object can represent a first state of the proximity sensing component. An output signal of a proximity sensing component that indicates the proximity sensing component is not within proximity to an object can represent a second state of the proximity sensing component.

In at least some implementations, a proximity sensing component includes a light transmitter and a photoelectric receiver. The light transmitter can, for example, include an LED, such as an infrared LED, a visible light LED, or an ultraviolet LED; or a laser diode. The photoelectric receiver can, for example, include a photodiode, a solaristor, or a phototransistor. Other examples of the light transmitter and/or the photoelectric receiver are also possible.

In at least some implementations, a proximity sensing component includes a proximity sensor. The proximity sensor can output a signal indicative of an object being in proximity to the proximity sensor. Being in proximity to the proximity sensor can vary based on different factors, such as the type of proximity sensor being used, a level of an interfering signal, and/or a power level of another signal output by the proximity sensor (e.g., an output signal that is to be detected by the proximity sensor if reflected off of an object).

In at least some implementations that include a proximity sensor, the proximity sensor includes a photoelectric sensor. The photoelectric sensor can include a light transmitter (e.g., a light emitting diode (LED)), and a photoelectric receiver (e.g., a photodiode). The photoelectric sensor can, for example, include an infrared sensor or a visible light sensor. An infrared sensor can include an infrared LED configured to emit electromagnetic energy in the infrared spectrum, and a detector configured to detect electromagnetic energy, including at least electromagnetic energy in the infrared spectrum, such the electromagnetic energy emitted by the infrared LED and reflected off of an object. The infrared sensor can include an optical barrier between the infrared LED and the light detector. Similarly, a visible light sensor can include a visible light source configured to emit electromagnetic energy in the visible light spectrum, and a detector configured to detect electromagnetic energy, including at least electromagnetic energy in the visible light spectrum, such the electromagnetic energy emitted by the visible light source and reflected off of an object. The visible light sensor can include an optical barrier between the visible light source and the light detector. As an example, the visible light source can include an LED or a laser.

In at least some implementations that include a proximity sensor, the proximity sensor includes an ultrasonic sensor. Accordingly, the proximity sensing component can include the ultrasonic sensor. As an example, the proximity sensing component and/or ultrasonic sensor can include an ultrasonic transducer operable to emit an ultrasonic signal and to detect reception of an ultrasonic signal. As an example, an ultrasonic transducer can include a transmitter and a receiver in a single housing. The transmitter is configured to transmit an ultrasonic signal (i.e., sound waves) and the receiver is configured to receive the ultrasonic signal reflecting off of an object, and/or to detect reception of the ultrasonic signal. As another example, the ultrasonic transducer can house the transmitter and receiver in separate housings disposed across from one another proximate to an area where an object is to be detected. If no object is present in the area, the receiver can receive the sound waves transmitted by the transceiver. On the other hand, an object within the area can prevent the sound waves transmitted by the transceiver from reaching the receiver. A processor can determine an object is present in the spatial proximity to the proximity sensor by determining the transceiver is transmitting the sound waves, but the receiver is not receiving the sound waves.

In at least some implementations that include a proximity sensor, the proximity sensor includes a magnetic switch, such as a Hall effect switch or a reed switch, and a permanent magnet. The switch can switch from a first state to a second state during a movement of the dongle 3 and/or the vehicle diagnostic tool 7 such that the permanent magnet is in proximity to the proximity sensing component. Moreover, the switch is operable to switch from the second state to the first state during a movement of the dongle 3 and/or the vehicle diagnostic tool 7 such that the permanent magnet is not in proximity to the proximity sensing component. The signals including the first output signal of the proximity sensing component indicate whether the switch is in the first state (i.e., the dongle 3 is within spatial proximity of the vehicle diagnostic tool 7 and/or the proximity sensing component 54) or the second state (i.e., the dongle 3 is not within spatial proximity of the vehicle diagnostic tool 7 and/or the proximity sensing component 54).

FIG. 9E1 shows an example implementation with a proximity sensor in the vehicle diagnostic tool 7 and a permanent magnet 127, 128 in the dongle 3. For that implementation, the proximity sensor includes a proximity sensor switch, and the dongle 3 can be rotated 180 degrees clockwise or counter-clockwise as shown in FIG. 9E1 and still have a permanent magnet that can influence the proximity sensor. The processor 50 can receive a signal from the proximity sensor 129 that indicates the dongle 3 is in proximity to the proximity sensor 129.

In at least some implementations that include a proximity sensor, the proximity sensor includes a push button switch having a movable contact fixedly connected to a push button plunger. Accordingly, the proximity sensing component can include the push button switch. A spring can be used to move the push button plunger so that the movable contact does not contact another contact within the push button switch. The processor 50 can detect an object is within proximity to the push button switch when the those two contacts are contacting each other. Placement of the dongle 3 on and/or within a dongle dock can overcome the spring force such that the two contacts make contact with one another.

In at least some implementations that include a proximity sensor, the proximity sensor includes a capacitive proximity sensor. The capacitive proximity sensor can include two parallel plates configured as a capacitor. A processor can detect an object being in proximity to the proximity sensor or not being within proximity to the proximity sensor based on a change in the capacitance of the capacitor.

In at least some implementations that include a proximity sensor, the proximity sensor includes an inductive proximity sensor. The inductive proximity sensor can include a wound iron core configured as an inductor. A processor can detect an object being in proximity to the proximity sensor based on a change in the inductance of the inductor.

In at least some implementations that include a proximity sensor, the proximity sensor includes a proximity sensor component including a near-field communication (NFC) transmitter. An NFC transmitter can be an active NFC transmitter or a passive NFC transmitter. The NFC transmitter can store data, such as data including an identifier of the dongle 3, the vehicle diagnostic tool 7, or the base station 8.

As an example, the dongle 3 can include a passive radio frequency transmitter of an NFC system and the vehicle diagnostic tool 7 and/or the base station 8 can include a radio frequency receiver of an NFC system (i.e., an initiator) to supply an electromagnetic field that can induce a current in the passive NFC radio frequency transmitter when sufficiently close to the passive NFC radio frequency transmitter. The induced current can provide the passive NFC radio frequency transmitter with the power needed to transmit an identifier of the dongle 3 to the vehicle diagnostic tool 7 or the base station 8. The vehicle diagnostic tool 7 or the base station 8 can receive the identifier of the dongle 3 to determine that the dongle 3 is within a given proximity range to the vehicle diagnostic tool 7 or the base station 8. The dongle 3 equipped with an active NFC radio frequency transmitter can also transmit an identifier of the dongle 3 to the vehicle diagnostic tool 7 or the base station 8.

5. Power Components

A power supply, such as the power supply 26, a power supply 56 shown in FIG. 6, or a power supply 203 shown in FIG. 12, can be arranged in any of a variety of configurations. As an example, a power supply can include circuitry and/or a connector to receive an alternating current (AC) current from an AC electrical supply (e.g., electrical circuits operatively connected to an electrical wall outlet) and be operable to convert the AC current to a direct current (DC) for supplying to one or more of the components connected to the power supply. As another example, a power supply can include circuitry and/or a connector to receive a DC from a DC electrical supply (e.g., a Universal Serial Bus (USB) connector and circuitry corresponding to a standard pinout for the USB connector). As an example, the USB connector can be a USB-C connector.

As yet another example, a power supply can include a battery and/or be battery operated. The battery can include a rechargeable battery configured to be charged by a battery charger, such as the battery charger 28. In at least some implementations, the rechargeable battery includes a nickel-metal hydride (NiMH) battery, a lithium-ion (Li-ion) battery, or a lithium-ion polymer (LiPo) battery. As yet another example, a power supply can include a solar cell and/or be solar operated.

Additionally, a power supply can include and/or connect to a power distribution circuit to distribute electrical current throughout the device or system including that power supply. In at least some implementations of the dongle 3, the power distribution circuit includes an electrical power circuit 29 that connects the power supply 26 to one or more from among the processor 20, the memory 21, the vehicle connector 22, the vehicle communication transceiver 23, the communication transceiver 24, the proximity sensing component 25, the light 27, or the battery charger 28. Other examples of a power supply, such as the power supply 26, a power supply 56 shown in FIG. 6, or a power supply 203 shown in FIG. 12, are also possible.

Next, a battery charger, such as the battery charger 28, a battery charger 57 shown in FIG. 6, or a battery charger 204 shown in FIG. 12, can include one or more battery chargers. As an example, a battery charger can include a single battery charger configured to charge one or more batteries simultaneously, a battery charger configured to charge a single battery at any given time, or multiple battery chargers configured to charge one or more batteries at any given time.

A battery charger can include a wired battery charger that connects to the battery to be charged via wired electrical conductors. The wired battery charger can include and/or be connected to an AC to DC transformer/converter.

Additionally, or alternatively, a battery charger can include a wireless battery charger that outputs an electromagnetic field to generate a charging current. In at least some implementations, the wireless battery charger uses magnetic induction to generate a current to charge the battery. For instance, the battery charger 28, 57 can include a secondary coil configured to induce a current flow into the secondary coil when a magnetic field radiates from a primary coil. The primary coil can, for example, be disposed in the base station 8 (e.g., within the battery charger 204). In particular, the base station 8 can include a charging pad (having the primary coil) on which the dongle 3 or the vehicle diagnostic tool 7 can be placed such that the secondary coil is within range of the primary coil to be able to generate the induced current.

In at least some other implementations, the wireless battery charger uses magnetic resonance to generate a current to charge the battery. In these implementations, the battery charger 28, 57 includes a receiving, resonance coil tuned to resonate at a frequency matching a resonant frequency of a transmitting, resonance coil at a transmitting device, e.g., the base station 8. This battery charger may include a load coil and/or a rectifier to generate the current to charge the battery. The base station 8 may include an oscillator and source coil to induce a current within the transmitting, resonance coil.

6. Additional Components

A vehicle connector, such as the vehicle connector 22, includes a connector removably connectable to the vehicle 2. In particular, the vehicle connector 22 is removably connectable to an OBDC within the vehicle 2. In at least some implementations, the vehicle connector 22 and the OBDC in the vehicle 2 have complementary shapes that allow one of the vehicle connector 22 or the OBDC in the vehicle to be inserted into the other. The vehicle connector 22 may be arranged according to standard, such as (i) the Society of Automotive Engineers (SAE) J1962_199802 diagnostic standard dated Feb. 1, 1998 or an equivalent standard, (ii) a SAE J1939/13_201610 off-board diagnostic connector standard dated Oct. 25, 2016 or equivalent standard, (iii) or a 6-pin or 9-pin Deutsch truck connector for connecting to a compatible Deutsch truck connector with a similar number of pins, at least some of which are for carrying communications according to the SAE J1708 standard. In many cases, the vehicle connector 22 includes multiple electrical connector terminals that mate to electrical connector terminals in an on-board diagnostic connector within the vehicle 2. Additional details regarding an OBDC are described in Section VI of this description.

The light 27 is operable to emit electromagnetic waves in the visible light frequency range (i.e., visible light). A user can aim the light 27 at items within the vehicle 2. As an example, the user may aim the light 27 in proximity to a location where an onboard diagnostic connector is expected to be so that the user can find the onboard diagnostic connector and to connect the dongle 3 to the onboard diagnostic connector. The light 27 can include and/or be connected to a switch operable to turn the light on or off. In at least some implementations, the light 27 is powered by a battery of the power supply 26 so that the light 27 can be powered on even if the power supply 26 is not connected to an external power source, such as the vehicle 2, to provide electrical power for other components within the dongle 3.

The sound component 19 includes a component configured to emit a sound audible to a human being. As an example, the sound component 19 can include a speaker, a piezoelectric sounder, buzzer, or diaphragm, or some other component configured to emit an audible sound. The sound component 19 can be controlled to emit a sound to indicate the dongle 3 has powered on, the dongle 3 ceasing communication with the vehicle 2, the dongle 3 continues to be connected to the vehicle 2 after ceasing communication with the vehicle 2, and/or the dongle 3 is out of communication range or not receiving any communication from the vehicle diagnostic tool 7. Different sound patterns can be emitted by the sound component 19 for those example dongle communication states.

The housing 31 surrounds at least a portion of one or more of the following: the processor 20, the memory 21, the vehicle connector 22, the vehicle communication transceiver 23, the communication transceiver 24, the proximity sensing component 25, the power supply 26, the light 27, the battery charger 28, the electrical power circuit 29, or the circuit 30. The housing 31 can support a substrate. In at least some example implementations, at least a portion one or more of the following is mounted on and/or connected to the substrate: the processor 20, the memory 21, the vehicle connector 22, the vehicle communication transceiver 23, the communication transceiver 24, the proximity sensing component 25, the power supply 26, the light 27, the battery charger 28, the electrical power circuit 29, or the circuit 30. The housing 31 can be made from various materials. For example, the housing 31 can be made from a plastic material (e.g., acrylonitrile butadiene styrene (ABS)). Other examples of a material that forms the housing 31 are also possible.

7. Memory Content

The dongle 3 can determine, generate, store, transmit, receive, and/or otherwise use a variety of computer-readable data. At least some of the computer-readable data can be stored in a memory 21. The computer-readable data can include software and/or firmware. The software and/or firmware can include computer-readable program instructions (CRPI). The CRPI are executable by the processor 20. As an example, those CRPI can include program instructions that are executable to cause the dongle 3 to perform any function described as being performed by the dongle 3, the processor 20, some other component of the dongle 3 or by another other dongle shown in the drawings or described in this description. New firmware and/or software for the dongle 3 may be developed so that the dongle 3 is able to include new tests, new vehicle information, and/or enhanced applications to a database at and/or accessible by the server 6.

The computer-readable data within the memory 21 can include data received from the vehicle 2, the vehicle diagnostic tool 7, and/or the base station 8. As an example, the data from the vehicle 2 can include a vehicle data message or the content of a vehicle data message. In particular, the vehicle data message or the content thereof can include an identifier of an ECU that transmitted the message, a parameter identifier (PID) and a corresponding PID parameter value. The PID can indicate what the PID parameter value represents, such as a diagnostic trouble code, a sensor value, a vehicle identification number, a status value, a calculated value, a timer value, a ratio, a count, a position, a fuel type, a commanded value, a calibration identifier, an ECU name, among others.

As an example, the memory 21 contains one or more from among: computer-readable programming instructions (CRPI) 35, pairing information 36, status information 37, a vehicle data message 38, or a vehicle identifier 39. As an example, the CRPI 35 can includes software program instructions and data, and/or firmware program instructions and data. The pairing information 36 can include an address, name, profile, and common secret key for both itself and another device to which the dongle 3 is communicatively paired, such as the vehicle diagnostic tool 7 or the base station 8. The status information 37 can, for example, include information (i.e., data) indicative of a battery level status of the power supply 26, a revision level of the CRPI 35, or a dongle identifier corresponding to the dongle 3.

The vehicle data message 38 can include one or more VDMs. The one or more VDMs can include one or more VDMs received from the vehicle 2 and/or one or more VDMs received from the vehicle diagnostic tool 7. The VDM(s) received from the vehicle 2 and/or content within those VDM(s) can be destined for sending directly or indirectly to the vehicle diagnostic tool 7. The VDM(s) received from the vehicle diagnostic tool 7 can be destined for sending to the vehicle 2. In at least some implementations, the dongle 3 operates as a flight recorder storing VDMs within the vehicle data message 38 for subsequent retrieval via the vehicle diagnostic tool 7 or the server 6.

The vehicle identifier 39 can include a vehicle identifier received directly or indirectly from the vehicle diagnostic tool 7 and/or a vehicle identifier received from the vehicle 2. Examples of a vehicle identifier are discussed in Section VI of this description.

As another example, the CRPI 35 can include program instructions executable by the processor 20 perform any function described in this description as being performed by the dongle 3 or any component(s) of the dongle 3 or any other dongle described in this description.

As yet another example, the CRPI 35 can include program instructions executable by the processor 20 to determine a status of the power supply 26 (e.g., a percentage charge of a battery between 0% and 100%, inclusive) and to output data indicative of the power supply status.

As still yet another example, the CRPI 35 can include program instructions executable by the processor 20 to receive a VDM directly or indirectly from the vehicle diagnostic tool 7 using the communication transceiver 24, translate the received VDM from a first protocol (such as the a BLUETOOTH® 5.1 or 5.2 protocol) to a second protocol (such as a VDM protocol used by the vehicle 2), and to transmit the VDM to the vehicle 2 using the vehicle communication transceiver 23 according to the second protocol.

As still yet another example, the CRPI 35 can include program instructions executable by the processor 20 to receive from the vehicle diagnostic tool 7 a request to send a VDM to the vehicle 2. The processor 20 can further execute the program instructions to generate the VDM and to transmit the VDM to the vehicle 2.

8. Example Dongle

Next, FIG. 5 shows various views of a dongle 40, 46. The dongle 3 shown in other figures can be arranged like the dongle 40, 46. The dongle 40 includes a connector 41, 42 configured to be connected to an on-board diagnostic connector within a vehicle. Accordingly, FIG. 5 shows that a dongle can include multiple connectors connectable to an on-board diagnostic connector. The dongle 46 includes a connector 48 connectable to an on-board diagnostic connector. Accordingly, FIG. 5 shows that a dongle can include a single connector connectable to an on-board diagnostic connector. The dongle 3 is a computing device and/or can be referred to as a computing device.

The dongle 40 includes a housing 43. Similarly, the dongle 46 incudes a housing 47. The housing 43, 47 is an example of the housing 31 shown in FIG. 4. As shown in FIG. 5, a housing, such as the housing 47, can be shaped like a rectangular prism, whereas other housing, such as the housing 43, can have different shapes. A dongle housing can include multiple housing pieces. For example, the housing 43, 47 can each have two housing pieces that snap together. The dongle 40 includes an electrical connector terminal 44 within the on-board diagnostic connector 41, and an electrical connector terminal 45 within the connector 42. The on-board diagnostic connector 41 includes fifteen other electrical connector terminals, at least some of which can be similar to the electrical connector terminal 44. The connector 42 includes eight other electrical connector terminals, at least some of which can be similar to the electrical connector terminal 44. The connector 48 is similar to the on-board diagnostic connector 41.

The dongle 40, 46 includes a connector 49, 68, respectively. The connector 49, 68 can be part of and/or connected to the communication transceiver 24. In particular, for example, the connector can be connected to the wired transceiver 34. In accordance with that example, the wired transceiver 34 can include a transceiver configured to perform communications according to a USB specification and the connector 49, 68 can include connector pins connected to electrical circuitry for carrying electrical power and/or signals according to a USB specification.

Examples of the light 27 shown in FIG. 4 include the light 14, 15 in the dongle 40, and the light 16 in the dongle 46.

C. Vehicle Diagnostic Tool

Next, FIG. 6 is a block diagram of the vehicle diagnostic tool 7 in accordance with at least some of the example implementations. The vehicle diagnostic tool 7 includes one or more from among: a processor 50, a memory 51, a vehicle communication transceiver 52, a communication transceiver 53, a proximity sensing component 54, a user interface 55, a power supply 56, a battery charger 57, or a housing 58.

The description of the processor in Section II above is applicable to the processor 50 unless the description dictates otherwise. In at least some implementations of the vehicle diagnostic tool 7, the processor 50 is a specific processor that is programmed to perform any function(s) described in this description as being performed by the vehicle diagnostic tool 7.

The description of the memory in Section II above is applicable to the memory 51 unless the description dictates otherwise. The description of the proximity sensing component in Section II above is applicable to the proximity sensing component 54 unless the description dictates otherwise. The description of the battery charger in Section II above is applicable to the battery charger 57 unless the description dictates otherwise.

The description of the power supply in Section II above is applicable to the power supply 56 unless the description dictates otherwise. In at least some implementations, the vehicle diagnostic tool 7 includes an electrical power circuit 59 that connects the power supply 56 to one or more from among the processor 50, the memory 51, the vehicle communication transceiver 52, the communication transceiver 53, the proximity sensing component 54, the user interface 55, or the battery charger 57.

Two or more of the processor 50, the memory 51, the vehicle communication transceiver 52, the communication transceiver 53, the proximity sensing component 54, the user interface 55, the power supply 56, or the battery charger 57 can be operatively coupled to each other by a circuit 60. The circuit 60 can include one or more circuits, such as one or more electrical or optical circuits. The operative coupling provided by the circuit 60 allows for two or more components of the vehicle diagnostic tool 7 to communicate with and/or signal each other. As an example, the circuit 60 can include a communication bus, such as a serial or parallel communication bus that carries digital signals. As another example, the circuit 60 can include an electrical circuit that carries an analog signal to an analog input of the processor 50. The vehicle diagnostic tool 7 is a computing device and/or can be referred to as a computing device.

In at least some other implementations, the vehicle diagnostic tool 7 includes the processor 50, the memory 51, the vehicle communication transceiver 52, the communication transceiver 53, and the user interface 55, but not the proximity sensing component 54, the power supply 56, the battery charger 57, or the housing 58. In yet at least some other implementations, the vehicle diagnostic tool 7 includes the processor 50, the memory 51, the vehicle communication transceiver 52, the communication transceiver 53, the user interface 55, and the component(s) represented by an X in any row in Table B.

25

TABLE B

| Proximity sensing component 54 | Power supply 56 | Battery charger 57 | Housing 58 |
|---|---|---|---|
| X | | | |
| | X | | |
| | | X | |
| | | | X |
| X | X | | |
| X | | X | |
| X | | | X |
| | X | X | |
| | X | | X |
| | | X | X |
| X | X | X | |
| X | X | | X |
| X | | X | X |
| | X | X | X |

The communication transceiver 53 includes a wireless transceiver 71. The wireless transceiver 71 is configured to transmit communications to the dongle 3 and to receive communications from the dongle 3. In at least some implementations, the wireless transceiver 71 is configured to transmit communications to the base station 8, and/or the communication network 5, and to receive communications from the base station 8, and/or the communication network 5. In accordance with those implementations, the wireless transceiver 71 can include multiple wireless transceivers, such as a transceiver to perform the communications with the dongle 3 and the base station 8 using a Bluetooth communication protocol and a transceiver to perform communications with the communication network 5 using a Wi-Fi communication protocol. The communications performed using the communication network 5 can include communications sent to the server 6 from the communication network 5 and/or communications received by the communication network 5 from the server 6.

In at least some implementations, the communication transceiver 53 also includes a wired transceiver 72. As an example, the wired transceiver 72 is configured to transmit communications to the dongle 3 and/or the base station 8, and to receive communications from the dongle 3 and/or the base station 8. In at least some implementations, the wired transceiver 72 couples to the wired transceiver 34 (shown in FIG. 4) and/or to the wired transceiver 211 (shown in FIG. 12) via a wiring harness (e.g., a USB harness).

In at least some implementations, the vehicle diagnostic tool 7 is adapted to removably retain the dongle 3. Accordingly, the dongle 3 can be removed from the vehicle diagnostic tool 7 and connected to the vehicle 2. In at least some of these implementations, the dongle 3 is retained magnetically, or using a band, a strap, or a net. In those or in other implementations, the dongle 3 (e.g., the housing 58) includes a dongle dock to or in which the dongle 3 can be retained.

In accordance with implementations in which the dongle 3 includes the housing 31 and the vehicle diagnostic tool 7 includes the housing 58, the housing 58 can include a wall having an internal surface and an external surface. The wall includes a recess defined by multiple wall portions and a portion of the external surface. The multiple wall portions include at least a first wall portion and a second wall portion. The vehicle diagnostic tool 7 in these implementations is adapted to removably retain the dongle 3 within the recess. FIG. 8A to FIG. 11 show examples walls, surfaces, wall portions, and a recess in accordance with these implementations.

In accordance with at least some of the implementations discussed in the preceding paragraph, the multiple wall portions include one or more through-holes extending from the internal surface to the external surface for operational access of the proximity sensing component into the recess. The operational access can, for example, include light passing through a through-hole, a soundwave to pass through a through-hole, or a plunger of a switch to pass through a through-hole. For instance, for an implementation in which the proximity sensing component 54 includes a light transmitter and a photoelectric receiver, the operational access allows electromagnetic radiation emitted by the light transmitter to pass through the one or more through-holes and allows electromagnetic radiation reflecting off the object to pass through the one or more through-holes.

Figure 10:
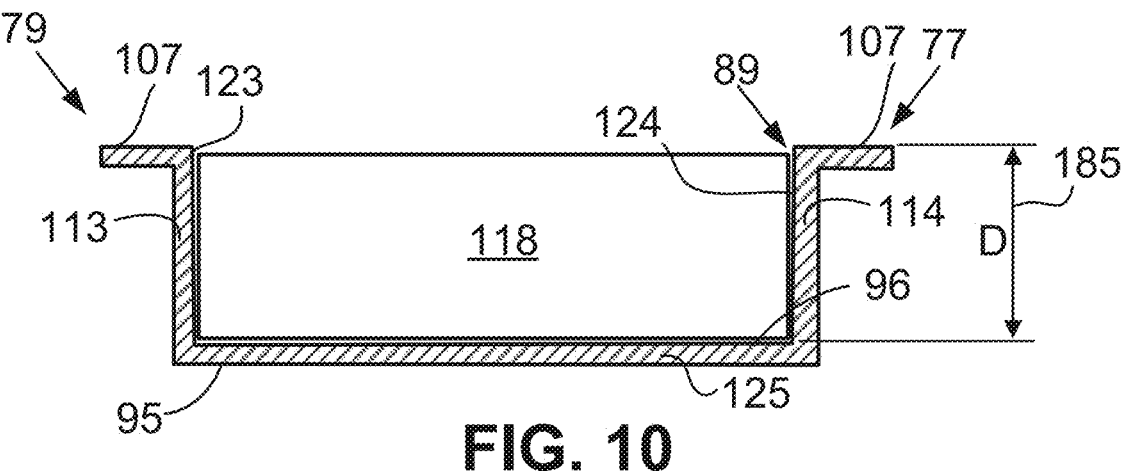
FIG. 10 and FIG. 11 show a dongle retained within a vehicle diagnostic tool in accordance with the example implementations.

In accordance with at least some of the implementations discussed two paragraphs above, the first wall portion and the second wall portion are adapted for removably retaining the dongle 3 by the first wall portion and the second wall portion being in contact with the first housing. FIG. 10 shows a dongle 118 retained by friction in between portions of two walls that form a recess 89.

The proximity sensing component 54 can include one or more proximity sensing components. The description of the proximity sensing component above is applicable to the proximity sensing component 54. Likewise, the examples of the different types of proximity sensing components described above are applicable to the proximity sensing component 54.

The user interface 55 includes user-selectable controls 61. The user-selectable controls 61 include one or more user-selectable controls to make selections that can be input into the processor 50 or to another component of the vehicle diagnostic tool 7. As an example, a selection made via the user-selectable controls 61 can include one or more from among: a selection to power on or power off the vehicle diagnostic tool 7, a selection to cause the vehicle diagnostic tool 7 to send a particular VDM to the dongle 3, a selection to cause the vehicle diagnostic tool 7 (e.g., the wireless transceiver 71) to send the dongle 3 a request for the dongle 3 to send a particular VDM to the vehicle 2, a selection corresponding to setting up the vehicle diagnostic tool 7 to be paired with the dongle 3. Other examples of a selection that can be made via the user-selectable controls 61 are also possible.

The user interface 55 also includes an output device 62. The output device 62 can include a display 63 and/or a speaker 64. The speaker 64 can include one or more speakers operable to convert electrical signals to audible sounds. In those or in other implementations, the speaker 64 includes wired headphones and/or wireless headphones. The wired headphones can connect to an audio plug operatively connectable to an audio jack. The wireless headphones can include in-car headphones, such as the AIRPODS PRO® in-car headphones by Apple Inc. The processor 50 can output a notification to the speaker 64. The speaker 64 can output the notification audibly. Examples of the notification are discussed elsewhere in this description.

The display 63 can include one or more display screens. A display screen can include a capacitive touch display screen, a resistive touch display screen, a plasma display screen, a light emitting diode (LED) display screen, a cathode ray tube display screen, an organic light-emitting diode (OLED) display screen (such as an active-matrix OLED or a passive-matrix OLED), a liquid crystal display (LCD) display screen (such as include a backlit, color LCD display screen), a touch display screen with the LCD display screen, a capacitive touch display screen, or a resistive touch display screen. The display 63 can include a different type of display screen as well or instead. The processor 50 can output a notification to the display 63. The display 63 can output the notification visually. Examples of the notification are discussed elsewhere in this description.

The vehicle diagnostic tool 7 can determine, generate, store, transmit, receive, and/or otherwise use a variety of computer-readable data. At least some of the computer-readable data can be stored in the memory 51. The computer-readable data can include software and/or firmware. The computer-readable data can include icons displayable on the display 63. The computer-readable data can include web-pages displayable on the display, such as a web-page received from the server 6. The computer-readable data can include data received from the dongle 3, such as a VDM received from the vehicle 2, a portion of a VDM received from the vehicle 2, or data representing a least a portion of a VDM received from the vehicle 2.

The housing 58 surrounds at least a portion of one or more of the following: the processor 50, the memory 51, the vehicle communication transceiver 52, the communication transceiver 53, the proximity sensing component 54, the user interface 55, the power supply 56, the battery charger 57, the electrical power circuit 59, or the circuit 60. The housing 58 can support a substrate. In at least some example implementations, at least a portion one or more of the following is mounted on and/or connected to the substrate: the processor 50, the memory 51, the vehicle communication transceiver 52, the communication transceiver 53, the proximity sensing component 54, the user interface 55, the power supply 56, the battery charger 57, the electrical power circuit 59, or the circuit 60. The housing 58 can be made from various materials. For example, the housing 58 can be made from a plastic material (e.g., acrylonitrile butadiene styrene (ABS)). Other examples of a material that forms the housing 58 are also possible.

Figure 19:
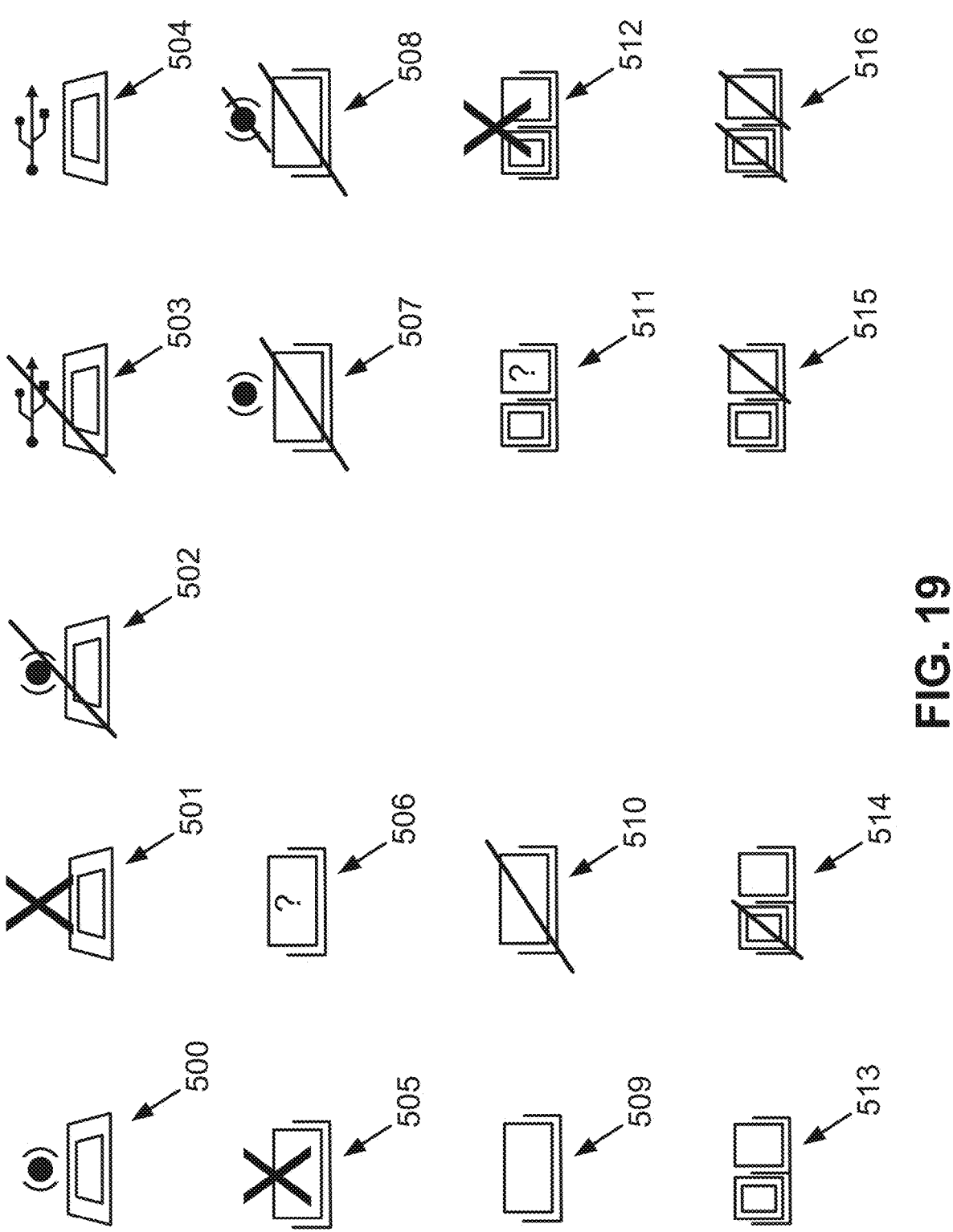
FIG. 19 shows example icons in accordance with the example implementations.

The memory 51 can include computer-readable data. As an example, the memory 51 can include a dongle identifier 18, CRPI 65, an icon 66, a device status 67, and an application 69. The icon 66 can include one or more icons. Examples of the icon are shown in FIG. 19. The device status 67 can include data used by the processor 50 to determine a device status and/or can include data indicative of a device status. As an example, the device status of a device can include one or more from among the following device statuses: paired and communicating, paired and not communicating, docked, undocked, charging, not charging, not paired, not paired but pairable, or a power supply (e.g., battery life) status. Other examples of a device status are also possible. The device for which the device status 67 includes data can include the vehicle diagnostic tool 7. Additionally, the device for which the device status 67 includes data can include the dongle 3, the base station 8, and/or a vehicle to which the dongle 3 is connected.

The application 69 can include one or more applications within or separate from the CRPI 65. For example, the application 69 can include an application 190, 191 executable by the processor 50. In at least some implementations, the application 190 includes an application executable by the processor 50 that requires the vehicle diagnostic tool 7 to perform and/or attempt to perform a communication with the dongle 3. In at least some implementations, the application 191 includes an application executable by the processor 50 that does not require the vehicle diagnostic tool 7 to communicate with the dongle 3.

The dongle identifier 18 can include an identifier of a dongle (e.g., the dongle 3) that is communicatively paired with the vehicle diagnostic tool 7. The dongle identifier 18 can include the dongle identifier of the dongle even if the dongle and the vehicle diagnostic tool are not communicatively connected.

The CRPI 65 can include computer-readable program instructions executable by the processor 50. In at least some implementations, the CRPI 65 includes program instructions executable by the processor 50 or the vehicle diagnostic tool 7 to perform the set of functions 600 described with respect to FIG. 14. In at least some implementations, the CRPI 65 includes program instructions executable by the processor 50 or the vehicle diagnostic tool 7 to perform the set of functions 600 and further features in any of the other implementations described as being performable in addition to the set of functions 600.

As an example, the CRPI 65 can include program instructions executable by the processor 50 to determine a status of the power supply 56 (e.g., a percentage charge of a battery between 0% and 100%, inclusive) and to output data indicative of the power supply status.

As another example, the CRPI 65 can include program instructions executable by the processor 50 to determine whether an output signal of the proximity sensing component 54 and received at the processor 50 indicates an object (e.g., the dongle 3) is in spatial proximity to the proximity sensing component 54.

As another example, the CRPI 65 can include program instructions executable by the processor 50 to determine that that an object is within spatial proximity to the proximity sensing component 54 and a determination that the object is the dongle 3. In accordance with this example, the dongle 3 includes a radio frequency transmitter and first data corresponding to the dongle 3. The proximity sensing component 54 includes a radio frequency receiver operable to receive the first data. The proximity sensing component 54 may output a magnetic field to generate an electrical current within the radio frequency transmitter. That electrical current can cause the radio frequency transmitter to transmit the first data.

As another example, the CRPI 65 can include program instructions executable by the processor 50 to cause the wireless transceiver 71 to send to the dongle 3 a request for the dongle 3 to send a VDM to the vehicle 2. In at least some implementations, the request includes the VDM. In at least some other implementations, the request includes data the dongle 3 can user to generate the VDM that is requested to be sent to the vehicle 2.

As another example, the CRPI 65 can include program instructions executable by the processor 50 to receive from the wireless transceiver 71 a VDM sent by the vehicle 2 to the dongle 3 or data indicative of at least a portion of the VDM sent by the vehicle 2 to the dongle 3, and to then output on the display 63 the VDM or data indicative of at least a portion of the VDM sent by the vehicle 2 to the dongle 3. As an example, the data indicative of at least a portion of the VDM sent by the vehicle 2 to the dongle 3 can include a parameter identifier (or a textual representation of a parameter identifier), and a data value corresponding to a parameter identifier.

As yet another example, the CRPI 65 can include program instructions executable by the processor 50 to cause a vehicle diagnostic tool 7 to perform functions. The functions include receiving, by the processor, a first output signal of a proximity sensing component. The proximity sensing component being operable to output signals including the first output signal. The functions include determining, by the processor based at least in part on the first output signal, a first determination. The first determination indicates whether an object is in spatial proximity to the proximity sensing component. The functions also include outputting, by the processor using the output device, a notification based at least in part on the first determination. The first wireless transceiver is operable to communicate wirelessly with a second wireless transceiver to trigger a vehicle communication from a dongle to a vehicle. The dongle includes the second wireless transceiver, a vehicle connector, and a vehicle communication transceiver. The vehicle communication transceiver is operable to perform a vehicle communication directly with the vehicle while the vehicle connector is connected to an on-board diagnostic connector of the vehicle.

As yet another example, the CRPI 65 can include program instructions executable by the processor 50 to receive a data indicative of a dongle identifier transmitted by an NFC radio-frequency transmitter and compare the received dongle identifier to the dongle identifier 18 to determine whether a dongle that includes the NFC radio-frequency transmitter is communicatively paired with the vehicle diagnostic tool 7. As an example, if the received dongle identifier matches the dongle identifier 18, the processor 50 determines that the dongle 3 and the vehicle diagnostic tool 7 are communicatively paired.

Figures 7A, 7B:
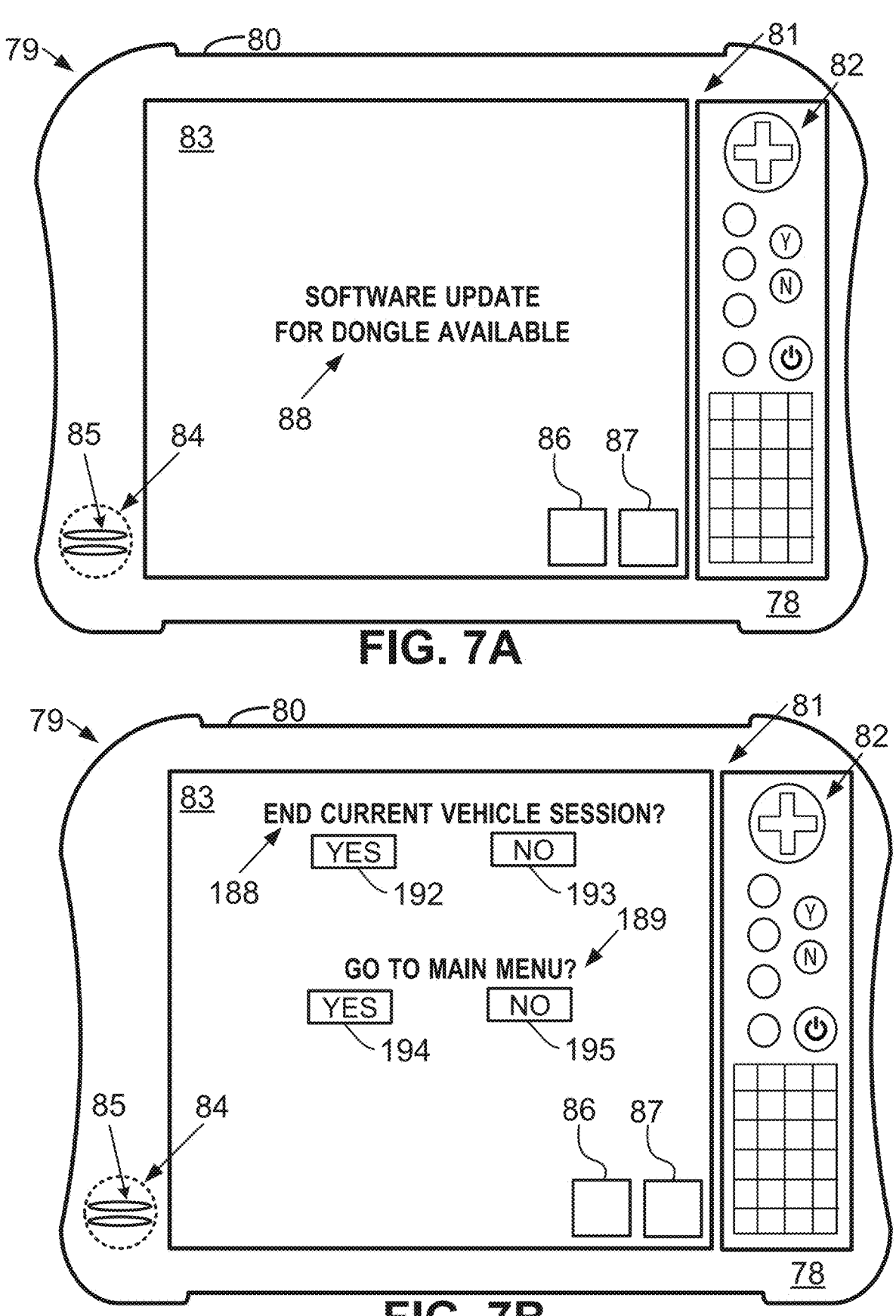
FIG. 7A and FIG. 7B show a vehicle diagnostic tool in accordance with the example implementations.

Next, FIG. 7A and FIG. 7B show a view of a vehicle diagnostic tool 79, and FIG. 8A to FIG. 8F show additional views of different implementations of the vehicle diagnostic tool 79. In particular, FIG. 7A shows a side 78 (e.g., a front side) of the vehicle diagnostic tool 79, and FIG. 8A to FIG. 8F show a side 77 (e.g., a back side) according to various implementations of the vehicle diagnostic tool 79. The vehicle diagnostic tool 79 includes a housing 80, a user interface 81, user-selectable controls 82, a display 83, a speaker 84, a speaker grill 85, and a dongle dock 181. The dongle dock 181 can include a position on and/or within the housing 80 at which a dongle 118 can be retained.

In at least some implementations, the vehicle diagnostic tool 7 (shown in FIG. 2 and FIG. 6) is arranged like at least a portion of the vehicle diagnostic tool 79. Accordingly, in at least some implementations of the vehicle diagnostic tool 7, the housing 58 is arranged like the housing 80, the user-selectable controls 61 are arranged like the user-selectable controls 82, the display 63 is arranged like the display 83, and/or the speaker 64 is arranged like the speaker 84. Moreover, in at least some implementations, the vehicle diagnostic tool 79 can be used in place of the vehicle diagnostic tool 7 shown in FIG. 2.

The display 83 can display various content output by the processor 50. As an example, the display 83 can display an icon 86, 87 and a notification 88. The icon 86, 87 can represent a status determined by the processor 50. The status determined by the processor 50 can be a status of the vehicle diagnostic tool 7, 79 and/or a dongle. Examples of the icon 86, 87 are shown in FIG. 19.

Figures 8A, 8B:
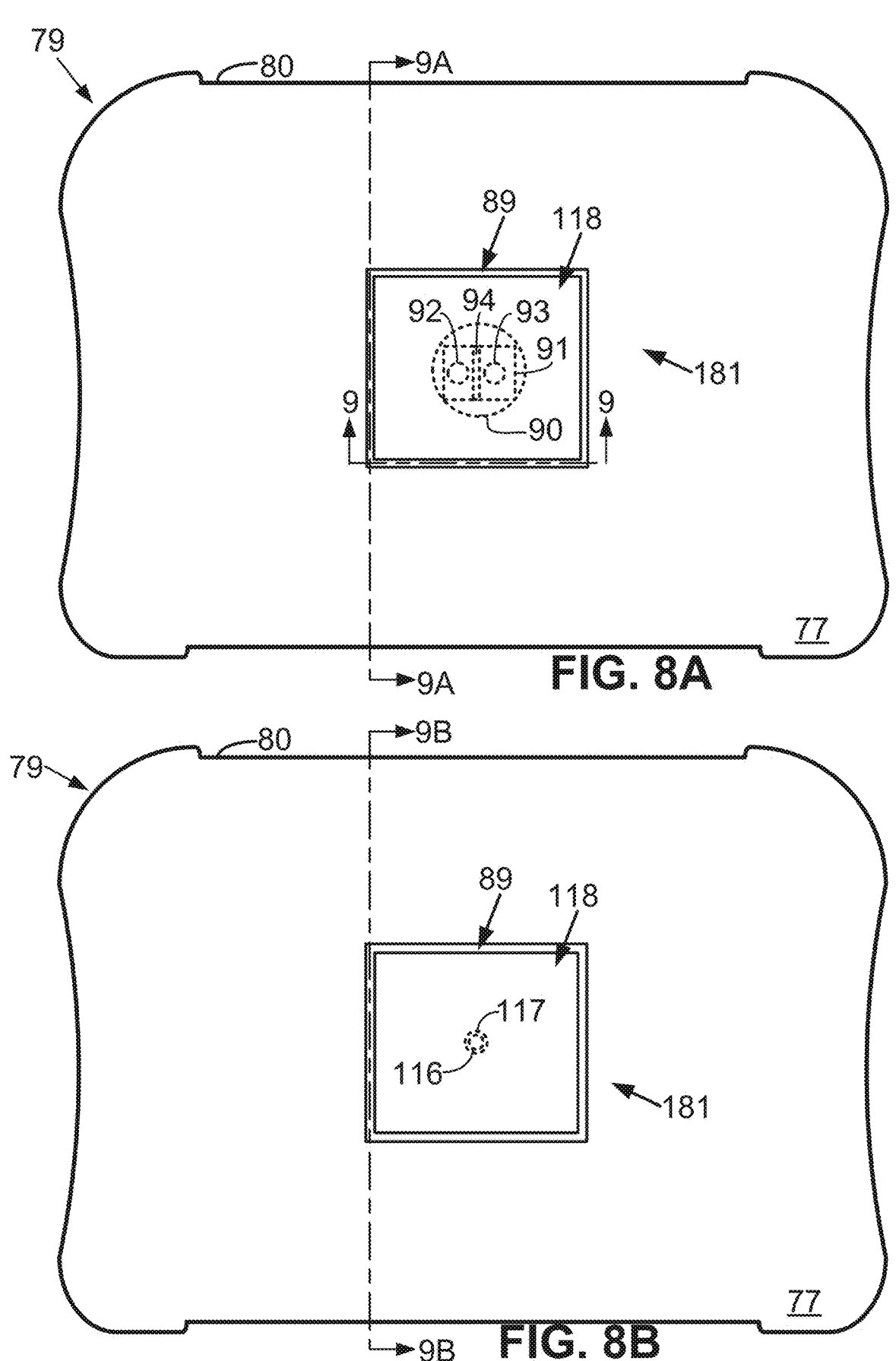
FIG. 8A, FIG. 8B, FIG. 8C, FIG. 8D, FIG. 8E, and FIG. 8F show various views of the vehicle diagnostic tool shown in FIG. 7A and FIG. 7B in accordance with the example implementations.

Next, FIG. 8A shows an implementation of the vehicle diagnostic tool 79 in which the vehicle diagnostic tool 79 includes a recess 89 for retaining the dongle 118. In at least some implementations, the recess 89 is formed within the housing 80. The dongle 118 can be arranged like the dongle 3, 40, 46.

In the implementation shown in FIG. 8A, the vehicle diagnostic tool 79 includes a proximity sensing component 91. In at least some of those implementations, the proximity sensing component 91 includes a transmitter 92, a receiver

93, and a barrier 94. The housing 80 can include a through-hole 90 so that an output of the transmitter 92 passes through the housing 80 and into the recess 89, and so that the transmitter output reflected off an object within the recess 89 can pass through the housing 80 towards the receiver 93. As an example, the proximity sensing component 91 includes a photoelectric proximity sensor, the transmitter 92 is configured to emit energy in the infrared or visible light spectrum, the receiver 93 is configured to detect energy in the infrared or visible light spectrum, and the barrier 94 is an infrared or optical barrier. As another example, the proximity sensing component 91 includes an ultrasonic proximity sensor, the transmitter 92 is configured to emit sound waves, the receiver 93 is configured to detect sound waves, and the barrier 94 is a sound wave barrier.

Figures 9A, 9B:
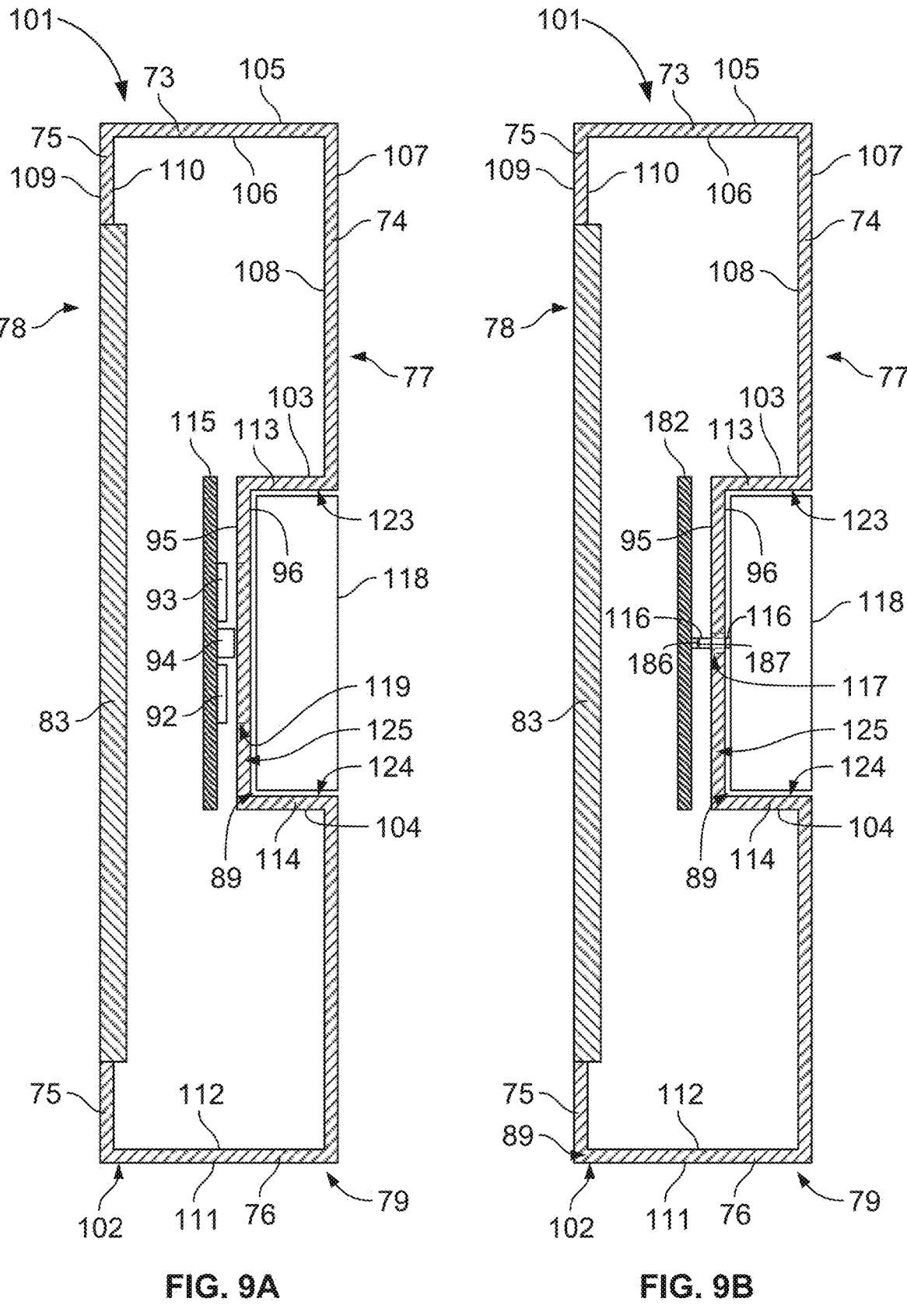

A section view of the vehicle diagnostic tool 79 as shown in FIG. 8A is shown in FIG. 9A. As shown in FIG. 9A, the vehicle diagnostic tool 79 includes the display 83 and a side 101, 102 in addition to the side 77, 78. The side 77 includes an exterior surface and an interior surface 108. The side 78 includes an exterior surface 109 and an interior surface 110. The side 101 includes an exterior surface 105 and an interior surface 106. The side 102 includes an exterior surface 111 and an interior surface 112.

In FIG. 9A, the housing 80 is shown with cross-hatched lines and forms a portion of an outer perimeter of the vehicle diagnostic tool 79. A portion of the housing 80 forms a wall 113. Similarly, another portion of the housing 80 forms a wall 114. The wall 113, 114 extends inward away from the side 77. Additionally, yet another portion of the housing 80 forms a wall 125. The wall 125 extends between and to the wall 113 and the wall 114. The wall 125 includes a through-hole 119. The wall 113 includes an interior surface 103 and an exterior surface 123. The wall 114 includes an interior surface 104 and an exterior surface 124. The wall 125 includes an interior surface 95 and an exterior surface 96. A substrate 115 configured to support the transmitter 92, the receiver 93, and the barrier 94 is contained within the vehicle diagnostic tool 79. In at least some implementations, the wall 113, 114 tapered toward the other as the wall 113, 114 extend away from the side 77. The tapered walls can provide a friction fit for retaining the dongle 118 within the recess 89. For the clarity of FIG. 9A, the dongle 118 is not shown to be in contact with the exterior surface 96, 123, 124. Even so, the dongle 118 can be put into contact with one or more of the exterior surface 96, 123, 124.

Next, FIG. 8B shows another implementation of the vehicle diagnostic tool 79 in which the vehicle diagnostic tool 79 includes the recess 89 for retaining the dongle 118. In the implementation shown in FIG. 8B, the vehicle diagnostic tool 79 includes a proximity sensing component 116. In at least some implementations, the proximity sensing component 116 includes a push button switch. The housing 80 includes a through-hole 117 so that a portion of the proximity sensing component 116 can extend beyond the exterior surface 96 of the wall 125. Placement of the dongle 118 within the recess 89 can cause contacts 186, 187 of the push button switch to make contact (i.e., touch). In contrast, removal of the dongle 118 from the recess 89 can cause the contacts 186, 187 of the push button switch to break contact. Making or breaking contact of the contacts can cause an input signal to the processor 50 to change states (e.g., from a high voltage state (e.g., 5.0 volts) to a low voltage state (e.g., 0 volts) of from the low voltage state to the high voltage state). The processor 50 can determine whether the dongle 118 is in proximity to the proximity sensing component 116 based on that input signal.

A section view of the vehicle diagnostic tool 79 as shown in FIG. 8B is shown in FIG. 9B. As shown in FIG. 9B, the vehicle diagnostic tool 79 includes the display 83 and the side 77, 78, 101, 102 and the wall 113, 114, 125, the interior surface 95, 103, 104, 106, 108, 110, 112 and the exterior surface 96, 105, 107, 109, 111, 123, 124.

In FIG. 9B, the housing 80 is shown with cross-hatched lines and forms a portion of an outer perimeter of the vehicle diagnostic tool 79. The wall 125 includes a through-hole 117. The vehicle diagnostic tool 79 includes a substrate 182 configured to support the proximity sensing component 116. A portion of the proximity sensing component 116 is shown to be in contact with the dongle 118. For the clarity of FIG. 9A, the dongle 118 is not shown to be in contact with the exterior surface 96, 123, 124. Even so, the dongle 118 can be put into contact with one or more of the exterior surface 96, 123, 124.

Figures 8C, 8D:
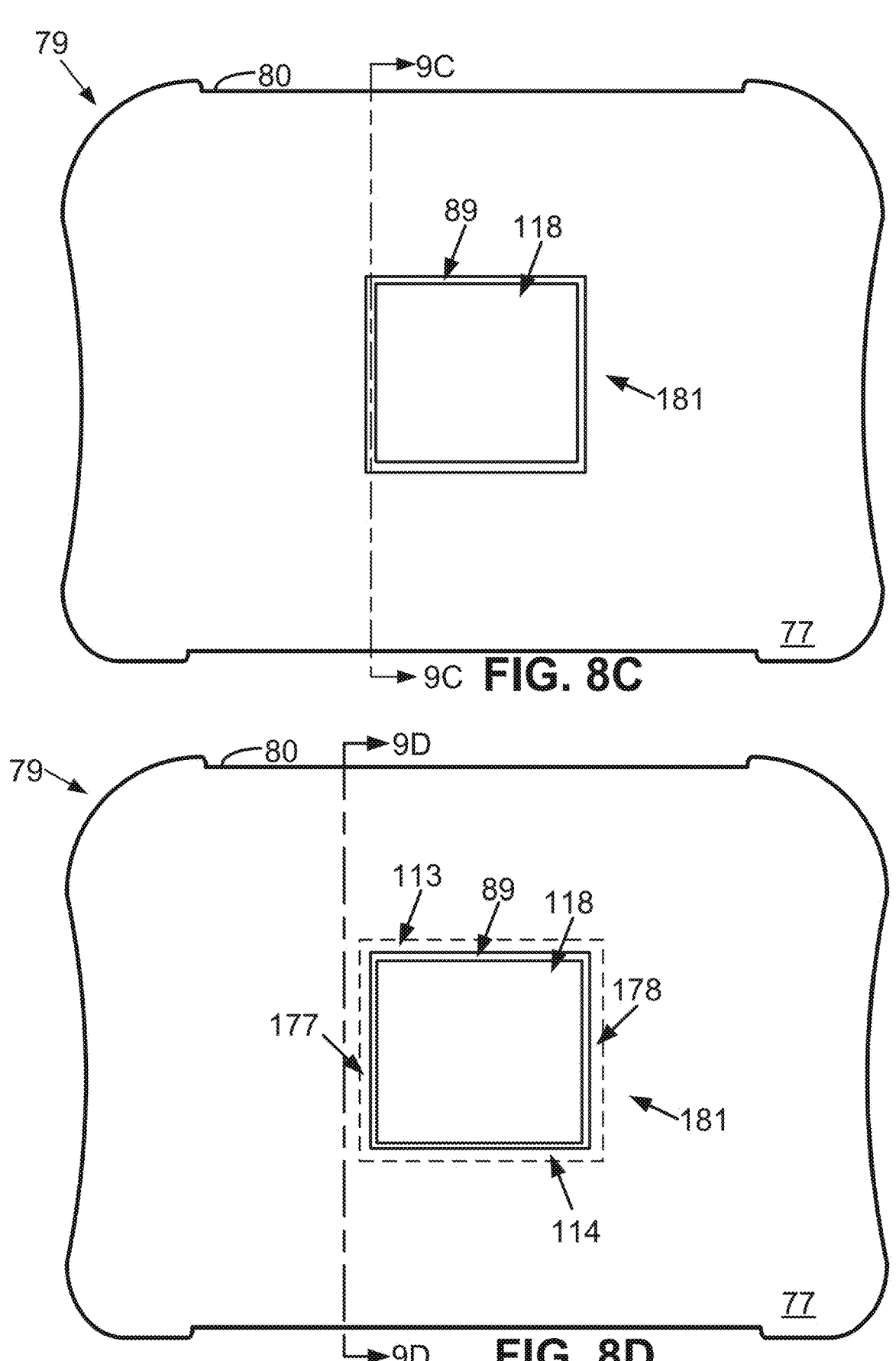

Next, FIG. 8C shows another implementation of the vehicle diagnostic tool 79 in which the vehicle diagnostic tool 79 includes the recess 89 for retaining the dongle 118. A section view of the vehicle diagnostic tool 79 as shown in FIG. 8C is shown in FIG. 9C. As shown in FIG. 9C, the vehicle diagnostic tool 79 includes the display 83 and the side 77, 78, 101, 102 and the wall 73, 74, 75, 76, 113, 114, 125, the interior surface 95, 103, 104, 106, 108, 110, 112 and the exterior surface 96, 105, 107, 109, 111, 123, 124.

In the implementation shown in FIG. 8C and FIG. 9C, the vehicle diagnostic tool 79 includes a proximity sensing component 165, 166 and a substrate 167, 168. The proximity sensing component 165 is supported at least in part by the substrate 167, and the proximity sensing component 166 is supported at least in part by the substrate 168. In at least some implementations, the proximity sensing component 165 and the proximity sensing component 166 are separate, integrated proximity sensing components. Alternatively, the proximity sensing component 165 and the proximity sensing component 166 are distributed proximity sensor components. For example, the proximity sensing component 165 can include a transmitter, such as a transmitter of infrared energy, visible light energy, or sound waves, and the proximity sensing component 166 includes a corresponding receiver configured to receive/detect the infrared energy, visible light energy, or sound waves transmitted by the proximity sensing component 165. The example proximity sensing components described above can be arranged as a separate, proximity sensing component.

In at least some implementations shown in FIG. 8C and FIG. 9C, the housing 80 and the wall 113 include a through-hole 169 to provide operational access for the proximity sensing component 166, and/or the housing 80 and the wall 114 include a through-hole 179 to provide operational access for the proximity sensing component 165. This operational access may permit a portion of the proximity sensing component 165, 166 to move within the housing 80. Alternatively, the operational access may permit the energy, visible light energy, or sound waves transmitted by the proximity sensing component 165 to enter into the recess 89. Furthermore, in at least some implementations in which the proximity sensing component 165, 166 includes an integrated proximity sensing component, the vehicle diagnostic tool 79 may include one of the proximity sensing component 165, 166, but not the other one.

In accordance with the implementations in which the proximity sensing component 165, 166 include a transmitter and a receiver, placement of the dongle 118 within the recess 89 can cause the output of the proximity sensing component 165 to be blocked such that the proximity sensing component 166 cannot receive/detect the output of the proximity sensing component 165. Placing the dongle 118 within the recess 89 or removing the dongle 118 from the recess 89 can cause an input signal to the processor 50 to change states (e.g., from a high voltage state (e.g., 5.0 volts) to a low voltage state (e.g., 0 volts) of from the low voltage state to the high voltage state). The processor 50 can determine whether the dongle 118 is in proximity to the proximity sensing component 165, 166 based on that input signal.

In FIG. 9C, the housing 80 is shown with cross-hatched lines and forms at least a portion of an outer perimeter of the vehicle diagnostic tool 79. For the clarity of FIG. 9C, the dongle 118 is not shown to be in contact with the exterior surface 96, 123, 124. Even so, the dongle 118 can be put into contact with one or more of the exterior surface 96, 123, 124.

Next, FIG. 8D shows another implementation of the vehicle diagnostic tool 79 in which the vehicle diagnostic tool 79 includes the recess 89 for retaining the dongle 118. A section view of the vehicle diagnostic tool 79 as shown in FIG. 8D is shown in FIG. 9D. As shown in FIG. 8D and/or in FIG. 9D, the vehicle diagnostic tool 79 includes the display 83 and the side 77, 78, 101, 102 and the wall 73, 74, 75, 76, 113, 114, 125, 177, 178, the interior surface 95, 103, 104, 106, 108, 110, 112 and the exterior surface 96, 105, 107, 109, 111, 123, 124.

In the implementation shown in FIGS. 8D and 9D, the vehicle diagnostic tool 79 includes a proximity sensing component 174 and a substrate 175. The proximity sensing component 174 is supported at least in part by the substrate 175. The wall 177 can include a through-hole 176 to provide operational access for the proximity sensing component 174. The description of the proximity sensing component above is applicable to the proximity sensing component 174. Likewise, the examples of the different types of proximity sensing components described above are applicable to the proximity sensing component 174.

In FIG. 9D, the housing 80 is shown with cross-hatched lines and forms at least a portion of an outer perimeter of the vehicle diagnostic tool 79. For the clarity of FIG. 9D, the dongle 118 is not shown to be in contact with the exterior surface 96, 123, 124. Even so, the dongle 118 can be put into contact with one or more of the exterior surface 96, 123, 124.

Figures 8E, 8F:
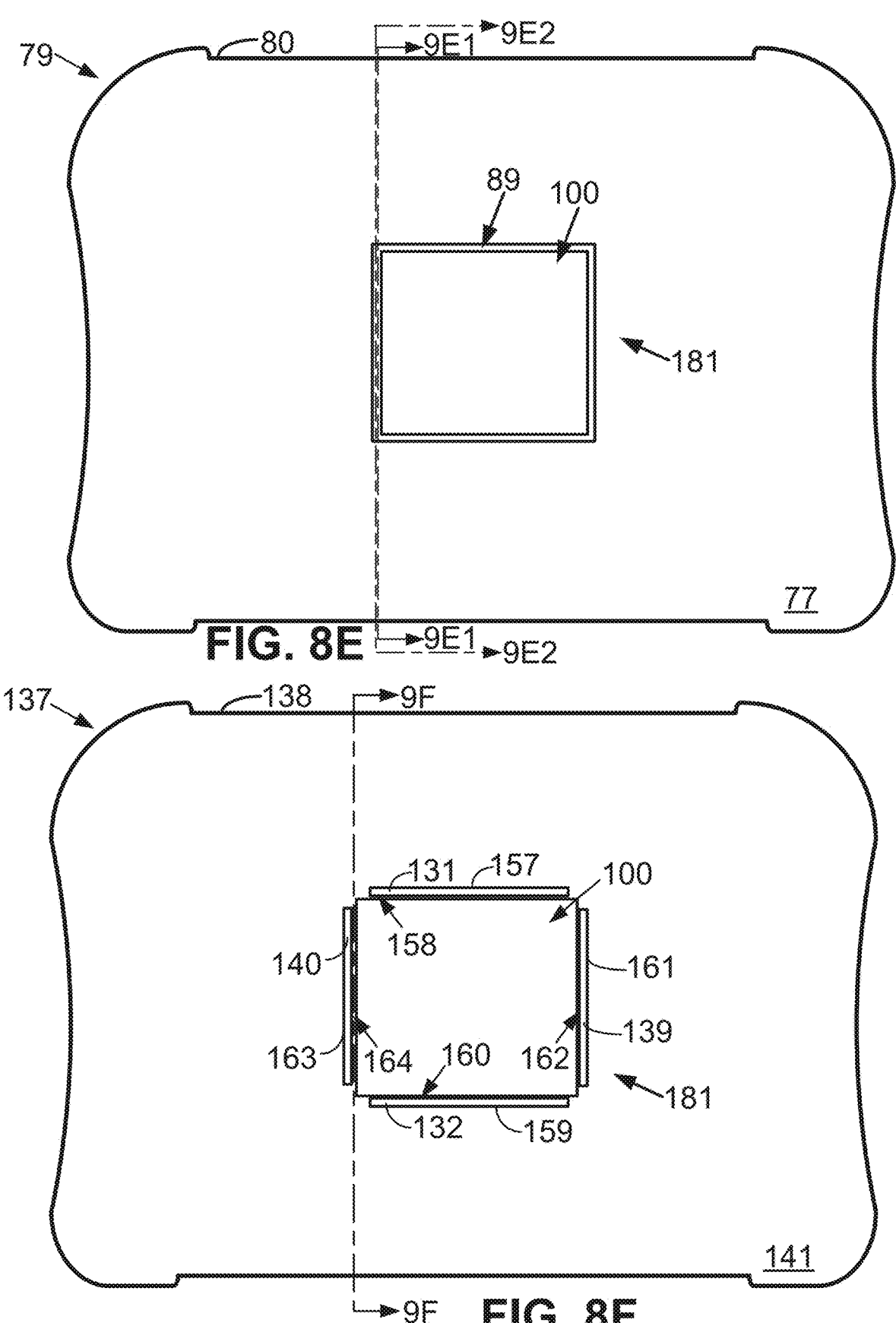

Next, FIG. 8E shows another implementation of the vehicle diagnostic tool 79 in which the vehicle diagnostic tool 79 includes the recess 89, although FIG. 8E shows a dongle 100 within the recess 89 instead of the dongle 118. The dongle 100 includes one or more permanent magnets, such as a permanent magnet 127, 128 shown in FIG. 9E1 or a permanent magnet 230 shown in FIG. 9E2. The dongle 100 can be arranged like the dongle 3, 40, 46. Accordingly, the dongle 100 can include the housing 31. The permanent magnet 127, 128, 230 can be disposed on and/or in contact with the housing 31 or elsewhere within the dongle 100.

In the implementation shown in FIG. 8E, the vehicle diagnostic tool 79 includes a proximity sensor 129. The proximity sensor 129 includes a magnetic switch. The proximity sensor 129 is disposed within the vehicle diagnostic tool 79 so that the proximity sensor 129 can be influenced by the permanent magnet 127 or the permanent magnet 128 (both shown in FIG. 9E1) when the dongle 100 is disposed within the recess 89 or by the permanent magnet 230 (shown in FIG. 9E2). The proximity sensor 129 can output an electrical signal to the processor 50. The processor 50 can be programmed to determine whether the dongle 100 is within the recess 89 based on a voltage value of the electrical signal.

Section views of the vehicle diagnostic tool 79 as shown in FIG. 8E are shown in FIG. 9E1 and FIG. 9E2. As shown in FIG. 9E1 and FIG. 9E2, the vehicle diagnostic tool 79 includes the display 83 and the side 77, 78, 101, 102 and the wall 113, 114, 125, the interior surface 95, 103, 104, 106, 108, 110, 112 and the exterior surface 96, 105, 107, 109, 111, 123, 124.

In FIG. 9E1 and FIG. 9E2, the housing 80 is shown with cross-hatched lines and forms at least a portion of an outer perimeter of the vehicle diagnostic tool 79. The vehicle diagnostic tool 79 includes a substrate 99 configured to support the proximity sensor 129. For the clarity of FIG. 9E1 and FIG. 9E2, the dongle 100 is not shown to be in contact with the exterior surface 96, 123, 124. Even so, the dongle 100 can be put into contact with one or more of the exterior surface 96, 123, 124.

As shown in FIG. 9E1, the permanent magnet 127, the permanent magnet 128, and the proximity sensor 129 include a longitudinal axis 136, 135, 134, respectively. Accordingly, in at least some implementations (such as those shown in FIG. 9E1), the longitudinal axis 134, 135, 136, as well as the substrate 99, is parallel or substantially parallel to the wall 125. Alternatively, the longitudinal axis 134, 135, 136, as well as the substrate 99, can be parallel or substantially parallel to the wall 113, 114. In those alternative implementations, the substrate 99 and the proximity sensor 129 can be closer to the wall 113 than to the wall 114, or vice versa.

As shown in FIG. 9E2, the permanent magnet 230, and the proximity sensor 129 include a longitudinal axis 231, 136, respectively. Accordingly, in at least some implementations (such as those shown in FIG. 9E2), the longitudinal axis 134, 231, as well as the substrate 99, is parallel or substantially parallel to the wall 125. Alternatively, the longitudinal axis 134, 231, as well as the substrate 99, can be parallel or substantially parallel to the wall 113, 114. In those alternative implementations, the substrate 99 and the proximity sensor 129 can be closer to the wall 113 than to the wall 114, or vice versa.

Additionally, as shown in FIG. 9E2, the vehicle diagnostic tool 79 includes a permanent magnet 232, 233 configured to attract the permanent magnet 230. The permanent magnet 230, 232, 233 can be selected so that the magnetic field of the permanent magnet 230, 232, 233 is sufficiently strong so that the dongle 100 can be retained within the recess 89 even without any friction force between the dongle 100 and the exterior surface 123, 124, yet sufficiently weak such that a person can separate the dongle 100 from the vehicle diagnostic tool 79. Although the vehicle diagnostic tool 79 shown in FIG. 9E2 is described as having the permanent magnet 232, 233 for retaining the dongle 100 within the recess 89, the vehicle diagnostic tool 79 can include a different number of permanent magnets (such as one or three or more) to retain the dongle 100 within the recess 89. Similarly, the permanent magnet 230 can include one or more permanent magnets.

Next, FIG. 8F shows an implementation of a vehicle diagnostic tool 137 with the dongle 100 described previously with respect to FIG. 8E. The vehicle diagnostic tool 7 can be arranged like the vehicle diagnostic tool 137 and vice versa, but the vehicle diagnostic tool 137 is configured to retain the dongle 100 in a manner different than within the recess 89. As shown in FIG. 8F, the vehicle diagnostic tool 137 includes a housing 138, and a wall 131, 132, 139, 140. The wall 131, 132, 139, 140 can be configured to retain the dongle 100 using a friction force. The wall 131, 132, 139, 140 may be tapered and/or include a rib to provide the friction force to certain portions of the dongle 100, such as the portions of the dongle that are closest to a side 141 of the vehicle diagnostic tool 137. In alternative implementations, the wall 131 abuts the wall 139 and the wall 140; the wall 139 abuts the wall 131 and the wall 132; the wall 132 abuts the wall 139 and the wall 140, and the wall 140 abuts the wall 131 and the wall 132. In yet further implementations, the vehicle diagnostic tool 137 includes the wall 131, 132, but not the wall 139, 140, or the vehicle diagnostic tool 137 includes the wall 139, 140, but not the wall 131, 132. The wall 131, 132, 139, 140 has an exterior surface 157, 159, 161, 163, respectively, and an interior surface 158, 160, 162, 164, respectively.

Figure 9F:
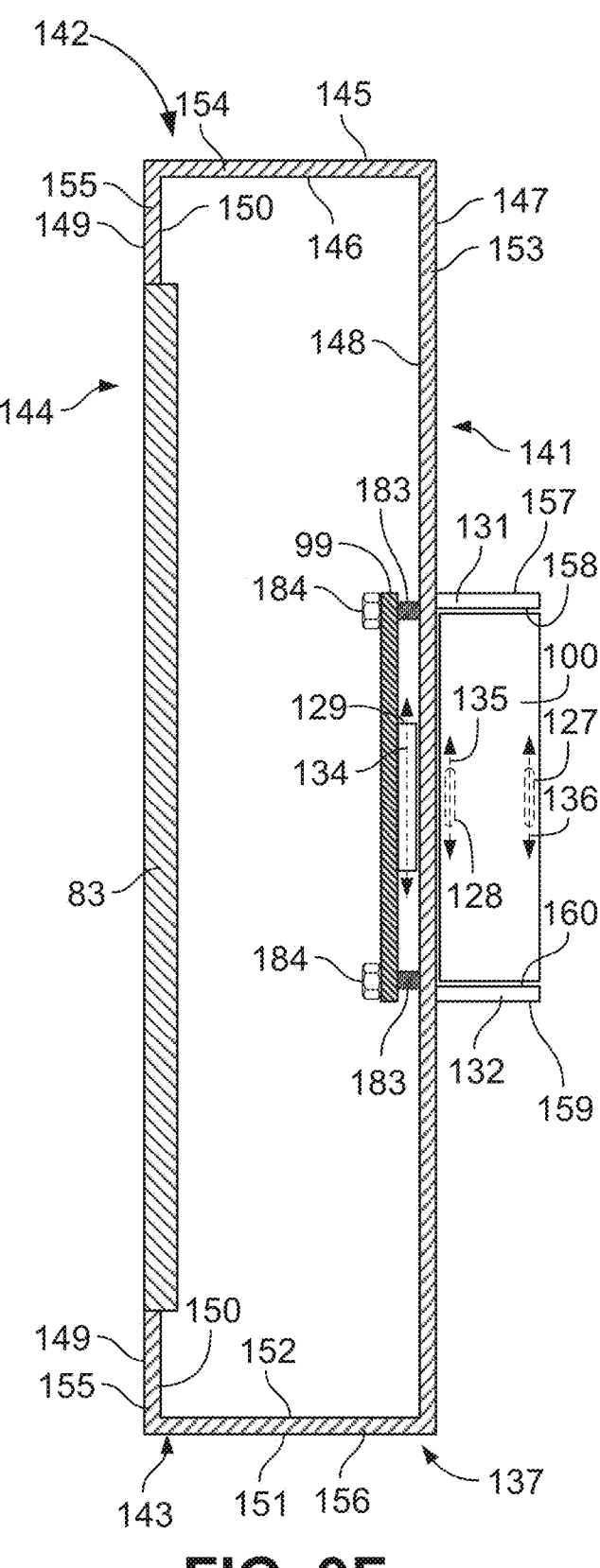

A section view of the vehicle diagnostic tool 137 as shown in FIG. 8F is shown in FIG. 9F. As shown in FIG. 9F, the vehicle diagnostic tool 137 includes the display 83 and the side 141, 142, 143, 144. The side 141 includes a wall 153 having an interior surface 148 and an exterior surface 147. The side 142 includes a wall 154 having an interior surface 146 and an exterior surface 145. The side 143 includes a wall 155 having an interior surface 152 and an exterior surface 151. The side 144 includes a wall 156 having an interior surface 150 and an exterior surface 149. Additionally, the longitudinal axis 134, 135, 136, as well as the substrate 99, is parallel or substantially parallel to the wall 153.

In FIG. 9F, the housing 138 is shown with cross-hatched lines and forms a portion of an outer perimeter of the vehicle diagnostic tool 137. The substrate 99 can be affixed to the wall 153 using a standoff 183 and a threaded fastener 184 or in some other manner. For the clarity of FIG. 9F, the dongle 100 is not shown to be in contact with the exterior surface 147 or the interior surface 158, 160. Even so, the dongle 118 can be put into contact with one or more of the exterior surface 147 or the interior surface 158, 160.

Next, FIG. 10 shows an alternative view and implementation of the dongle 118 retained within the recess 89 of the vehicle diagnostic tool 79. FIG. 10 is a section view of a part of the vehicle diagnostic tool 79 shown in FIG. 8A. In FIG. 10, the wall 113 and the wall 114 are tapered inwards towards each other within the recess 89 as the wall 113 and the wall 114 extend from the exterior surface 107 and the side 77 towards the exterior surface 96. Contact between the wall 113, 114 (i.e., the exterior surface 123, 124) and the dongle 118 can provide a friction fit to retain the dongle within the recess 89. The recess 89 has a depth 185, "D", extending from the exterior surface 107 to the exterior surface 96.

Figure 11:
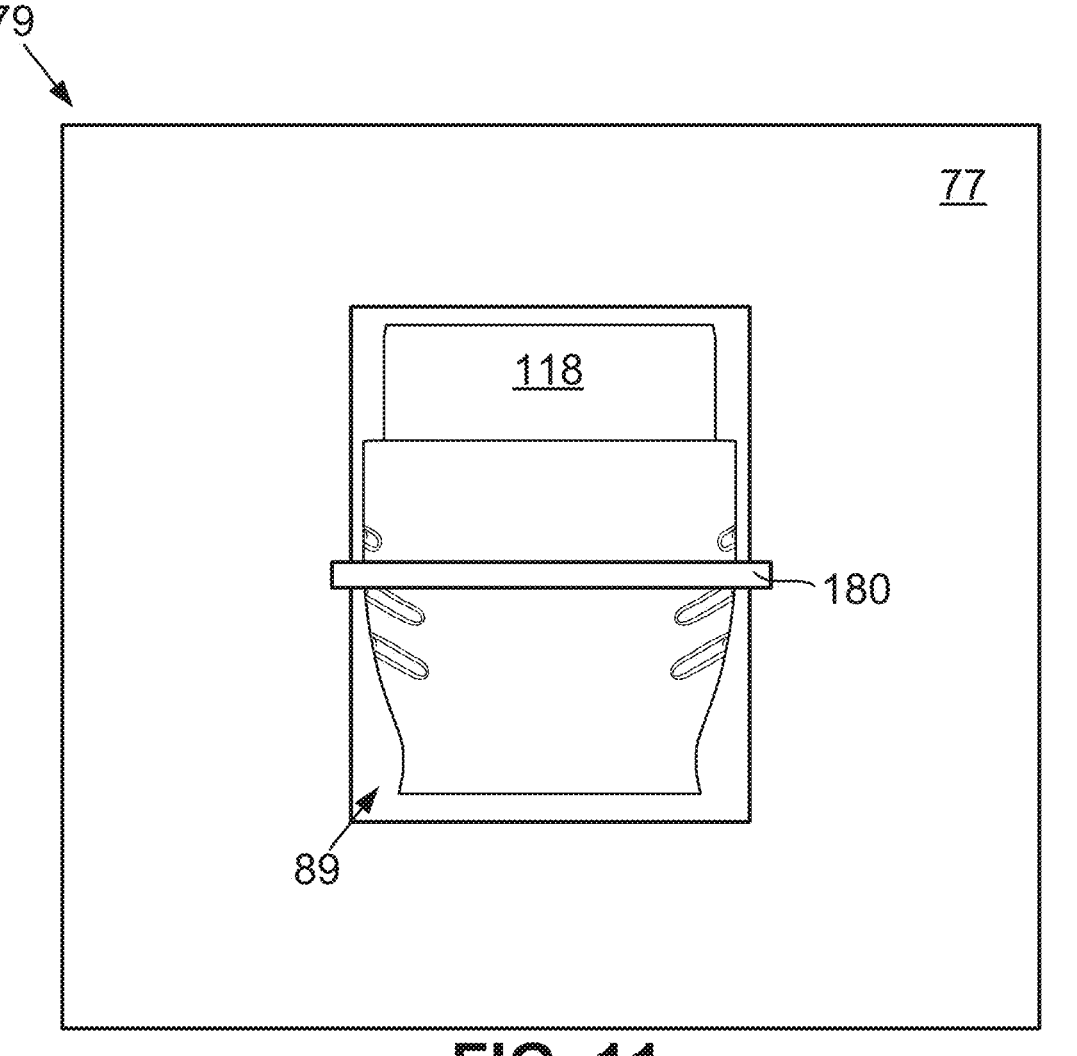

Next, FIG. 11 shows an alternative view and implementation of the dongle 118 retained within the recess 89 of the vehicle diagnostic tool 79. In this implementation, the vehicle diagnostic tool 79 includes a dongle retainer 180 attached to the vehicle diagnostic tool 79. As an example, the dongle retainer 180 can include a band or strap (e.g., an elastic strap or band) configured to prevent the dongle 118 from falling out of the recess 89 when the side 77 is facing the ground. The band or strap is flexible enough to let a user pull the dongle 118 out of the recess 89. In at least some implementations, the dongle retainer 180 can include two or multiple bands or straps spaced apart on the side 77 to retain the dongle 118 in the recess 89. As another example, the dongle retainer 180 includes a net that covers at least a portion of recess 89. The net, attached at the side 77, permits the dongle 118 to be placed within and to be removed from the recess 89.

D. Base Station

Next, FIG. 12 is a block diagram of the base station 8 in accordance with at least some implementations. The base station 8 is a computing device and computing system. The vehicle diagnostic tool 7 and/or the dongle 3 are dockable at and/or to the base station 8. Docking of the vehicle diagnostic tool 7 at and/or to the base station 8 can include removably connecting a connector of the vehicle diagnostic tool 7 to a connector of the base station 8. Additionally or alternatively, docking of the vehicle diagnostic tool 7 at and/or to the base station 8 can include placing one of the vehicle diagnostic tool 7 and/or the base station 8 on the other without connecting any connectors of the vehicle diagnostic tool 7 and the base station 8 to each other. Similarly, docking of the dongle 3 at and/or to the base station 8 can include removably connecting a connector the dongle 3 to a connector of the base station 8. Additionally or alternatively, docking of the dongle 3 and/or the base station 8 can include placing one of the dongle 3 and/or the base station 8 on the other without connecting any connectors of the dongle 3 and the base station 8 to each other.

The base station 8 includes one or more from among: a processor 200, a network communication transceiver 201, a memory 202, a power supply 203, a battery charger 204, a proximity sensing component 205, a housing 206, or a port 207. Two or more of the processor 200, the network communication transceiver 201, the memory 202, the power supply 203, the battery charger 204, the proximity sensing component 205, or the port 207 can be operatively coupled to each other by a circuit 208, such as an electrical or optical circuit.

The circuit 208 can include one or more circuits, such as one or more electrical or optical circuits. The operative coupling provided by the circuit 208 allows for two or more components of the base station 8 to communicate with and/or signal each other. As an example, the circuit 208 can include a communication bus, such as a serial or parallel communication bus that carries digital signals. As another example, the circuit 208 can include an electrical circuit that carries an analog signal to an analog input of the processor 200.

In at least some implementations of the base station 8, the base station 8 includes an electrical power circuit 209 that connects the power supply 203 to one or more from among the processor 200, the network communication transceiver 201, the memory 202, the battery charger 204, the proximity sensing component 205 or the port 207.

The description of the processor in Section II above is applicable to the processor 200 unless the description dictates otherwise. In at least some implementations of the base station 8, the processor 200 is a specific processor that is programmed to perform any function(s) described in this description as being performed by the base station 8.

The description of the memory in Section II above is applicable to the memory 202 unless the description dictates otherwise. The description of the transceiver in Section II above is applicable to the network communication transceiver 201 unless the description dictates otherwise. The description of the proximity sensing component in Section II above is applicable to the proximity sensing component 205 unless the description dictates otherwise. The description of the battery charger in Section II above is applicable to the battery charger 204 unless the description dictates otherwise.

The description of the power supply in Section II above is applicable to the power supply 203 unless the description dictates otherwise. In at least some implementations, the base station 8 includes an electrical power circuit 209 that connects the power supply 203 to one or more from among the processor 200, the network communication transceiver

201, the memory 202, the battery charger 204, the proximity sensing component 205, or the port 207.

The base station 8 can determine, generate, store, transmit, receive, and/or otherwise use a variety of computer-readable data. At least some of that computer-readable data can be stored in the memory 202. Some of that computer-readable data can include software and/or firmware updates destined for the dongle 3 or the vehicle diagnostic tool 7.

As an example, the memory 202 can contain CRPI 212 executable by the processor 200, a device status 213, and a device identifier 214. The device identifier 214 can include one or more from among: an dongle identifier corresponding to the dongle 3, a vehicle diagnostic tool identifier corresponding to the vehicle diagnostic tool 7, a base station identifier corresponding to the base station 8, or a network identifier corresponding to a device on the communication network 5, such as a network identifier of the server 6. The network identifier of the server 6 can be used to request the software and/or firmware updates for the dongle 3 or the vehicle diagnostic tool 7.

The device status 213 can include data indicative of a status corresponding to the base station 8, the dongle 3, and/or the vehicle diagnostic tool 7. The device status 213 can be based on one or more determinations made by the processor 200. As an example, those determination(s) can indicate whether the dongle 3 is docked and/or within proximity to the base station 8. As another example, those determination(s) can indicate whether the vehicle diagnostic tool 7 is docked and/or within proximity to the base station 8. As yet another example, the determination(s) made by the processor 200 can include a determination whether the battery charger 204 should be turned on or off. Such determination can be based, at least in part, on a battery voltage level (measured by the base station 8) of a battery in the power supply 26, 56.

The network communications transceiver 201 can receive the software and/or firmware from the server 6 by way of the communication network 5. The network communications transceiver 201 can transmit the software and/or firmware configured for use at the dongle 3 to the dongle 3. The network communications transceiver 201 can transmit the software and/or firmware configured for use at the vehicle diagnostic tool 7 to the vehicle diagnostic tool 7. The software and/or firmware can include CRPI configured for execution at the dongle 3 or the vehicle diagnostic tool 7. The processor 200 can execute CRPI 212 to cause the software and/or firmware for the dongle 3 or the vehicle diagnostic tool 7 to be sent to the dongle 3 or the vehicle diagnostic tool 7, respectively so as to update the dongle 3 or the vehicle diagnostic tool 7.

The network communication transceiver 201 can include a wireless transceiver 210. The wireless transceiver 210 can be configured to transmit communications to the dongle 3 and to receive communications from the dongle 3 and/or to transmit communications to the vehicle diagnostic tool 7 and/or the communication network 5, and to receive communications from the vehicle diagnostic tool 7 and/or the communication network 5. In accordance with those implementations, the wireless transceiver 210 can include multiple wireless transceivers, such as a transceiver to perform the communications with the dongle 3 and the vehicle diagnostic tool 7 using a Bluetooth communication protocol and a transceiver to perform communications with the communication network 5 using a Wi-Fi communication protocol. The communications performed using the communication network 5 can include communications sent to the server 6 from the communication network 5 and/or communications received by the communication network 5 from the server 6.

In at least some implementations, the network communication transceiver 201 includes a wired transceiver 211. As an example, the wired transceiver 211 is configured to transmit communications to the dongle 3 and/or the vehicle diagnostic tool 7, and to receive communications from the dongle 3 and/or the vehicle diagnostic tool 7. In at least some implementations, the wired transceiver 211 couples to the wired transceiver 34 (shown in FIG. 4) and/or to the wired transceiver 72 (shown in FIG. 6) via a wiring harness (e.g., a USB harness). As an example, that wiring harness can connect to the connector 49 or the connector 68 shown in FIG. 5 and the connector 225 shown in FIG. 13B. The network communication transceiver 201 can transmit the CRPI received from the communication network 5 to the dongle 3 or the vehicle diagnostic tool 7. In turn, the dongle 3 or the vehicle diagnostic tool can receive the CRPI transmitted by the network communication transceiver 201.

The port 207 can include one or more ports. In at least some implementations, the port 207 includes a first port. The base station 8 in these implementations can receive the vehicle diagnostic tool 7 or the dongle 3 into the first port. In other words, the first port is arranged to receive the vehicle diagnostic tool 7 or the dongle 3 therein. In at least some of these implementations, the base station 8 includes a first set of connector pins. Moreover, the vehicle diagnostic tool 7 or the dongle 3 can include a set of connector pins adapted for mating with the first set of connector pins when the vehicle diagnostic tool 7 or the dongle 3 is disposed within the first port.

In accordance with at least some of the implementations discussed in the previous paragraph, the base station 8 incudes a second port. The base station 8 in these implementations can receive the other of the vehicle diagnostic tool 7 or the dongle 3 into the second port. In other words, the second port is arranged to receive the vehicle diagnostic tool 7 or the dongle 3 therein. In at least some of these additional implementations, the base station 8 includes a second set of connector pins. Moreover, the vehicle diagnostic tool 7 or the dongle 3 can include a set of connector pins adapted for mating with the second set of connector pins when the vehicle diagnostic tool 7 or the dongle 3 is disposed within the second port.

The proximity sensing component 205 can include one or more proximity sensing components and/or a proximity sensor. In general, the proximity sensing component 205 can output an output signal to the processor 200. The output signal of the proximity sensing component 205 can indicate whether the proximity sensing component 205 is in a first state or in a second state. The proximity sensing component 205 being in the first state indicates that an object, such as the dongle 3 or the vehicle diagnostic tool 7, is in proximity to the base station 8 (or more particularly, in proximity to the proximity sensing component 205). Conversely, the proximity sensing component 205 being in the second state indicates that an object, such as the dongle 3 or the vehicle diagnostic tool 7, is not in proximity to the base station 8 (or more particularly, not in proximity to the proximity sensing component 205).

As an example, in at least some implementations, the proximity sensing component 205 includes a switch operable to switch between a first state and a second state based on whether a permanent magnet is in proximity to the switch. The switch, for example, can include a Hall effect sensor or a reed switch. Moreover, the base station 8 can output an output signal that indicates whether the switch is in the first state or in the second state. The switch being in the first state indicates that the dongle 3 is in proximity to the base station 8. Conversely, the switch being in the second state indicates that the dongle 3 is not in proximity to the base station 8.

In at least some implementations, the processor 200 determines which object is in proximity to the base station 8, where the object is the dongle 3 and/or the vehicle diagnostic tool 7. In at least some of these implementations, the proximity sensing component 205 and/or the processor 200 receive an identifier of the object to be able to make the determination. The identifier may be sent to the proximity sensing component 205 via a near-field communication. In at least some of these implementations, the base station 8 has targets designating where on the base station 8 the dongle 3 and the vehicle diagnostic tool 7 are to be docked. Separate proximity sensing components at the target areas can be used to determine whether the dongle 3 and the vehicle diagnostic tool 7 are docked at the respective target area. The processor 200 can use output signals from those separate proximity sensing components to determine whether the dongle 3 and the vehicle diagnostic tool 7 are docked to the base station 8.

In at least some implementations, a target area for the dongle 3 is within a recessed portion of the base station 8 sized to accommodate positioning the dongle 3 within the recessed portion, but not the vehicle diagnostic tool 7 such that processor 200 can determine whether the dongle 3 is in proximity to the base station 8 by being within the recessed portion.

The housing 206 surrounds at least a portion of one or more of the following: the processor 200, the network communication transceiver 201, the memory 202, the power supply 203, the battery charger 204, the proximity sensing component 205, the port 207, the circuit 208, or the electrical power circuit 209. The housing 206 can support a substrate. In at least some example implementations, at least a portion one or more of the following is mounted on and/or connected to the substrate: the processor 200, the network communication transceiver 201, the memory 202, the power supply 203, the battery charger 204, the proximity sensing component 205, the port 207, the circuit 208, or the electrical power circuit 209. The housing 206 can be made from various materials. For example, the housing 206 can be made from a plastic material (e.g., acrylonitrile butadiene styrene (ABS)). Other examples of a material that forms the housing 58 are also possible.

The CRPI 212 can include program instructions executable by the processor 200 to make various determinations. The CRPI 212 can include program instructions executable by the processor 200 to perform various functions, at least some of which can be executed in response to one or more determinations made by the processor 200.

As an example, the CRPI 212 can include program instructions executable by the processor 200 to make the determinations discussed above with respect to the device status 213.

As another example, the CRPI 212 can include program instructions executable by the processor 200 to make a determination that indicates whether an output signal of the proximity sensing component 205 indicates the dongle 3 is within proximity of the base station 8 (or more particularly, the proximity sensing component 205). The base station 8 can output to the vehicle diagnostic tool 7 an output signal based on the output signal of the proximity sensing component 205. The vehicle diagnostic tool 7 can then output a notification (e.g., an icon) that indicate whether the dongle 3 is within proximity of the base station 8. The base station 8 can change the output signal in response to determining a state of the proximity sensing component 205 changing from a first state to a second state, and in response to determining the state of the proximity sensing component 205 changing from the second state to the first state. The first state incudes the dongle 3 being in spatial proximity of the proximity sensing component 205. The second state incudes the dongle 3 not being in spatial proximity of the proximity sensing component 205.

As another example, the CRPI 212 can include program instructions executable by the processor 200 to transmit at least a portion of data within the device status 213 to the vehicle diagnostic tool 7 so that the vehicle diagnostic tool 7 can output an icon corresponding to a status represented by that data within the device status 213.

As another example, the CRPI 212 can include program instructions executable by the processor 200 to output software and/or firmware to the dongle 3 and/or the vehicle diagnostic tool 7.

As yet another example, the CRPI 212 can include program instructions executable by the processor 200 to determine that the dongle 3 or the vehicle diagnostic tool 7 has been docked at the base station 8 by determining that the battery charger 204 has increased a current output to charge a battery at the dongle 3 or the vehicle diagnostic tool 7.

Figures 13A, 13B:
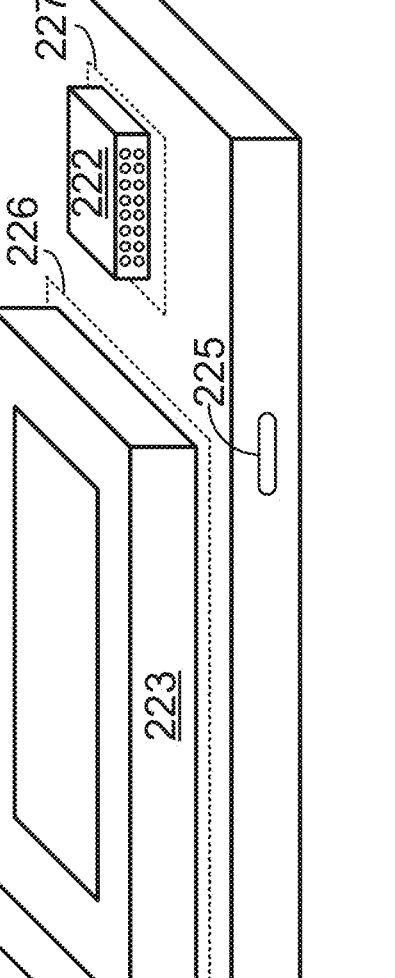
FIG. 13A and FIG. 13B show a base station in accordance with the example implementations.

Next, FIG. 13A and FIG. 13B show a base station 215, 216, respectively. The base station 8 can be arranged like the base station 215, 216. The base station 215, 216 can be arranged like the base station 8. The base station 215 includes a housing 217 which corresponds to the housing 206 in the base station 8. Similarly, the base station 216 includes a housing 224 which corresponds to the housing 206 in the base station 8. The base station 215 includes a port 218, 219, 220 which correspond to the port 207 in the base station 8.

FIG. 13A shows a dongle 221 docked in the port 218, a dongle 222 docked in the port 219, and a vehicle diagnostic tool 223 docked in the port 220. The dongle 3 can be arranged like the dongle 221, 222. The dongle 221, 222 can be arranged like the dongle 3. The vehicle diagnostic tool 7 can be arranged like the vehicle diagnostic tool 223. The vehicle diagnostic tool 223 can be arranged like the vehicle diagnostic tool 7.

The port 218, 219, 220 can each include one or more electrical conductor terminals for mating with electrical conductor terminals in the dongle 221, the dongle 222, and the vehicle diagnostic tool 223, respectively. While installed in and/or attached to the port 218, 219, 220, a power supply (e.g., a battery) in the dongle 221, the dongle 222, and the vehicle diagnostic tool 223 can be charged. Additionally, or alternatively, while installed in and/or attached to the port 218, 219, 220, the base station 215 can carry out communications with the dongle 221, the dongle 222, and the vehicle diagnostic tool 223. As an example, the base station 215 may communicate new software and/or firmware to the dongle 221, the dongle 222, and the vehicle diagnostic tool 223.

As another example, the dongle 221, the dongle 222 may communicate a respective identifier to the base station 215. A processor within the base station 215, such as the processor 200, can transmit the dongle identifier to the vehicle diagnostic tool 223. If the vehicle diagnostic tool 223 is not docked to the base station 215, the processor 200 may cause the network communication transceiver 201 to transmit the dongle identifier to the vehicle diagnostic tool 223 so that the vehicle diagnostic tool 223 can determine that a dongle corresponding to the vehicle diagnostic tool 223 is docked at the base station 215.

The port 218, 219 can include a mating connector similar to a vehicle connector in a vehicle to which the dongle 221, 222 can attach to within a vehicle. Examples of vehicle connectors for particular communication standards are described above.

Next, FIG. 13B shows the dongle 222 and the vehicle diagnostic tool 223 docked at the base station 216. Docking of the dongle 222 and the vehicle diagnostic tool 223 at the base station 216 can occur by placing the dongle 222 and the vehicle diagnostic tool 223 on the base station 216. In at least some implementations, the base station 216 includes a target 226 indicating where the vehicle diagnostic tool 223 is to be placed on the base station 216 to dock the vehicle diagnostic tool 223 to the base station 216. Similarly, the base station 216 can include a target 227 indicating where the dongle 222 is to be placed on the base station 216 to dock the dongle 222 to the base station 216. In accordance with these implementations, a respective coil of a battery charger (e.g., the battery charger 204) can be located within the housing 224 proximate the target 226 and the target 227 such that the maximum strength of the field output by the respective coils outside the housing 224 is available at the areas defined by the target 226 and the target 227.

The base station 216 includes a connector 225. The connector 225 can be part of and/or connected to a network communication transceiver, such as the network communication transceiver 201. In particular, for example, the connector 225 can be connected to the wired transceiver 211. In accordance with that example, the wired transceiver 211 can include a transceiver configured to perform communications according to a USB specification and the connector 225 can include connector pins connected to electrical circuitry for carrying electrical power and/or signals according to a USB specification. The electrical power available at the connector 225 can cause the dongle 221, 222 to power on (i.e., change from an off power state to an on power state). A harness can connect the connector 225 to a connector on the vehicle diagnostic tool 223 or the dongle 222 to allow for communication between a processor, such as the processor 200, and the vehicle diagnostic tool 223 or the dongle 222. The base station 215 can also include a connector similar to the connector 225 (i.e., a connector connectable to the vehicle diagnostic tool 223 or the dongle 221, 222 via a harness). The vehicle diagnostic tool 223 and the dongle 221, 222 can receive computer program updates (e.g., a software or firmware update) while connected to base station 215, 216.

III. Example Operation

A. Example Method Including a Function Shown in FIG. 14

Next, FIG. 14 shows a flow chart depicting a set of functions 600 of a method in accordance with one or more of the example implementations. The set of functions 600 are described briefly in blocks 601 to 603. Two or more functions and/or portions of two or more functions of the set of functions 600 can be performed at the same time. One or more functions of the set of functions 600 can be performed as part of a method including some other function described in this description and/or shown in the drawings, such as a function in the set of functions 610 (shown in FIG. 15), a function in the set of functions 620 (shown in FIG. 16), or some other function.

Block 601 includes receiving, by a processor of a vehicle diagnostic tool, a first output signal of a proximity sensing component operable to output signals including the first output signal, wherein the vehicle diagnostic tool includes an output device and a first wireless transceiver. In at least some implementations, the processor 50, the vehicle diagnostic tool 7, the proximity sensing component 54, the output device 62 are the processor, the vehicle diagnostic tool, the proximity sensor, and the output device referenced in block 601, respectively.

Next, block 602 incudes determining, by the processor based at least in part on the first output signal, a first determination that indicates whether an object is in spatial proximity to the proximity sensing component. In at least some implementations, the proximity sensing component 54 can be configured to have a particular sensing range. The particular sensing range can be defined from a particular end or side of the proximity sensing component 54. The proximity sensing component 54 can output a signal indicating an object is within the particular sensing range when an object is within that range.

In at least some implementations, the object is the dongle 3. In at least some of the implementations in which the object is the dongle 3, the first determination and/or a supplemental determination made by the processor can indicate that the object is the dongle. The determination that the object is the dongle can be explicit. For example, the processor 50 can determine the object is the dongle based on a near-field communication between the dongle 3 and the vehicle diagnostic tool 7. The dongle 3 can provide an identifier of the dongle in such near-field communication. Alternatively, the determination that the object is the dongle can be implicit. For example, the processor 50 can determine the object is the dongle based on the proximity sensor (e.g., a magnetic switch) being triggered by a permanent magnet of the dongle being placed in proximity to the proximity sensor.

Next, block 603 includes outputting, by the processor using the output device, a notification based at least in part on the first determination. As an example, the output device can include the output device 62. In particular, the notification can be output by the display 63 and/or the speaker 64. Moreover, a dongle includes a second wireless transceiver, a vehicle connector, and a vehicle communication transceiver. The vehicle communication transceiver is operable to perform a vehicle communication directly with a vehicle while the vehicle connector is connected to an on-board diagnostic connector of the vehicle. The first wireless transceiver is operable to communicate wirelessly with a second wireless transceiver to trigger a vehicle communication from a dongle to a vehicle.

In at least some implementations of a method that includes performing the set of functions 600, outputting the notification includes outputting a first notification if the first determination indicates an object is in spatial proximity to the proximity sensor or outputting a second notification if the first determination indicates that an object is not in spatial proximity to the proximity sensor. For at least these implementations, the first notification is different than the second notification. The first notification or the second notification can be output by the output device 62 (e.g., the display 63 and/or the speaker 64).

In at least some implementations described in the preceding paragraph, the object is the dongle 3. Moreover, the method of those implementations includes determining, by the processor, whether the dongle and the vehicle diagnostic tool are communicatively paired to each other. The first notification and the second notification both indicate whether the dongle and the vehicle diagnostic tool are communicatively paired to each other. As an example, the communicative paring can occur between the communication transceiver 24 and the communication transceiver 53 according to the BLUETOOTH® version 5.2 standard or another wireless communication standard developed by the Bluetooth SIG. As another example, the communicative paring between the communication transceiver 24 and the communication transceiver 53 can be a communicative pairing according to a BLUETOOTH® standard, but the pairing of the communication transceiver 24 and the communication transceiver 53 occurs via a different communication protocol, such as the NFC standard.

In at least some implementations of a method that includes performing the set of functions 600, the method further includes determining, by the processor, a second determination. The second determination indicates an occurrence of a change in state whether an object is in spatial proximity to the proximity sensor. The change in state includes a change from a first state of the vehicle diagnostic tool to a second state of the vehicle diagnostic tool. The first state represents that an object is currently within a spatial proximity range of the proximity sensor. The second state represents that no object is currently within the spatial proximity range of the proximity sensor. The vehicle diagnostic tool includes a first application (e.g., the application 190) and a second application (e.g., the application 191). The output device includes a display. The processor is executing the second application, but not the first application when determining the second determination. Additionally, the method includes starting, by the processor, an execution of the first application in response to determining the second determination, wherein outputting the notification includes outputting the notification on the display.

In at least some of the implementations described in the previous paragraph, determining the second determination is based at least in part on one or more from among: the first output signal or the first determination.

In at least some implementations of a method that includes performing the set of functions 600, the method further includes determining, by the processor, a second determination. The second determination indicates an occurrence of a change in state whether an object is in spatial proximity to the proximity sensing component. The change in state includes a change from a first state of the vehicle diagnostic tool to a second state of the vehicle diagnostic tool. The first state represents that an object is currently within a spatial proximity range of the proximity sensing component. The second state represents that no object is currently within the spatial proximity range of the proximity sensing component. The method of these implementations further includes determining, by the processor, that the dongle and the vehicle diagnostic tool are not communicatively paired with each other. The method of these implementations also includes outputting, by the processor using the output device, a notification indicative of the dongle and the vehicle diagnostic tool not being communicatively paired with each other.

In at least some of the implementations described in the previous paragraph, determining the second determination is based at least in part on one or more from among: the first output signal or the first determination.

In at least some implementations of a method that includes performing the set of functions 600, the vehicle diagnostic tool includes multiple different power modes including a standby power mode and an awake power mode. The first determination indicates that no object is in spatial proximity to the proximity sensing component. The vehicle diagnostic tool is operating in the standby power mode when determining the first determination. Additionally, the vehicle diagnostic tool switches from the standby power mode to the awake power in response to determining the first determination. Furthermore, as an example, the display 63 can turn on in the awake power mode and/or while transitioning to the awake power mode. Accordingly, the notification output during performance of the set of functions 600 can include a visible notification shown on the display. Furthermore still, the notification output during performance of the set of functions 600 can be output by the speaker 64.

In at least some implementations of a method that includes performing the set of functions 600, the method further includes determining, by the processor, a second determination. The second determination indicates that a first change in state whether an object is in spatial proximity to the proximity sensing component has occurred. The first change in state includes a change from a first state of the vehicle diagnostic tool to a second state of the vehicle diagnostic tool. The first state represents that an object is currently within a spatial proximity range of the proximity sensing component. The second state represents that no object is currently within the spatial proximity range of the proximity sensing component. The method of these implementations also includes starting, by the processor, a timer in response to determining the first change in state. The method further includes determining, by the processor, a passage of a threshold amount of time after starting the timer has occurred. Furthermore, the method includes determining, by the processor, a third determination. The third determination indicating that a second change in state did not occur during the passage of the threshold amount of time and that the second wireless transceiver did not receive a vehicle communication during the passage of the threshold amount of time. The second change in state includes a change from the second state to the first state. Furthermore still, the method includes outputting, by the processor using the output device, a second notification based at least in part on the third determination. The second notification being indicative of the dongle not being within the proximity range of the proximity sensing component.

In at least some of the implementations described in the previous paragraph, determining the second determination is based at least in part on one or more from among: the first output signal or the first determination.

In at least some of the implementations described in any of the two preceding paragraphs, the processor stops the timer in response to determining the dongle is connected to the vehicle 2 and communicating with the vehicle diagnostic tool 7.

In at least some of the implementations described in any of the three preceding paragraphs, starting the timer is conditioned on a dongle being communicatively paired with the vehicle diagnostic tool 7. In accordance with these implementation, if the vehicle diagnostic tool 7 is not communicatively paired with a dongle, the second wireless transceiver will not receive and/or accept any vehicle communication from a dongle. This can be referred to as a not paired, not communicating status.

In at least some implementations of a method that includes performing the set of functions 600, the method further includes determining, by the processor, a second determination. The second determination indicates occurrence of a first change in state whether an object is in spatial proximity to the proximity sensing component. The first change in state includes a change from a first state of the vehicle diagnostic tool to a second state of the vehicle diagnostic tool. The first state represents that an object is currently within a spatial proximity range of the proximity sensing component. The second state represents that no object is currently within the spatial proximity range of the proximity sensing component. The method of these implementation further includes starting, by the processor, a timer in response to determining the first change in state. The method also includes determining, by the processor, a passage of a threshold amount of time after starting the timer. Furthermore, the method of these implementations includes determining, by the processor, a third determination, the third determination indicating that a second change in state did not occur during the passage of the threshold amount of time and that the dongle and the vehicle diagnostic tool are unpaired and currently pairable. The second change in state includes a change from the second state to the first state. Furthermore still, the method of these implementations includes outputting, by the processor using the output device, a second notification based at least in part on the third determination. The second notification includes a prompt to communicatively pair the dongle and the vehicle diagnostic tool to each other.

In at least some of the implementations described in the previous paragraph, the processor stops the timer if the dongle is connected to the OBDC of a vehicle and is paired with the diagnostic tool. Additionally or alternatively, the processor stops the timer if the processor determines that the dongle is in proximity to the proximity sensing component. Still further, in at least some of the implementations described in the previous paragraph, determining the second determination is based at least in part on one or more from among: the first output signal or the first determination.

In at least some implementations of a method that includes performing the set of functions 600, the method further includes determining, by the processor, a second determination. The second determination indicates an occurrence of a change in state whether an object is in spatial proximity to the proximity sensing component. The change in state includes a change from a first state of the vehicle diagnostic tool to a second state of the vehicle diagnostic tool. The first state represents that no object is currently within a spatial proximity range of the proximity sensing component. The second state represents that an object is currently within the spatial proximity range of the proximity sensing component. The vehicle diagnostic tool includes an active identified vehicle at a time of making the second determination. Additionally, the method of these implementations include outputting, by the processor using the output device, a second notification based at least in part on the second determination. The second notification is for prompting a user to clear the active identified vehicle.

In at least some of the implementations described in the previous paragraph, determining the second determination is based at least in part on one or more from among: the first output signal or the first determination.

In at least some implementations of a method that includes performing the set of functions 600, the proximity sensing component is located at a base station operable to receive the dongle. Moreover, receiving the first output signal of the proximity sensing component includes receiving the first output signal from the base station over a wired communication link that connects the vehicle diagnostic tool and the base station or wirelessly from the base station.

In at least some implementations of a method that includes performing the set of functions 600, the vehicle diagnostic tool includes a network transceiver. The network transceiver includes the first wireless transceiver (e.g., a transceiver configured to communicate using the Wi-Fi communication protocol or the LTE/4G communication protocol) or a wired transceiver (e.g., a transceiver configured as a wired Ethernet/network card). The method of the implementations described in this paragraph include receiving, by the network transceiver, CRPI for updating the dongle, and transmitting, from the vehicle diagnostic tool to the dongle, the CRPI for updating the dongle. As an example, transmitting the CRPI can include transmitting the CRPI via a wired USB transmission, a Bluetooth communication protocol transmission, or a Wi-Fi communication protocol transmission.

In at least some implementations of a method that includes performing the set of functions 600, the method further includes determining, by the processor, a second determination. The second determination indicates whether CRPI for updating the dongle have been received at the vehicle diagnostic tool. The method also includes outputting, by the processor using the output device, a notification based at least in part on the second determination. The notification 88 shown in FIG. 7A is an example of the notification based at least in part on the second determination.

FIG. 7B shows a notification 188, 189 and user-selectable controls 192, 193, 194, 195. A notification, such as the notification 188, 189 can be output onto the display 83 in response to the 50 determining that the dongle 3 is within proximity to the vehicle diagnostic tool 7 or the base station 8. The user-selectable controls 192, 193 and the user-selectable controls 194, 195 can be output on the display with the notification 188, 189, respectively. The user-selectable control 192, 193 is selectable to signal to the processor 50 whether to perform the function indicated by the notification 188, 189. Selecting the user-selectable control 193 signals to the processor 50 that a current vehicle session is to continue. Continuing the vehicle session allows for the processor 50 to continue gathering data for the vehicle session, such as data captured by an oscilloscope, multimeter, or camera.

In at least some of the implementations described in the previous paragraph, determining the second determination is based at least in part on one or more from among: the first output signal or the first determination. Additionally or alternatively, the method discussed in the previous paragraph can also include the processor determining whether the dongle has been updated with the CRPI. This additional determination can be used to prevent the base station from downloading the CRPI more than once.

In at least some implementations of a method that includes performing the set of functions 600, the method further includes receiving, by a network transceiver of a base station operable to receive the dongle, computer-readable program instructions for updating the dongle. As an example, the base station can receive the dongle by receiving the dongle into a port of the base station; connecting the dongle and base station via a harness, such as a USB harness; or the dongle being placed upon a charging pad (e.g., an inductive charging pad) of the base station. The method additionally includes transmitting, from the base station to the dongle, the computer-readable program instructions for updating the dongle. As an example, transmitting the CRPI can include transmitting the CRPI via a wired USB transmission, a Bluetooth communication protocol transmission, or a Wi-Fi communication protocol transmission.

B. Example Method Including a Function Shown in FIG. 15

Next, FIG. 15 shows a flow chart depicting a set of functions 610 of a method in accordance with one or more of the example implementations. The set of functions 610 are described briefly in blocks 611 to 613. Two or more functions and/or portions of two or more functions of the set of functions 610 can be performed at the same time. One or more functions of the set of functions 610 can be performed as part of a method including some other function described in this description and/or shown in the drawings, such as a function in the set of functions 600, a function in the set of functions 620, or some other function.

In at least some implementations, a method including the set of functions 610 is performed by a dongle (e.g., the dongle 3) and a vehicle diagnostic tool (e.g., the vehicle diagnostic tool 7). The dongle includes a vehicle communication transceiver (e.g., the vehicle communication transceiver 23), a first wireless transceiver (e.g., the wireless transceiver 33), and a vehicle connector (e.g., the vehicle connector 22). The vehicle diagnostic tool includes a first processor (e.g., the processor 50), a proximity sensing component (e.g., the proximity sensing component 54), an output device (e.g., the output device 62), and a second wireless transceiver (e.g., the wireless transceiver 71).

Block 611 includes outputting, by the proximity sensing component, signals including a first output signal of the proximity sensing component. The description of the proximity sensing component in Section II above is applicable to the proximity sensing component identified in block 601 unless the description dictates otherwise. The first output signal can represent a first state that indicates an object is in proximity to the proximity sensing component. Being in proximity to the proximity sensing component can occur when the object is within the range of the proximity sensing component. Alternatively, the first output signal can represent a second state that indicates an object is not in proximity to the proximity sensing component. Not being in proximity to the proximity sensing component can occur when an object is not within the range of the proximity sensing component. In other implementations, the first output signal can represent a first state that indicates the contacts of a push button switch are contacting one another (when the object depresses the push button switch, or a second state that indicates the contacts of the push button switch are not contacting one another (when the push button switch is not depressed by an object).

Next, block 612 includes receiving, by the first processor, the first output signal of the proximity sensing component and making a first determination. The first determination is indicative of whether the first output signal of the proximity sensing component indicates an object is in spatial proximity to the proximity sensing component. Examples of making the first determination are discussed with respect to block 602.

Next, block 613 includes outputting, by the first processor using the output device, a notification based at least in part on the first determination. Examples of outputting the notification based on the first determination are discussed with respect to block 603.

In at least some implementations of a method including the set of functions 610, the method further includes performing, by the vehicle communication transceiver, a vehicle communication directly with a vehicle while the vehicle connector is connected to an on-board diagnostic connector of the vehicle. In these implementations, the method also includes communicating, by the second wireless transceiver, wirelessly with the first wireless transceiver to trigger a vehicle communication from the dongle to the vehicle while the vehicle connector is connected to the on-board diagnostic connector of the vehicle.

C. Example Method Including a Function Shown in FIG. 16

Figure 16:
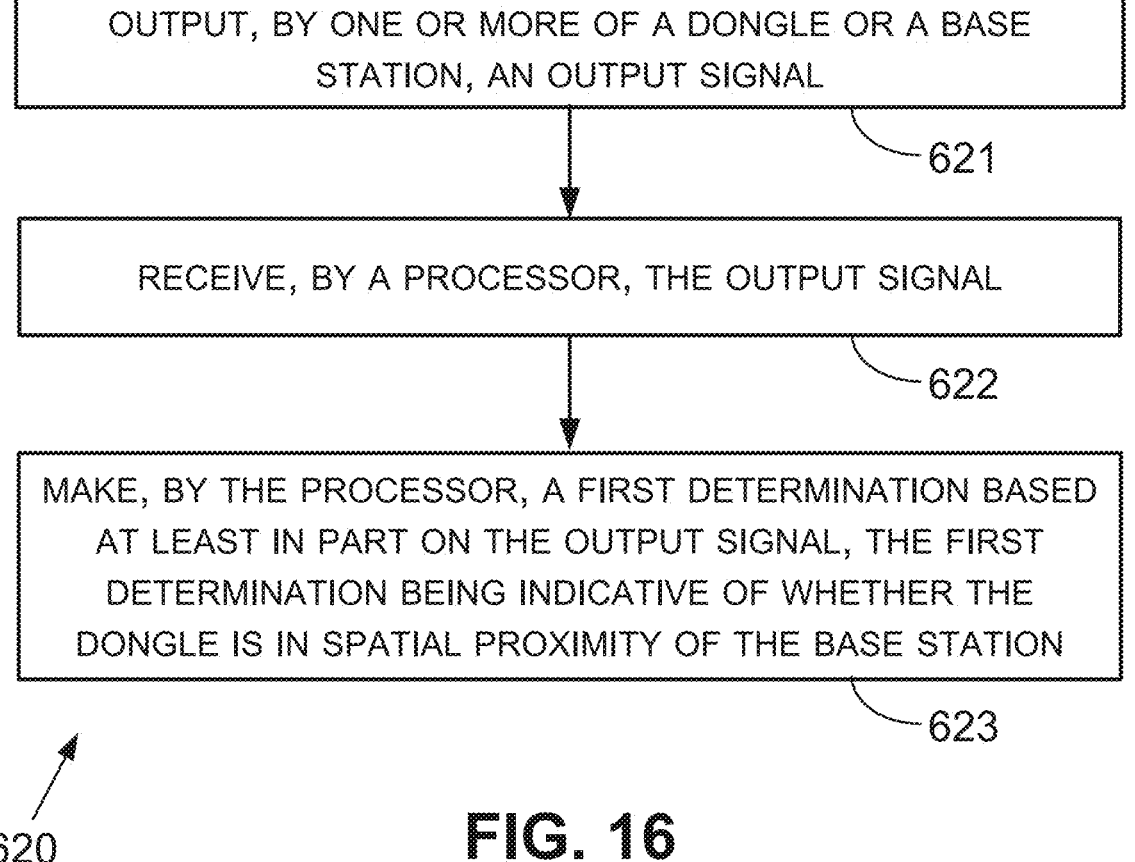

Next, FIG. 16 shows a flow chart depicting a set of functions 620 of a method in accordance with one or more of the example implementations. The set of functions 620 are described briefly in blocks 621 to 623. Two or more functions and/or portions of two or more functions of the set of functions 620 can be performed at the same time. One or more functions of the set of functions 620 can be performed as part of a method including some other function described in this description and/or shown in the drawings, such as a function in the set of functions 600, a function in the set of functions 610, or some other function.

In at least some implementations, a method including the set of functions 620 is performed by a vehicle diagnostic tool (e.g., the vehicle diagnostic tool 7) and one or more of a dongle (e.g., the dongle 3) or a base station (e.g., the base station 8). The dongle includes a vehicle communication transceiver (e.g., the vehicle communication transceiver 23), a first wireless transceiver (e.g., the wireless transceiver 33) and a vehicle connector (e.g., the vehicle connector 22). The vehicle connector is removably connectable to an on-board diagnostic connector in a vehicle (e.g., the vehicle 2). The vehicle diagnostic tool includes a processor (e.g., the processor 50) and a second wireless transceiver (e.g., the wireless transceiver 71).

Block 621 includes outputting, by the one or more of the dongle 3 or the base station 8, an output signal.

In an implementation in which the dongle 3 outputs the output signal, outputting the output signal can include the communication transceiver 24 outputting the output signal. More particularly, include the communication transceiver 24 outputting the output signal can include the wireless transceiver 33 and/or the wired transceiver 34 outputting the output signal. Additionally or alternatively, outputting the output signal by the dongle 3 can include the proximity sensing component 25 outputting the output signal.

In an implementation in which the base station 8 outputs the output signal, outputting the output signal can include the network communication transceiver 201 outputting the output signal. More particularly, include the network communication transceiver 201 outputting the output signal can include the wireless transceiver 210 and/or the wired transceiver 211 outputting the output signal. Additionally or alternatively, outputting the output signal by the base station 8 can include the proximity sensing component 205 outputting the output signal.

Next, block 622 includes receiving, by the processor 50, the output signal. In at least some implementations, the processor 50 receives the output signal from the communication transceiver 53 (more particularly, the wireless transceiver 71 or the wired transceiver 72) after the communication transceiver 53 received the output signal from the communication transceiver 24 or the network communication transceiver 201. In those or in other implementations, the processor 50 receives the output signal from the proximity sensing component 54 by way of the proximity sensing component 25 or the proximity sensing component 205.

Next, block 623 includes making, by the processor, a first determination based at least in part on the output signal. The first determination being indicative of whether the dongle is in spatial proximity of the base station.

In at least some implementations of a method including the set of functions 620, the vehicle diagnostic tool and the dongle are dockable at and/or to the base station. Additionally, the vehicle communication transceiver is operable to perform a vehicle communication directly with a vehicle while the vehicle connector is connected to the on-board diagnostic connector of the vehicle. Even more, the second wireless transceiver is operable to communicate wirelessly with the first wireless transceiver to trigger a vehicle communication from the dongle to the vehicle while the vehicle connector is connected to the on-board diagnostic connector of the vehicle.

In at least some implementations of a method that includes performing the set of functions 620, the method further includes the processor 50 outputting via the output device 62 a notification based at least in part on the first determination. More particularly, the processor 50 can output the notification using the display 63 and/or the speaker 64. Even more particularly, the processor 50 outputting the notification using the display 63 can include displaying an icon, such as the icon 512, 515, 516 shown in FIG. 19.

IV. Example Data Sets

Figure 17:
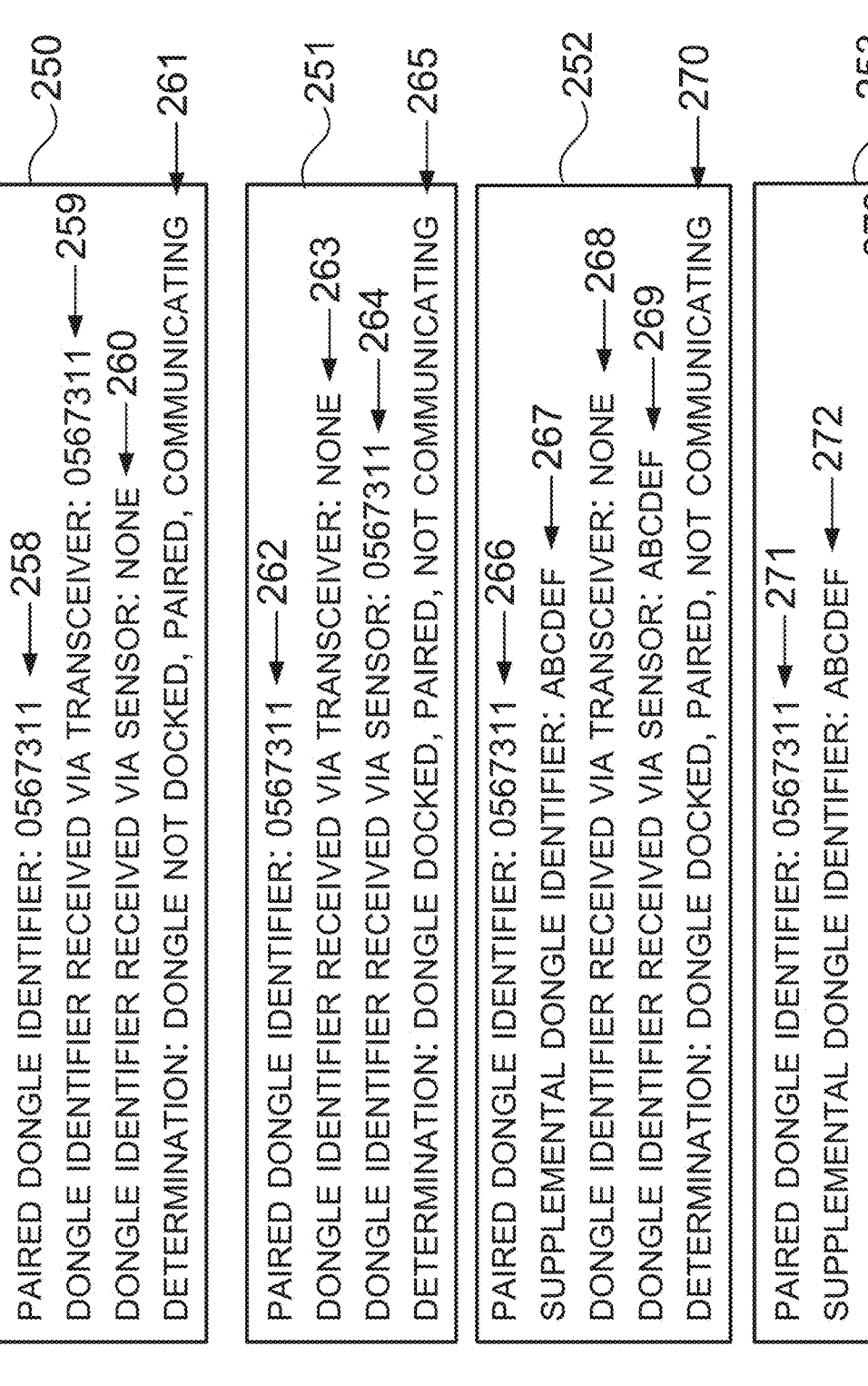

Next, FIG. 17 and FIG. 18 show a data set 250, 251, 252, 253, 254, 255, 256, 257. Each of the data sets includes data indicating whether a dongle (e.g., the dongle 3) is communicatively paired with a vehicle diagnostic tool (e.g., the vehicle diagnostic tool 7). This data can include a dongle identifier. Some of the data sets include a supplemental dongle identifier. Each of the data sets includes data indicating whether any dongle identifier has been received by the vehicle diagnostic tool 7. For purposes of this description, a dongle identifier "0567311" is associated with the dongle 3 and a dongle identifier "ABCDEF" is associated with some other dongle. The data set 250 to the data set 257 can be stored in the memory 51 (e.g., stored within the device status 67).

The data set 250 includes data 258 indicating a dongle identifier "0567311" corresponding to a dongle communicatively paired with the vehicle diagnostic tool 7. The data set 250 includes data 259 indicating that the dongle identifier "0567311" has been received by the vehicle diagnostic tool 7 from a transceiver, such as the communication transceiver 24 during one or more of the most-recent time periods during which the vehicle diagnostic tool 7 checked for receipt of a communication from the communication transceiver 24. The data set 250 includes data 260 that indicates that one or more of the most-recent reports from the proximity sensing component 25 (e.g., a proximity sensor including an NFC target) does not include a dongle identifier, even if some other report from the proximity sensing component 25 prior to the one or more most-recent reports included a dongle identifier. The data set 250 includes data 261 indicating a determination made by the processor 50 based at least in part on other data in the data set 250. The data 261 indicates that the dongle 3 is not docked at the vehicle diagnostic tool 7, but that the vehicle diagnostic tool 7 is communicating with the dongle 3 communicatively paired with the vehicle diagnostic tool 7.

The data set 251 includes data 262 indicating a dongle identifier "0567311" corresponding to a dongle communicatively paired with the vehicle diagnostic tool 7. The data set 251 includes data 263 that indicates the vehicle diagnostic tool 7 did not receive a dongle identifier from the communication transceiver 24 during one or more of the most-recent time periods during which the vehicle diagnostic tool 7 checked for receipt of a communication from the communication transceiver 24. The data set 251 includes data 264 indicating that the dongle identifier "0567311" has been received via one or more of the most-recent reports from the proximity sensing component 25 (e.g., a proximity sensor including an NFC target). The data set 251 includes data 265 indicating a determination made by the processor 50 based at least in part on other data in the data set 251. The data 265 indicates that the dongle 3 is docked at the vehicle diagnostic tool 7, but that the vehicle diagnostic tool 7 is not communicating with the dongle 3 via the communication transceiver 24.

The data set 252 includes data 266 indicating a dongle identifier "0567311" corresponding to a first dongle communicatively paired with the vehicle diagnostic tool 7, and data 267 indicating a dongle identifier "ABCDEF" corresponding to a second dongle communicatively paired with the vehicle diagnostic tool 7. The data set 252 includes data 268 that indicates the vehicle diagnostic tool 7 did not receive a dongle identifier from the communication transceiver 24 during one or more of the most-recent time periods during which the vehicle diagnostic tool 7 checked for receipt of a communication from the communication transceiver 24. The data set 252 includes data 269 indicating that the dongle identifier "ABCDEF" has been received via one or more of the most-recent reports from the proximity sensing component 25 (e.g., a proximity sensor including an NFC target). The data set 252 includes data 270 indicating a determination made by the processor 50 based at least in part on other data in the data set 252. The data 270 indicates that the first dongle is not docked at the vehicle diagnostic tool 7, the second dongle is docked at the vehicle diagnostic tool 7, and that the vehicle diagnostic tool 7 is not communicating with the either of the first and second dongles via the communication transceiver 24.

The data set 253 includes data 271 indicating a dongle identifier "0567311" corresponding to a first dongle communicatively paired with the vehicle diagnostic tool 7, and data 272 indicating a dongle identifier "ABCDEF" corresponding to a second dongle communicatively paired with the vehicle diagnostic tool 7. The data set 253 includes data 273 indicating that the dongle identifier "0567311" has been received from a transceiver, such as the communication transceiver 24 during one or more of the most-recent time periods during which the vehicle diagnostic tool 7 checked for receipt of a communication from the communication transceiver 24. The data set 253 includes data 274 that indicates that one or more of the most-recent reports from the proximity sensing component 25 (e.g., a proximity sensor including an NFC target) does not include a dongle identifier, even if some other report from the proximity sensing component 25 prior to the one or more most-recent reports included a dongle identifier. The data set 253 includes data 275 indicating a determination made by the processor 50 based at least in part on other data in the data set 253. The data 275 indicates that the first and second dongles are not docked at the vehicle diagnostic tool 7, but that the vehicle diagnostic tool 7 is communicating with the first dongle via the communication transceiver 24.

The data set 254 includes data 276 indicating a dongle identifier "0567311" corresponding to a dongle communicatively paired with the vehicle diagnostic tool 7. The data set 254 includes data 277 that indicates the vehicle diagnostic tool 7 did not receive a dongle identifier from the communication transceiver 24 during one or more of the most-recent time periods during which the vehicle diagnostic tool 7 checked for receipt of a communication from the communication transceiver 24. The data set 254 includes data 278 that indicates that one or more of the most-recent reports from the proximity sensing component 25 (e.g., a proximity sensor including an NFC target) does not include a dongle identifier, even if some other report from the proximity sensing component 25 prior to the one or more most-recent reports included a dongle identifier. The data set 254 includes data 279 indicating a determination made by the processor 50 based at least in part on other data in the data set 254. The data 279 indicates that the dongle 3 is not docked at the vehicle diagnostic tool 7, and the vehicle diagnostic tool 7 is not communicating with the dongle 3 via the communication transceiver 24.

The data set 255 includes data 280 indicating a dongle identifier "0567311" corresponding to a first dongle communicatively paired with the vehicle diagnostic tool 7, and data 281 indicating a dongle identifier "ABCDEF" corresponding to a second dongle communicatively paired with the vehicle diagnostic tool 7. The data set 255 includes data 282 that indicates the vehicle diagnostic tool 7 did not receive a dongle identifier from the communication transceiver 24 during one or more of the most-recent time periods during which the vehicle diagnostic tool 7 checked for receipt of a communication from the communication transceiver 24. The data set 255 includes data 283 that indicates that one or more of the most-recent reports from the proximity sensing component 25 (e.g., a proximity sensor including an NFC target) does not include a dongle identifier, even if some other report from the proximity sensing component 25 prior to the one or more most-recent reports included a dongle identifier. The data set 255 includes data 284 indicating a determination made by the processor 50 based at least in part on other data in the data set 255. The data 284 indicates that no dongle is docked at the vehicle diagnostic tool 7, and the vehicle diagnostic tool 7 is not communicating with the first and second dongles via the communication transceiver 24.

The data set 256 includes data 285, 286 indicating that no dongle is communicatively paired with the vehicle diagnostic tool 7. The data set 256 includes data 287 that indicates the vehicle diagnostic tool 7 did not receive a dongle identifier from the communication transceiver 24 during one or more of the most-recent time periods during which the vehicle diagnostic tool 7 checked for receipt of a communication from the communication transceiver 24. The data set 256 includes data 288 that indicates that one or more of the most-recent reports from the proximity sensing component 25 (e.g., a proximity sensor including an NFC target) does not include a dongle identifier, even if some other report from the proximity sensing component 25 prior to the one or more most-recent reports included a dongle identifier. The data set 255 includes data 289 indicating a determination made by the processor 50 based at least in part on other data in the data set 256. The data set 256 includes data 289 that indicates that no dongle is docked at the vehicle diagnostic tool 7, and the vehicle diagnostic tool 7 is not communicating with the first and second dongles via the communication transceiver 24.

The data set 257 includes data 290, 291 indicating that no dongle is communicatively paired with the vehicle diagnostic tool 7. The data set 257 includes data 292 indicating that the dongle identifier "0567311" has been received from a transceiver, such as the communication transceiver 24 during one or more of the most-recent time periods during which the vehicle diagnostic tool 7 checked for receipt of a communication from the communication transceiver 24. The data set 257 includes data 293 that indicates that one or more of the most-recent reports from the proximity sensing component 25 (e.g., a proximity sensor including an NFC target) does not include a dongle identifier, even if some other report from the proximity sensing component 25 prior to the one or more most-recent reports included a dongle identifier. The data set 257 includes data 294 indicating a determination made by the processor 50 based at least in part on other data in the data set 257. The data set 257 includes data 294 that indicates that no dongle is docked at the vehicle diagnostic tool 7, but the vehicle diagnostic tool 7 is communicating with an unpaired dongle via the communication transceiver 24.

V. Example Icons

Next, FIG. 19 shows example icons that can be displayed on a display, such as the display 63. The processor 50 can determine various states corresponding to communications or communication readiness of the vehicle communication transceiver 52 and/or the communication transceiver 53. The communication readiness status can include a status indicating whether two devices are communicatively paired with one another. Additionally, the processor 50 can determine various states corresponding to the dongle 3 being in proximity to the dongle interface device, 4, the vehicle diagnostic tool 7, the base station 8 or a proximity sensing component therein. As an example, the processor 50 can determine a state indicating whether the dongle 3 and/or the vehicle diagnostic tool 7 is docked in or at the base station 8. The processor 50 can output an icon for displaying on the display 63. Table C lists example states that can be determined by the processor 50, and reference numbers corresponding to example icons shown in FIG. 19. The icon corresponding to a reference number in Table C corresponds to the determined state in that same row. Other examples of an icon corresponding to a determined state shown in Table B are possible.

TABLE C

| Determined State | Example icon |
| --- | --- |
| Vehicle diagnostic tool and dongle are paired and communicating wirelessly | 500 |
| Vehicle diagnostic tool and dongle are not paired | 501 |
| Vehicle diagnostic tool and dongle are paired but not communicating | 502 |
| Vehicle diagnostic tool and dongle are paired but not communicating via wired bus (e.g., USB) | 503 |
| Vehicle diagnostic tool and dongle are paired and communicating via wired bus (e.g., USB) | 504 |
| Dongle docked and no dongle paired to vehicle diagnostic tool | 505 |
| Unknown dongle docked, vehicle diagnostic tool paired to other dongle | 506 |
| Paired dongle communicating and not docked | 507 |
| Paired dongle not communicating and not docked | 508 |
| Paired dongle docked | 509 |
| Paired dongle not docked | 510 |
| Vehicle diagnostic tool and unknown dongle docked in base station | 511 |
| Vehicle diagnostic tool and dongle docked in base station but not paired | 512 |
| Vehicle diagnostic tool and dongle docked in base station | 513 |
| Dongle docked in base station, but not vehicle diagnostic tool | 514 |
| Vehicle diagnostic tool docked in base station, but not dongle | 515 |
| Vehicle diagnostic tool and dongle not docked in base station | 516 |

VI. Example Vehicle

A vehicle is a mobile machine that can be used to transport a person, people, and/or cargo. Accordingly, a vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, 400 volts, 800 volts, or some other voltage level. A vehicle can include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can include an electronic control unit (ECU), an OBDC, and a vehicle network that connects the OBDC to the ECU. A vehicle can be operable to operate as an autonomous vehicle.

Some vehicles and types of vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E is 2021/Toyota/Camry/4Cyl, in which "2021" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles, are associated with a unique vehicle identification number (VIN). Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional bar code indicative of a VIN associated with that vehicle.

Figures 20, 21:
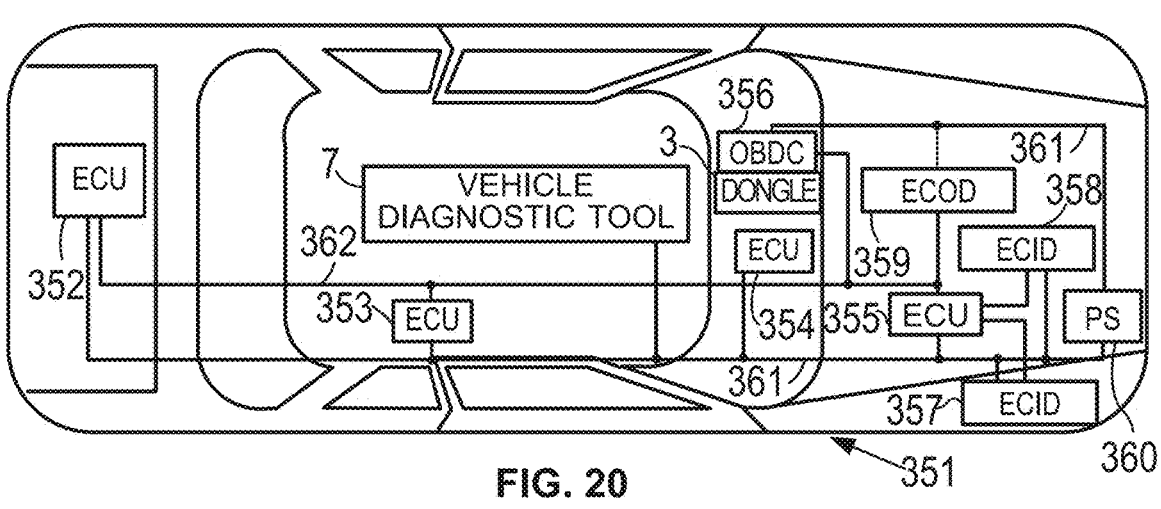
FIG. 20 shows a vehicle in accordance with the example implementations.
FIG. 21 is a simple block diagram of a computing system in in accordance with the example implementations.

FIG. 20 shows a vehicle 351 (e.g., an automobile having an ECU and an OBDC) in accordance with the example implementations and example placement of the vehicle diagnostic tool 7 and the dongle 3 within the vehicle 351.

The vehicle 2 shown in FIG. 1 and FIG. 2 can be arranged like the vehicle 351 or some other type of vehicle.

As shown in FIG. 20, the vehicle 351 includes an ECU 352, 353, 354, 355, an OBDC 356, an ECU controlled input device 357, 358, an ECU controlled output device 359, a power supply 360 (such as a battery), and a power distribution circuit 361. The ECU 352, 353, 354, 355 are operatively connected to the OBDC 356 via the vehicle network 362 to allow transmission of a VDM between the OBDC 356 and the ECU connected to the vehicle network 362. The ECU 352, 353, 354, 355 can be arranged as one of ECU described in this section of the description regarding an example vehicle. The vehicle network 362 can include a wired and/or wireless network.

A vehicle network, such as the vehicle network 362, can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include an SAER J1850 (PWM or VPW) VDM protocol, an SAER J1939 VDM protocol based on the SAER J1939_201808 serial control and communications heavy duty vehicle network-top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle-CAN-Part I: data link layer and physical signaling protocol, a CAN FD VDM protocol (i.e., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 2, 351. Each and every VDM discussed in this description is arranged according to a VDM protocol.

Instead of being bidirectional, a VDM protocol can be a unidirectional. For example, a SENT VDM protocol (i.e., a single-edge nibble transmission VDM protocol) is a unidirectional VDM protocol. The SENT VDM protocol has been standardized as the SAE J2716 VDM protocol. A sensor in a vehicle can include a transmitter operable to communicate using the SENT VDM protocol (i.e., a SENT VDM transmitter). A vehicle communication bus can operatively connect the SENT VDM transmitter and an ECU within the vehicle. The vehicle communication transceiver 23 can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 356, can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A dongle, such as the dongle 3, can operatively connect to an OBDC in order to receive VDM from the vehicle including that OBDC. A VDM can carry VDM data. The VDM data can include a PID (PID) and parameter values associated with the PID. The VDM data can include a DTC.

An ECU can control various aspects of vehicle operation and/or components within a vehicle system. For example, an ECU can include a powertrain (PT) system ECU, an engine control module (ECM) ECU, a supplemental inflatable restraint (SIR) system (i.e., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a diagnostic trouble code (DTC) to a state (such as active or history). An ECU can perform a functional test in response to receiving a VDM requesting performance of the functional test. The functional test can be used to test an ECU-connected output device. In at least some implementations, the ECU is operable to perform the functional test and/or provide the diagnostic trouble code in accordance with an industry standard, such as the SAE J1979_201202 and/or ISO 15031-5 standards for E/E diagnostic test modes.

The OBDC 356 can, for example, be located within a passenger compartment of the vehicle 351, within a powertrain compartment (such as an engine compartment) of the vehicle 351, or within a storage compartment within the vehicle 351 in front of or behind the passenger compartment. The vehicle diagnostic tool 7 is operatively connectable to the OBDC 356 by way of the dongle 3. The vehicle diagnostic tool 7 and the dongle 3 are typically removed after the vehicle 351 has been serviced at a repair shop. In that way, the vehicle diagnostic tool 7 and the dongle 3 can be used to diagnose other vehicles after those vehicles arrive at the repair shop.

The power distribution circuit 361 can include one or more electrical circuits. For example, the power distribution circuit 361 can include cable connected to a positive terminal of a battery, a cable connected to a negative terminal of a battery and/or one or more other electrical conductors. FIG. 20 shows the power distribution circuit 361 extending between the power supply 360 and the ECU 352, 353, 354, 355, between the power supply 360 and the OBDC 356, between the power supply 360 and the ECU controlled output device 359, and between the power supply 360 and the ECU controlled input device 357, 358.

The ECU controlled input device 357, 358 is a device that provides a signal to the ECU 355. The signal represents some characteristic of a vehicle the ECU 355 is operable to monitor. As an example, the ECU controlled input device 357, 358 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other type of sensor. An ECU, such as the ECU 355, can generate a PID parameter value based on a signal received from an ECU controlled input device.

The ECU controlled output device 359 is a device controlled by the ECU 355. The ECU 355 can control the ECU controlled output device 359 using an output signal. As an example, the ECU controlled output device 359 can include one from among: a fuel injector, a motor, a pump, a relay, solenoid, a transformer, or a valve. Other examples of the ECU controlled output device 359 are also possible. An ECU, such as the ECU 355, can generate a PID parameter value based on a signal the ECU provides to an ECU controlled input device. Moreover, an ECU, such as the ECU 355, can receive a vehicle data message from the dongle 3 requesting the ECU to activate the ECU controlled output device.

VII. Example Computing System Configuration

Next, FIG. 21 is a simple block diagram of a computing system 300 in accordance with the example implementations. In a basic configuration 301, the computing system 300 can include one or more processors 302 and a system memory 304. A memory bus 309 can be used for communicating between the processor 302 and the system memory 304. Depending on the desired configuration, the processor 302 can be of any type including but not limited to a microprocessor (μP), a microcontroller (μC), a digital signal processor (DSP), or any combination thereof. A memory controller 303 can also be used with the processor 302, or in some implementations, the memory controller 303 can be an internal part of the processor 302.

Depending on the desired configuration, the system memory 304 can be of any type including but not limited to volatile memory (such as RAM), non-volatile memory (such as ROM, flash memory, etc.) or any combination thereof. The system memory 304 can include one or more applications 305, and program data 307. The application 305 can include an algorithm 306 that is arranged to perform the functions described as being performed by the dongle 3, the vehicle diagnostic tool 7, the base station 8, or the server 6. The program data 307 can include system data 308 that could be directed to any number of types of data, such as the computer-readable data stored in the memory 21, 51, 202. In some example implementations, the applications 305 can be arranged to operate with the program data 307 on an operating system executable by the processor 302.

The computing system 300 can have additional features or functionality, and additional interfaces to facilitate communications between the basic configuration 301 and any devices and interfaces. For example, storage devices 310 can be provided including removable storage devices 311, non-removable storage devices 312, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and non-volatile, non-transitory, removable and non-removable media implemented in any method or technology for storage of information, such as computer-readable program instructions, data structures, program modules, or other data such as the data stored in a computer-readable memory, such at the memory 21, 51, 202.

The system memory 304 and the storage devices 310 are examples of computer-readable memory, such as the memory 21, 51, 202. The system memory 304 and the storage devices 310 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 300.

The computing system 300 can include or be implemented as a portion of a small-form factor portable (i.e., mobile) electronic device such as a smartphone (e.g., an IPHONE® smartphone from Apple Inc. of Cupertino, California, or a GALAXY S® smartphone from Samsung Electronics Co., Ltd. of Mactan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 305, or the program data 307 can include an application downloaded to the communication interfaces 317 from the APP STORE® online retail store, from the GOOGLE PLAY® online retail store, or another source of the applications. A component of the vehicle diagnostic tool 7, such as the display 63, the speaker 64, or the communication transceiver 53, or the vehicle diagnostic tool 7 itself can be embodied in or as the small-form factor electronic device.

The computing system 300 and/or the vehicle diagnostic tool 7 can include or be implemented as part of a personal computing system (including both laptop computer and non-laptop computer configurations), or a server, such as the server 6. The computing system 300 can be configured as an embedded system in which the processor 302 includes an embedded processor and the system memory 304 includes an embedded memory.

The computing system 300 can also include output interfaces 313 that can include a graphics processing unit 314, which can be configured to communicate to various external devices such as display devices 316 or speakers via one or more A/V ports 315 or a communication interface 317. The communication interface 317 can include a network controller 318, which can be arranged to facilitate communications with the other computing systems 320 over a network communication via one or more communication ports 319. The communication connection is one example of a communication media. Communication media can be embodied by computer-readable program instructions, data structures, program modules, graphical user interfaces (GUIs), PID topics, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

For the vehicle diagnostic tool 7, the communication interface 317 can include the vehicle communication transceiver 52 and/or the communication transceiver 53, and the communication port 319 can include a communication port connectable to a printer for printing a paper copy of GUI content.

Figure 22:
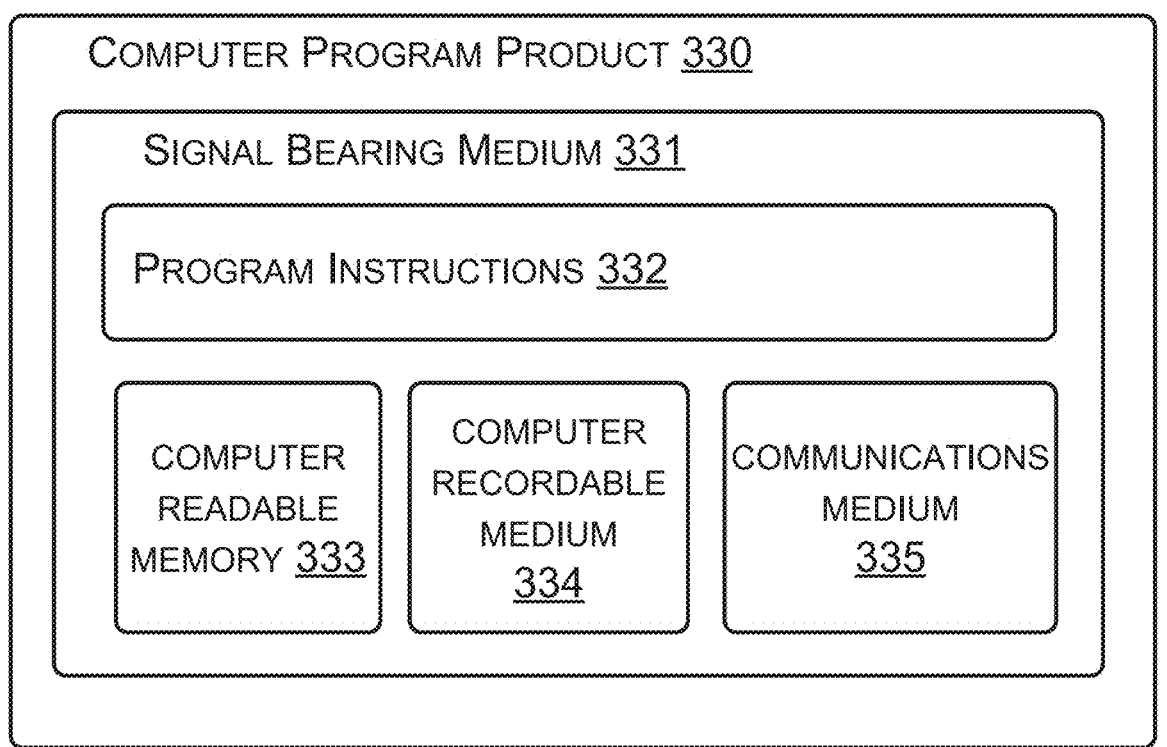
FIG. 22 shows a schematic illustrating a conceptual partial view of a computer program product in accordance with the example implementations.

Next, FIG. 22 shows a schematic illustrating a conceptual partial view of a computer program product 330. The computer program product 330 includes a computer program for executing a computer process on a computing system, arranged according to at least some implementations presented herein. That computer program can be encoded on a non-transitory computer-readable storage medium in a machine-readable format, or on another non-transitory medium or article of manufacture.

In at least some implementations, the computer program product 330 is provided using a signal bearing medium 331. The signal bearing medium 331 can include one or more programming instructions 332 that, when executed by one or more processors can provide functionality or portions of the functionality described above with respect to FIG. 1 to FIG. 21. In some examples, the signal bearing medium 331 can encompass a computer-readable memory 333, such as, but not limited to, a hard disk drive, a Compact Disc (CD), a Digital Video Disk (DVD), a digital tape, or any other memory described herein. In some implementations, the signal bearing medium 331 can encompass a computer recordable medium 334, such as, but not limited to, memory, read/write (R/W) CDs, R/W DVDs, etc. In some implementations, the signal bearing medium 331 can encompass a communications medium 335, such as, but not limited to, a digital and/or an analog communication medium (e.g., a fiber optic cable, a waveguide, a wired communications link, a wireless communication link, etc.). Thus, for example, the signal bearing medium 331 can be conveyed by a wireless form of the communications medium 335 (e.g., a wireless communications medium conforming to the IEEE 802.11 standard or another transmission protocol).

The one or more programming instructions 332 can be, for example, computer executable and/or logic implemented instructions. In some examples, a computing system such as the computing system 300 of FIG. 21 can be configured to provide various operations, functions, or actions in response to the programming instructions 332 conveyed to the computing system 300 by one or more of the following; the computer-readable memory 333, the computer recordable medium 334, or the communications medium 335.

In at least some implementations, the computing system 300 or some component(s) thereof can be arranged like the dongle 3 or some component(s) thereof. For example, the processor 302 can be arranged like and/or include the processor 20, the system memory 304 and/or the storage devices 310 can be arranged like and/or include the memory 21, the communication interfaces 317 can be arranged like and/or include the vehicle communication transceiver 23, the communication transceiver 24, and/or the vehicle connector 22.

In at least some implementations, the computing system 300 or some component(s) thereof can be arranged like the vehicle diagnostic tool 7 or some component(s) thereof. For example, the processor 302 can be arranged like and/or include the processor 50, the system memory 304 and/or the storage devices 310 can be arranged like and/or include the memory 51, the communication interfaces 317 can be arranged like and/or include the communication transceiver 53, the wireless transceiver 71, and/or the wired transceiver 72.

In at least some implementations, the computing system 300 or some component(s) thereof can be arranged like the base station 8 or some component(s) thereof. For example, the processor 302 can be arranged like and/or include the processor 200, the system memory 304 and/or the storage devices 310 can be arranged like and/or include the memory 202, the communication interfaces 317 can be arranged like and/or include the network communication transceiver 201, the wireless transceiver 210, and/or the wired transceiver 211.

VIII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by one or more processors executing computer-readable program instructions or by a combination of hardware, firmware, and/or software. For purposes of this description, execution of CRPI contained in a computer-readable memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. In accordance with the aforementioned example and at least some of the example implementations, "A" can represent a component, "B" can represent a system, and "C" can represent a symptom.

The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

The use of the term "port" in description pertains to a hardware port rather than a software port unless the context of using the term port explicitly indicates otherwise.

Implementations of the present disclosure may thus relate to one of the enumerated example embodiments (EEEs) listed below.

EEE A1 is a system comprising: a dongle including a vehicle communication transceiver, a first wireless transceiver, and a vehicle connector; a vehicle diagnostic tool including a first processor, a proximity sensing component, an output device, and a second wireless transceiver, wherein: the proximity sensing component is operable to output signals including a first output signal of the proximity sensing component, the first processor is operable to receive the first output signal of the proximity sensing component and make a first determination, the first determination being indicative of whether the first output signal of the proximity sensing component indicates an object is in spatial proximity to the proximity sensing component, the first processor is operable to output using the output device a notification based at least in part on the first determination, the vehicle communication transceiver is operable to perform a vehicle communication directly with a vehicle while the vehicle connector is connected to an on-board diagnostic connector of the vehicle, and the second wireless transceiver is operable to communicate wirelessly with the first wireless transceiver to trigger a vehicle communication from the dongle to the vehicle while the vehicle connector is connected to the on-board diagnostic connector of the vehicle.

EEE A2 is a system according to EEE A1, wherein the vehicle diagnostic tool is adapted to removably retain the dongle.

EEE A3 is a system according to EEE A1, wherein the vehicle diagnostic tool is adapted to removably retain the dongle magnetically or using a band, a strap, or a net.

EEE A4 is a system according to any one of EEE A2-A3, wherein: the dongle includes a first housing, the vehicle diagnostic tool includes a second housing, the second housing includes a wall having an internal surface and an external surface, the wall includes a recess defined by multiple wall portions and a portion of the external surface, the multiple wall portions include at least a first wall portion and a second wall portion, and the vehicle diagnostic tool being adapted to removably retain the dongle includes the vehicle diagnostic tool being adapted to removably retain the dongle within the recess.

EEE A5 is a system according to EEE A4, wherein the multiple wall portions include one or more through-holes extending from the internal surface to the external surface for operational access of the proximity sensing component into the recess.

EEE A6 is a system according to EEE A5, wherein: the proximity sensing component includes a light transmitter and a photoelectric receiver, and the operational access allows electromagnetic radiation emitted by the light transmitter to pass through the one or more through-holes and allows electromagnetic radiation reflecting off the object to pass through the one or more through-holes.

EEE A7 is a system according to EEE A6, wherein: the light transmitter includes a light emitting diode, and the photoelectric receiver includes a photodiode.

EEE A8 is a system according to EEE A4, wherein the first wall portion and the second wall portion are adapted for removably retaining the dongle by the first wall portion and the second wall portion being in contact with the first housing.

EEE A9 is a system according to any one of EEE A1-A8, wherein the proximity sensing component includes a push button switch having a movable contact fixedly connected to a push button plunger.

EEE A10 is a system according to any one of EEE A1-A9, wherein: the dongle includes a radio frequency transmitter and first data corresponding to the dongle, the proximity sensing component includes a radio frequency receiver operable to receive the first data, and the first determination includes a determination that the object is within proximity to the proximity sensing component and a determination that the object is the dongle.

EEE A11 is a system according to EEE A10, wherein: the vehicle diagnostic tool includes a computer-readable memory containing second data, the second data is indicative of a particular dongle communicatively paired with the vehicle diagnostic tool, and the first processor is configured to determine that the dongle indicated by the first data is the particular dongle communicatively paired with the vehicle diagnostic tool.

EEE A12 is a system according to EEE A11, wherein the first processor is configured to determine that the dongle indicated by the first data is the particular dongle communicatively paired with the vehicle diagnostic tool by determining the first data matches the second data.

EEE A13 is a system according to any one of EEE A1-12, wherein: the dongle includes a permanent magnet, the proximity sensing component includes a switch, the switch is operable to switch from a first state to a second state during a movement of the dongle and/or the vehicle diagnostic tool such that the permanent magnet is in proximity to the proximity sensing component, the switch is operable to switch from the second state to the first state during a movement of the dongle and/or the vehicle diagnostic tool such that the permanent magnet is not in proximity to the proximity sensing component, and the signals including the first output signal of the proximity sensing component indicate whether the switch is in the first state or the second state.

EEE A14 is a system according to any one of EEE A1-A13, wherein the proximity sensing component includes an ultrasonic transducer operable to emit an ultrasonic signal and to detect reception of an ultrasonic signal.

EEE A15 is a system according to any one of EEE A1-A14, wherein: the vehicle diagnostic tool includes an output device, the first processor being operable to output a notification based on the first determination includes the first processor being operable to output a first notification using the output device if the first determination indicates an object is in spatial proximity to the proximity sensing component, the first processor being operable to output a notification based on the first determination includes the first processor being operable to output a second notification using the output device if the first determination indicates that an object is not in spatial proximity to the proximity sensing component, and the first notification is different than the second notification.

EEE A16 is a system according to any one of EEE A1-A15, wherein the proximity sensing component includes: an infrared sensor, a visible light sensor, an ultraviolet light sensor, an ultrasonic sensor, a magnetic sensor, a radio frequency receiver, or an electromechanical switch.

EEE A17 is a system according to any one of EEE A1-A15, wherein: the first processor is operable to determine a second determination, the second determination indicates an occurrence of a change in state whether an object is in spatial proximity to the proximity sensing component, the change in state includes a change from a first state of the vehicle diagnostic tool to a second state of the vehicle diagnostic tool, the first state represents that an object is currently within a proximity range of the proximity sensing component; the second state represents that no object is currently within the proximity range of the proximity sensing component, the vehicle diagnostic tool includes a display, a first application, and a second application, the first processor is operable to execute the second application, but not the first application when determining the second determination, the first processor is configured to start an execution of the first application in response to determining the second determination, the output of the notification includes an output on the display, and the output on the display includes a display screen resulting from the execution of the first application.

EEE A18 is a system according to any one of EEE A1-A15, wherein: the first processor is operable to determine a second determination, the second determination indicates an occurrence of a change in state whether an object is in spatial proximity to the proximity sensing component, the change in state includes a change from a first state of the vehicle diagnostic tool to a second state of the vehicle diagnostic tool, the first state represents that an object is currently within a proximity range of the proximity sensing component; the second state represents that no object is currently within the proximity range of the proximity sensing component, the first processor is operable to determine that the dongle and the vehicle diagnostic tool are not communicatively paired with each other, and the first processor is operable to output an indicator for prompting a user to communicatively pair the dongle and the vehicle diagnostic tool to each other.

EEE A19 is a system according to any one of EEE A1-A18, wherein: the vehicle diagnostic tool is operable in multiple different power modes including a standby power mode and an awake power mode, the first determination indicates that no object is in spatial proximity to the proximity sensing component, the vehicle diagnostic tool is operating in the standby power mode when determining the first determination; and the vehicle diagnostic tool is configured to switch from the standby power mode to the awake power in response to determining the first determination.

EEE A20 is a system according to any one of EEE A1-A15, wherein: the first processor is operable to determine a second determination, the second determination indicates occurrence of a first change in state whether an object is in spatial proximity to the proximity sensing component, the first change in state includes a change from a first state of the vehicle diagnostic tool to a second state of the vehicle diagnostic tool, the first state represents that an object is currently within a proximity range of the proximity sensing component; the second state represents that no object is currently within the proximity range of the proximity sensing component, the first processor is operable to: start a timer in response to determining the second determination, determine a passage of a threshold amount of time after starting the timer has occurred, determine a third determination, and output, using the output device, a second notification based at least in part on the third determination, the third determination indicates that the vehicle diagnostic tool did not change from the second state to the first state during the passage of the threshold amount of time and that the second wireless transceiver did not receive a vehicle communication during the passage of the threshold amount of time, and the second notification indicates the dongle is not within the proximity range of the proximity sensing component.

EEE A21 is a system according to EEE A20, wherein: the first processor is operable to determine a third determination, the third determination indicates that the dongle and the vehicle diagnostic tool are communicatively paired with each other, and starting the timer is conditioned on the first processor making the third determination.

EEE A22 is a system according to any one of EEE A1-A15, wherein: the first processor is operable to determine a second determination, the second determination indicates occurrence of a first change in state whether an object is in spatial proximity to the proximity sensing component, the first change in state includes a change from a first state of the vehicle diagnostic tool to a second state of the vehicle diagnostic tool, the first state represents that an object is currently within a proximity range of the proximity sensing component; the second state represents that no object is currently within the proximity range of the proximity sensing component, the first processor is operable to: start a timer in response to determining the second determination, determine a passage of a threshold amount of time after starting the timer has occurred, determine a third determination, and output, using the output device, a second notification based at least in part on the third determination, the third determination indicates that the vehicle diagnostic tool did not change from the second state to the first state during the passage of the threshold amount of time and that the dongle and the vehicle diagnostic tool are unpaired and currently pairable, and the second notification includes a prompt to communicatively pair the dongle and the vehicle diagnostic tool to each other.

EEE A23 is a system according to any one of EEE A1-A15, wherein: the first processor is operable to determine a second determination, the second determination indicates an occurrence of a change in state whether an object is in spatial proximity to the proximity sensing component, the change in state includes a change from a first state of the vehicle diagnostic tool to a second state of the vehicle diagnostic tool, the first state represents that no object is currently within a proximity range of the proximity sensing component; the second state represents that an object is currently within the proximity range of the proximity sensing component, and the vehicle diagnostic tool includes an active identified vehicle at a time of making the second determination, the first processor is operable to output, using the output device, a second notification based at least in part on the second determination, and the second notification includes a prompt to clear the active identified vehicle.

EEE A24 is a system according to any one of EEE A1-A23, wherein: the dongle further comprises a second processor and a computer-readable memory.

EEE A25 is a method performed by a dongle and a vehicle diagnostic tool, the dongle including a vehicle communication transceiver, a first wireless transceiver, and a vehicle connector, and the vehicle diagnostic tool including a first processor, a proximity sensing component, an output device, and a second wireless transceiver, the method comprising: outputting, by the proximity sensing component, signals including a first output signal of the proximity sensing component, receiving, by the first processor, the first output signal of the proximity sensing component and making a first determination, the first determination being indicative of whether the first output signal of the proximity sensing component indicates an object is in spatial proximity to the proximity sensing component, outputting, by the first processor using the output device, a notification based at least in part on the first determination, performing, by the vehicle communication transceiver, a vehicle communication directly with a vehicle while the vehicle connector is connected to an on-board diagnostic connector of the vehicle, and communicating, by the second wireless transceiver, wirelessly with the first wireless transceiver to trigger a vehicle communication from the dongle to the vehicle while the vehicle connector is connected to the on-board diagnostic connector of the vehicle.

EEE B1 is a method comprising: receiving, by a processor of a vehicle diagnostic tool, a first output signal of a proximity sensing component operable to output signals including the first output signal, wherein the vehicle diagnostic tool includes an output device and a first wireless transceiver; determining, by the processor based at least in part on the first output signal, a first determination that indicates whether an object is in spatial proximity to the proximity sensing component; and outputting, by the processor using the output device, a notification based at least in part on the first determination, wherein: the first wireless transceiver is operable to communicate wirelessly with a second wireless transceiver to trigger a vehicle communication from a dongle to a vehicle, the dongle includes the second wireless transceiver, a vehicle connector, and a vehicle communication transceiver, and the vehicle communication transceiver is operable to perform a vehicle communication directly with the vehicle while the vehicle connector is connected to an on-board diagnostic connector of the vehicle.

EEE B2 is a method according to EEE B1, wherein the object is the dongle.

EEE B3 is a method according to any one of EEE B1-B2, wherein: outputting the notification includes outputting a first notification if the first determination indicates an object is in spatial proximity to the proximity sensing component or outputting a second notification if the first determination indicates that an object is not in spatial proximity to the proximity sensing component, and the first notification is different than the second notification.

EEE B4 is a method according to EEE B3, wherein: the object is the dongle, the method further comprising: determining, by the processor, whether the dongle and the vehicle diagnostic tool are communicatively paired to each other, and the first notification and the second notification both indicate whether the dongle and the vehicle diagnostic tool are communicatively paired to each other.

EEE B5 is a method according to any one of EEE B1-B4, further comprising: determining, by the processor, a second determination, the second determination indicating an occurrence of a change in state whether an object is in spatial proximity to the proximity sensing component, wherein: the change in state includes a change from a first state of the vehicle diagnostic tool to a second state of the vehicle diagnostic tool, the first state represents that an object is currently within a spatial proximity range of the proximity sensing component; the second state represents that no object is currently within the spatial proximity range of the proximity sensing component, the vehicle diagnostic tool includes a first application and a second application, the output device includes a display, the processor is executing the second application, but not the first application when determining the second determination, and starting, by the processor, an execution of the first application in response to determining the second determination, wherein outputting the notification includes outputting the notification on the display.

EEE B6 is a method according to any one of EEE B1-B4, further comprising: determining, by the processor, a second determination, the second determination indicating an occurrence of a change in state whether an object is in spatial proximity to the proximity sensing component, wherein: the change in state includes a change from a first state of the vehicle diagnostic tool to a second state of the vehicle diagnostic tool, the first state represents that an object is currently within a spatial proximity range of the proximity sensing component; the second state represents that no object is currently within the spatial proximity range of the proximity sensing component, determining, by the processor, that the dongle and the vehicle diagnostic tool are not communicatively paired with each other; and outputting, by the processor using the output device, a notification indicative of the dongle and the vehicle diagnostic tool not being communicatively paired with each other.

EEE B7 is a method according to any one of EEE B1-B6, wherein: the vehicle diagnostic tool includes multiple different power modes including a standby power mode and an awake power mode, the first determination indicates that no object is in spatial proximity to the proximity sensing component, the vehicle diagnostic tool is operating in the standby power mode when determining the first determination; and the vehicle diagnostic tool switches from the standby power mode to the awake power in response to determining the first determination.

EEE B8 is a method according to any one of EEE B1-B4, further comprising: determining, by the processor, a second determination, the second determination indicating that a first change in state whether an object is in spatial proximity to the proximity sensing component has occurred, wherein: the first change in state includes a change from a first state of the vehicle diagnostic tool to a second state of the vehicle diagnostic tool, the first state represents that an object is currently within a spatial proximity range of the proximity sensing component; the second state represents that no object is currently within the spatial proximity range of the proximity sensing component, starting, by the processor, a timer in response to determining the first change in state; determining, by the processor, a passage of a threshold amount of time after starting the timer has occurred; determining, by the processor, a third determination, the third determination indicating that a second change in state did not occur during the passage of the threshold amount of time and that the second wireless transceiver did not receive a vehicle communication during the passage of the threshold amount of time, wherein the second change in state includes a change from the second state to the first state; and outputting, by the processor using the output device, a second notification based at least in part on the third determination, the second notification being indicative of the dongle not being within the proximity range of the proximity sensing component.

EEE B9 is a method according to EEE B8, wherein determining the second determination is based at least in part on one or more from among: the first output signal or the first determination.

EEE B10 is a method according to any one of EEE B1-B4, further comprising: determining, by the processor, a second determination, the second determination indicating occurrence of a first change in state whether an object is in spatial proximity to the proximity sensing component, wherein: the first change in state includes a change from a first state of the vehicle diagnostic tool to a second state of the vehicle diagnostic tool, the first state represents that an object is currently within a spatial proximity range of the proximity sensing component; and the second state represents that no object is currently within the spatial proximity range of the proximity sensing component, starting, by the processor, a timer in response to determining the first change in state; determining, by the processor, a passage of a threshold amount of time after starting the timer; determining, by the processor, a third determination, the third determination indicating that a second change in state did not occur during the passage of the threshold amount of time and that the dongle and the vehicle diagnostic tool are unpaired and currently pairable, wherein the second change in state includes a change from the second state to the first state; and outputting, by the processor using the output device, a second notification based at least in part on the third determination, the second notification includes a prompt to communicatively pair the dongle and the vehicle diagnostic tool to each other.

EEE B11 is a method according to any one of EEE B1-B4, further comprising: determining, by the processor, a second determination, the second determination indicating an occurrence of a change in state whether an object is in spatial proximity to the proximity sensing component, wherein: the change in state includes a change from a first state of the vehicle diagnostic tool to a second state of the vehicle diagnostic tool, the first state represents that no object is currently within a spatial proximity range of the proximity sensing component; the second state represents that an object is currently within the spatial proximity range of the proximity sensing component, and the vehicle diagnostic tool includes an active identified vehicle at a time of making the second determination; and outputting, by the processor using the output device, a second notification based at least in part on the second determination, the second notification for prompting a user to clear the active identified vehicle.

EEE B12 is a method according to any one of EEE B1-B11, wherein: the proximity sensing component is located at a base station operable to receive the dongle, and receiving the first output signal of the proximity sensing component includes receiving the first output signal from the base station over a wired communication link that connects the vehicle diagnostic tool and the base station or wirelessly from the base station.

EEE B13 is a method according to any one of EEE B1-B12, wherein: the vehicle diagnostic tool includes a network transceiver, and the network transceiver includes the first wireless transceiver or a wired transceiver, the method further comprises: receiving, by the network transceiver, computer-readable program instructions for updating the dongle, and transmitting, from the vehicle diagnostic tool to the dongle, the computer-readable program instructions for updating the dongle.

EEE B14 is a method according to any one of EEE B1-B13, further comprising: determining, by the processor, a second determination, the second determination indicating whether computer-readable program instructions for updating the dongle have been received at the vehicle diagnostic tool, and outputting, by the processor using the output device, a notification based at least in part on the second determination.

EEE B15 is a method according to any one of EEE B1-B14, further comprising: receiving, by a network transceiver of a base station operable to receive the dongle, computer-readable program instructions for updating the dongle; and transmitting, from the base station to the dongle, the computer-readable program instructions for updating the dongle.

EEE B16 is a vehicle diagnostic tool comprising: a processor; an output device; a first wireless transceiver; and non-transitory computer-readable data storage storing executable instructions, wherein execution of the executable instructions by the processor causes the vehicle diagnostic tool to: receive, by the processor, a first output signal of a proximity sensing component, the proximity sensing component being operable to output signals including the first output signal; determine, by the processor based at least in part on the first output signal, a first determination, the first determination indicating whether an object is in spatial proximity to the proximity sensing component, wherein a vehicle diagnostic tool includes the processor, an output device, and a first wireless transceiver; and output, by the processor using the output device, a notification based at least in part on the first determination, wherein: the first wireless transceiver is operable to communicate wirelessly with a second wireless transceiver to trigger a vehicle communication from a dongle to a vehicle, the dongle includes the second wireless transceiver, a vehicle connector, and a vehicle communication transceiver, and the vehicle communication transceiver is operable to perform a vehicle communication directly with the vehicle while the vehicle connector is connected to an on-board diagnostic connector of the vehicle.

EEE B17 is a non-transitory computer-readable data storage medium having stored thereon instructions executable by a processor to cause a vehicle diagnostic tool to perform functions, the vehicle diagnostic tool includes the processor, an output device, and a first wireless transceiver, the functions comprise: receiving, by the processor, a first output signal of a proximity sensing component, the proximity sensing component being operable to output signals including the first output signal; determining, by the processor based at least in part on the first output signal, a first determination, the first determination indicating whether an object is in spatial proximity to the proximity sensing component; and outputting, by the processor using the output device, a notification based at least in part on the first determination, wherein: the first wireless transceiver is operable to communicate wirelessly with a second wireless transceiver to trigger a vehicle communication from a dongle to a vehicle, the dongle includes the second wireless transceiver, a vehicle connector, and a vehicle communication transceiver, and the vehicle communication transceiver is operable to perform a vehicle communication directly with the vehicle while the vehicle connector is connected to an on-board diagnostic connector of the vehicle.

EEE C1 is a system comprising: a dongle, the dongle including a vehicle communication transceiver, a first wireless transceiver and a vehicle connector, the vehicle connector being removably connectable to an on-board diagnostic connector in a vehicle; a vehicle diagnostic tool, the vehicle diagnostic tool including a processor and a second wireless transceiver; and a base station, wherein: the vehicle EEE C19 is a method performed by a vehicle diagnostic tool and one or more of a dongle or a base station, the dongle including a vehicle communication transceiver, a first wireless transceiver and a vehicle connector, the vehicle connector being removably connectable to an on-board diagnostic connector in a vehicle, and the vehicle diagnostic tool including a processor and a second wireless transceiver, the method comprising: outputting, by the one or more of the dongle or the base station, an output signal; receiving, by the processor, the output signal; and making, by the processor, a first determination based at least in part on the output signal, wherein: the first determination being indicative of whether the dongle is in spatial proximity of the base station, the vehicle diagnostic tool and the dongle are dockable at and/or to the base station, the vehicle communication transceiver is operable to perform a vehicle communication directly with a vehicle while the vehicle connector is connected to the on-board diagnostic connector of the vehicle, and the second wireless transceiver is operable to communicate wirelessly with the first wireless transceiver to trigger a vehicle communication from the dongle to the vehicle while the vehicle connector is connected to the on-board diagnostic connector of the vehicle.

What is claimed is:

1. A base station system configured for docking one or more dongles thereto, the base station system comprising:
a processor,
a transceiver,
a proximity sensing component, and
a non-transitory computer-readable memory comprising program instructions executable by the processor to cause the base station system to perform functions comprising:
receiving a first output signal at the processor, wherein the first output signal is output by the proximity sensing component;
determining, at the processor based at least in part on the first output signal, a first determination that indicates whether a first dongle is in spatial proximity to the proximity sensing component; and
outputting, by the processor using the transceiver, a second output signal, wherein:
the second output signal is based at least in part on the first determination and is destined for a vehicle diagnostic tool and indicates whether the first dongle is in spatial proximity to the proximity sensing component,
the vehicle diagnostic tool includes a first wireless transceiver configured to communicate wirelessly with a second wireless transceiver,
the vehicle diagnostic tool includes a user interface configured for outputting a notification based on the second output signal, and
the first dongle includes the second wireless transceiver.

2. The base station system of claim 1, wherein:
the base station system is further configured for docking one or more vehicle diagnostic tools thereto, and
the one or more vehicle diagnostic tools include the vehicle diagnostic tool.

3. The base station system of claim 1, wherein:
the proximity sensing component comprises one of a first set of components, a second set of components, a third set of components, a fourth set of components, a fifth set of components, and a sixth set of components,
the first set of components includes a light transmitter and a photoelectric receiver, the second set of components includes an infrared energy transmitter and an infrared energy receiver,
the third set of components includes a push button plunger and a push button switch having a movable contact fixedly connected to the push button plunger,
the fourth set of components includes an ultrasonic transducer operable to emit an ultrasonic signal and to detect reception of an ultrasonic signal,
the fifth set of components includes a radio frequency receiver operable to receive a radio frequency signal from the first dongle carrying data corresponding to the first dongle, and
the sixth set of components includes a second switch operable to switch states based on whether a permanent magnet is in proximity to the second switch.

4. The base station system of claim 1, wherein:
the first dongle includes a permanent magnet, and
the proximity sensing component includes a switch operable to switch between a first state and a second state based on whether the permanent magnet is in proximity to the switch,
the second output signal indicates whether the switch is in the first state or in the second state,
the switch being in the first state indicates that the first dongle is in proximity to the base station system, and
the switch being in the second state indicates that the first dongle is not in proximity to the base station system.

5. The base station system of claim 1, wherein:
the first dongle includes a radio frequency transmitter,
the non-transitory computer-readable memory comprises data corresponding to the first dongle, and
the proximity sensing component includes a radio frequency receiver operable to receive the data corresponding to the first dongle when output by the radio frequency transmitter as at least part of the first output signal of the proximity sensing component.

6. The base station system of claim 1, further comprising:
an inductive charging pad with a primary coil; and
a chargeable device including a chargeable battery and a secondary coil, wherein:
the chargeable device is chargeable by placement of the chargeable device on the inductive charging pad and a current flow induced in the secondary coil by a magnetic field the primary coil is configured to radiate, and
the chargeable device includes the first dongle or the vehicle diagnostic tool.

7. The base station system of claim 1, wherein:
one of the first dongle or the vehicle diagnostic tool is a first device,
the base station system further comprises a first set of connector pins and a first port arranged to receive a portion of the first device therein, and
the first device includes a second set of connector pins adapted for mating with the first set of connector pins when the portion of the first device is disposed within the first port.

8. The base station system of claim 7, wherein:
the other one of the first dongle or the vehicle diagnostic tool is a second device,
the base station system further comprises a third set of connector pins and a second port arranged to receive a portion of the second device therein, and
the second device includes a fourth set of connector pins adapted for mating with the third set of connector pins when the portion of the second device is disposed within the second port.

9. The base station system of claim 1, wherein:

the first dongle includes a near-field communication radio frequency transmitter configured to transmit a radio frequency signal, the proximity sensing component includes a near-field communication radio frequency receiver configured to receive the radio frequency signal, and the first determination indicates that the first dongle is within proximity to the proximity sensing component.

10. The base station system of claim 9, wherein:

the radio frequency signal carries a dongle identifier of the first dongle, and the processor is configured to determine, based on the dongle identifier, the first dongle is docked to the base station system.

11. The base station system of claim 9, wherein the near-field communication radio frequency transmitter comprises a passive near-field communication radio frequency transmitter.

12. The base station system of claim 1, further comprising:

the first dongle; and the vehicle diagnostic tool, wherein:

the second wireless transceiver is configured to trigger transmission of a vehicle communication from the first dongle to a vehicle, the first dongle includes a vehicle connector connectable to an on-board diagnostic connector of the vehicle, the first dongle includes a vehicle communication transceiver, and the vehicle communication transceiver is operable to transmit the vehicle communication directly to the vehicle while the vehicle connector is connected to the on-board diagnostic connector.

13. The base station system of claim 1, wherein:

the one or more dongles include the first dongle and a second dongle, the first dongle includes a first connector, and the second dongle includes a second connector.

14. The base station system of claim 13, wherein the first connector is different than the second connector.

15. The base station system of claim 1, wherein the first dongle is operable as a flight recorder configured to store vehicle data messages for subsequent retrieval via the vehicle diagnostic tool or a server.

16. The base station system of claim 1, wherein the functions further comprise:

outputting software or firmware to the first dongle or the vehicle diagnostic tool.

17. The base station system of claim 1, further comprising:

a battery charger, wherein the functions further comprise determining the first dongle or the vehicle diagnostic tool has docked at the base station system by determining that the battery charger has increased a current output to charge a battery at the first dongle or the vehicle diagnostic tool.

18. The base station system of claim 1, further comprising:

the vehicle diagnostic tool, wherein the vehicle diagnostic tool is configured to receive data captured by an oscilloscope, a multi-meter, or a camera.

19. The base station system of claim 1, further comprising:

the vehicle diagnostic tool, wherein:

the user interface includes a display configured to display the notification, and the notification indicates whether the first dongle is docked at the base station system.

20. The base station system of claim 1, further comprising:

the vehicle diagnostic tool, wherein the vehicle diagnostic tool is configured to display a second notification indicating a determined state selected from the group consisting of:

a state in which the vehicle diagnostic tool and an unknown dongle is docked at the base station system, a state in which the vehicle diagnostic tool and the first dongle are docked at the base station system but not paired together, a state in which the vehicle diagnostic tool and the first dongle are docked at the base station system, a state in which the first dongle but not the vehicle diagnostic tool is docked at the base station system, a state in which the vehicle diagnostic tool but not the first dongle is docked at the base station system, and a state in which neither the vehicle diagnostic tool nor the first dongle is docked at the base station system.

21. A method performed by a base station system configured for docking one or more dongles thereto, the base station system comprising a processor, a transceiver, and a proximity sensing component, the method comprising:

receiving a first output signal at the processor, wherein the first output signal is output by the proximity sensing component;

determining, at the processor based at least in part on the first output signal, a first determination that indicates whether a first dongle is in spatial proximity to the proximity sensing component; and outputting, by the processor using the transceiver, a second output signal, wherein:

the second output signal is based at least in part on the first determination and is destined for a vehicle diagnostic tool and indicates whether the first dongle is in spatial proximity to the proximity sensing component, the vehicle diagnostic tool includes a first wireless transceiver configured to communicate wirelessly with a second wireless transceiver, the vehicle diagnostic tool includes a user interface configured for outputting a notification based on the second output signal, and the first dongle includes the second wireless transceiver.

22. The method of claim 21, further comprising:

determining, at the processor, a state of the proximity sensing component changing from a first state to a second state and responsively changing the first output signal;

determining the state of the proximity sensing component changing from the second state to the first state and responsively changing the first output signal, wherein the first state incudes the first dongle being in spatial proximity of the proximity sensing component, and the second state incudes the first dongle not being in spatial proximity of the proximity sensing component.

23. The method of claim 21, further comprising:

determining, at the processor, a state of the proximity sensing component changing from a first state to a second state, wherein:

the first state is when the first dongle is in spatial proximity of the proximity sensing component, the second state is when the first dongle is not in spatial proximity of the proximity sensing component, before the processor determines the state of the proximity sensing component changing from the first state to the second state, the second output signal indicates the first dongle is in spatial proximity of the proximity sensing component, and after the processor determines the state of the proximity sensing component changing from the first state to the second state, the second output signal indicates the first dongle is not in spatial proximity of the proximity sensing component.

24. The method of claim 21, further comprising:

determining, at the processor, a state of the proximity sensing component changing from a first state to a second state, wherein:

the first state is when the first dongle is not in spatial proximity of the proximity sensing component, the second state is when the first dongle is in spatial proximity of the proximity sensing component,

before the processor determines the state of the proximity sensing component changing from the first state to the second state, the second output signal indicates the first dongle is not in spatial proximity of the proximity sensing component, and after the processor determines the state of the proximity sensing component changing from the first state to the second state, the second output signal indicates the first dongle is in spatial proximity of the proximity sensing component.

25. The method of claim 21, wherein:

the second output signal includes a dongle identifier corresponding to the first dongle, the method further comprises:

the vehicle diagnostic tool receiving the second output signal;

the vehicle diagnostic tool determining, based on the dongle identifier contained in the second output signal, the first dongle is docked at the base station system; and the vehicle diagnostic tool determining, based on the dongle identifier contained in the second output signal and a matching dongle identifier stored in a memory at the vehicle diagnostic tool, the first dongle corresponds to the vehicle diagnostic tool.

* * * * *